United States Patent
Khoshnevisan et al.

(10) Patent No.: US 12,402,135 B2
(45) Date of Patent: Aug. 26, 2025

(54) FEEDBACK SCHEMES FOR MULTIPLE COMPONENT CARRIER SCHEDULING AND JOINT FEEDBACK REPORTING

(71) Applicant: QUALCOMM Incorporated, San Diego, CA (US)

(72) Inventors: Mostafa Khoshnevisan, San Diego, CA (US); Kazuki Takeda, Tokyo (JP); Huilin Xu, Temecula, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 830 days.

(21) Appl. No.: 17/375,092

(22) Filed: Jul. 14, 2021

(65) Prior Publication Data

US 2022/0022235 A1 Jan. 20, 2022

Related U.S. Application Data

(60) Provisional application No. 63/053,495, filed on Jul. 17, 2020.

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1819* (2013.01); *H04L 1/1896* (2013.01); *H04W 24/08* (2013.01);
(Continued)

(58) Field of Classification Search
CPC . H04W 72/23; H04W 24/08; H04W 72/0446; H04W 72/0453; H04W 72/1263;
(Continued)

(56) References Cited

U.S. PATENT DOCUMENTS

| 2011/0170496 A1* | 7/2011 | Fong | H04W 52/24 |
| | | | 370/329 |
| 2012/0294694 A1* | 11/2012 | Garot | F27D 1/141 |
| | | | 411/427 |

(Continued)

FOREIGN PATENT DOCUMENTS

| CN | 110535573 A | 12/2019 |
| WO | WO-2016162090 A1 | 10/2016 |

OTHER PUBLICATIONS

International Search Report and Written Opinion—PCT/US2021/041756—ISA/EPO—Feb. 11, 2022 (206296WO).

(Continued)

*Primary Examiner* — Rina C Pancholi
(74) *Attorney, Agent, or Firm* — Holland & Hart LLP

(57) ABSTRACT

Methods, systems, and devices for wireless communications are described. A user equipment (UE) may receive, from a base station during a physical downlink control channel (PDCCH) monitoring occasion (PMO), first downlink control information (DCI) scheduling the UE for a first physical downlink shared channel (PDSCH) resource on a first component carrier and for a second PDSCH resource on a second component carrier. The UE may receive, during the PMO, second DCI scheduling the UE for a third PDSCH resource on the second component carrier. The UE may identify a set of downlink assignment indices (DAIs) for the first DCI and the second DCI, where the first DCI has one or more DAIs whose values are based on the first DCI scheduling PDSCH resources on different component carriers. The UE may transmit feedback based on the set of DAIs.

28 Claims, 23 Drawing Sheets

(51) Int. Cl.
  *H04L 1/1867* (2023.01)
  *H04W 24/08* (2009.01)
  *H04W 72/0446* (2023.01)
  *H04W 72/0453* (2023.01)
  *H04W 72/1263* (2023.01)

(52) U.S. Cl.
  CPC ... *H04W 72/0446* (2013.01); *H04W 72/0453* (2013.01); *H04W 72/1263* (2013.01)

(58) Field of Classification Search
  CPC ... H04L 1/1819; H04L 1/1896; H04L 1/1864; H04L 5/0091; H04L 5/0055; H04L 5/001
  See application file for complete search history.

(56) References Cited

U.S. PATENT DOCUMENTS

| | | |
|---|---|---|
| 2020/0015229 A1 | 1/2020 | Yang et al. |
| 2020/0092068 A1 | 3/2020 | Yang et al. |
| 2020/0145984 A1 | 5/2020 | Hosseini et al. |
| 2022/0052824 A1* | 2/2022 | Kim ............... H04L 1/0027 |
| 2022/0240228 A1* | 7/2022 | Matsumura ......... H04L 1/1861 |
| 2022/0272733 A1* | 8/2022 | Gou ............... H04W 72/1273 |

OTHER PUBLICATIONS

Xiaomi: "Enhancements on Multi-TRP/Panel Transmission", 3GPP Draft, R1-1912994, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051820251, 4 Pages, Retrieved from the Internet: URL:https://ftp.3gpp.org/tsg_ran/WG1_RL1/TSGR1_99/Docs/R1-1912994.zip, R1-1912994.docx [retrieved on Nov. 8, 2019] section 3.1.

* cited by examiner

FEEDBACK SCHEMES FOR MULTIPLE COMPONENT CARRIER SCHEDULING AND JOINT FEEDBACK REPORTING

CROSS REFERENCE

The present application for patent claims the benefit of U.S. Provisional Patent Application No. 63/053,495 by KHOSHNEVISAN et al., entitled "FEEDBACK SCHEMES FOR MULTIPLE COMPONENT CARRIER SCHEDULING AND JOINT FEEDBACK REPORTING," filed Jul. 17, 2020, assigned to the assignee hereof, and expressly incorporated by reference herein.

FIELD OF TECHNOLOGY

The following relates to wireless communications, including feedback schemes for multiple component carrier scheduling and joint feedback reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be scheduled for data communications in one or more component carriers by one or more downlink control information (DCI) instances. Some techniques for providing feedback when the UE is scheduled in multi-component carrier or cross-component carrier schemes can be improved.

SUMMARY

The described techniques relate to improved methods, systems, devices, and apparatuses that support feedback schemes for multiple component carrier scheduling and joint feedback reporting. A user equipment (UE) may receive two downlink control information (DCI) in one physical downlink control channel (PDCCH) monitoring occasion (PMO), each DCI scheduling the UE for different physical downlink shared channel (PDSCH) resources on a same component carrier. In some examples, the UE may receive one DCI scheduling two PDSCHs in different component carriers. In some cases, the UE may be scheduled according to both of these examples at the same time. For example, a UE may receive at least two DCI in a PMO, where a first DCI schedules the UE for a first PDSCH resource on a first component carrier and a second PDSCH resource on a second component carrier, and a second DCI schedules the UE for a third PDSCH resource on the first component carrier or the second component carrier. The techniques described herein support generating feedback for scheduling techniques where, during a PMO, a UE is scheduled for PDSCH resources on multiple component carriers by a single DCI and, during the PMO, the UE is scheduled for multiple PDSCH resources on a single component carrier.

Additional techniques are described herein to support providing joint feedback for multiple PDSCH resources corresponding to different control resource set (CORESET) pool indices. The multiple PDSCH resources for the different CORESET pool indices may be scheduled for the same component carrier during the same PMO. The UE may generate a hybrid automatic repeat request (HARQ) acknowledgement (ACK) codebook for the PDSCH resources corresponding to the different CORESET pool indices and report the feedback on an uplink control channel. In some examples, the different CORESET pool indices may correspond to different transmission and reception points (TRPs).

A method for wireless communications at a UE is described. The method may include receiving, from a base station during a PMO, first DCI scheduling the UE for a first PDSCH resource on a first component carrier and for a second PDSCH resource on a second component carrier, receiving, during the PMO, second DCI scheduling the UE for a third PDSCH resource on the second component carrier, identifying a set of downlink assignment indices (DAIs) for the first DCI and the second DCI, where the first DCI has one or more DAIs whose values are based on the first DCI scheduling PDSCH resources on different component carriers, and transmitting feedback based on the set of DAIs.

An apparatus for wireless communications at a UE is described. The apparatus may include a processor, memory in electronic communication with the processor, and instructions stored in the memory. The instructions may be executable by the processor to cause the apparatus to receive, from a base station during a PMO, first DCI scheduling the UE for a first PDSCH resource on a first component carrier and for a second PDSCH resource on a second component carrier, receive, during the PMO, second DCI scheduling the UE for a third PDSCH resource on the second component carrier, identify a set of DAIs for the first DCI and the second DCI, where the first DCI has one or more DAIs whose values are based on the first DCI scheduling PDSCH resources on different component carriers, and transmit feedback based on the set of DAIs.

Another apparatus for wireless communications at a UE is described. The apparatus may include means for receiving, from a base station during a PMO, first DCI scheduling the UE for a first PDSCH resource on a first component carrier and for a second PDSCH resource on a second component carrier, means for receiving, during the PMO, second DCI scheduling the UE for a third PDSCH resource on the second component carrier, means for identifying a set of DAIs for the first DCI and the second DCI, where the first DCI has one or more DAIs whose values are based on the first DCI scheduling PDSCH resources on different component carriers, and means for transmitting feedback based on the set of DAIs.

A non-transitory computer-readable medium storing code for wireless communications at a UE is described. The code may include instructions executable by a processor to receive, from a base station during a PMO, first DCI scheduling the UE for a first PDSCH resource on a first component carrier and for a second PDSCH resource on a second component carrier, receive, during the PMO, second DCI scheduling the UE for a third PDSCH resource on the second component carrier, identify a set of DAIs for the first DCI and the second DCI, where the first DCI has one or more DAIs whose values are based on the first DCI scheduling PDSCH resources on different component carriers, and transmit feedback based on the set of DAIs.

In some examples of the method, apparatuses, and non-transitory computer-readable medium described herein, identifying the set of DAIs further may include operations, features, means, or instructions for determining a first associated component carrier index for the first DCI based on a highest component carrier index of the first component carrier and the second component carrier.

In some examples of the method, apparatuses, and non-transitory computer-readable medium described herein, identifying the set of DAIs further may include operations, features, means, or instructions for determining a first associated component carrier index for the first DCI based on a lowest component carrier index of the first component carrier and the second component carrier.

In some examples of the method, apparatuses, and non-transitory computer-readable medium described herein, identifying the set of DAIs further may include operations, features, means, or instructions for determining that a first associated component carrier index for the first DCI and a second associated component carrier index for the second DCI may be a same associated component carrier index based on the second PDSCH resource and the third PDSCH resource being scheduled on the second component carrier, and determining a first DAI for the first DCI and a second DAI for the second DCI based on a time domain order of the second PDSCH resource and the third PDSCH resource.

In some examples of the method, apparatuses, and non-transitory computer-readable medium described herein, identifying the set of DAIs further may include operations, features, means, or instructions for determining a first DAI for the first DCI corresponds to a first component carrier index associated with the first component carrier based on the first PDSCH resource, and determining a second DAI for the second DCI corresponds to a second component carrier index associated with the second component carrier based on the third PDSCH resource.

In some examples of the method, apparatuses, and non-transitory computer-readable medium described herein, identifying the set of DAIs further may include operations, features, means, or instructions for determining a first DAI for the first DCI associated with the first component carrier and the first PDSCH resource, determining a second DAI for the first DCI associated with the second component carrier and the second PDSCH resource, and determining a third DAI for the second DCI associated with the second component carrier and the third PDSCH resource.

In some examples of the method, apparatuses, and non-transitory computer-readable medium described herein, the second DAI and the third DAI may be based on a temporal ordering of the second PDSCH resource and the third PDSCH resource.

Some examples of the method, apparatuses, and non-transitory computer-readable medium described herein may further include operations, features, means, or instructions for receiving, during the PMO, a third DCI scheduling the UE for a fourth PDSCH resource on the first component carrier.

In some examples of the method, apparatuses, and non-transitory computer-readable medium described herein, identifying the set of DAIS further may include operations, features, means, or instructions for determining a fourth DAI for the third DCI associated with the first component carrier and the fourth PDSCH resource, where the fourth DAI and the first DAI may be based on a temporal ordering of the first PDSCH resource and the fourth PDSCH resource.

Some examples of the method, apparatuses, and non-transitory computer-readable medium described herein may further include operations, features, means, or instructions for generating a HARQ ACK codebook whose order may be based on the set of DAIS.

Some examples of the method, apparatuses, and non-transitory computer-readable medium described herein may further include operations, features, means, or instructions for determining a set of ACK or negative ACK (NACK) bits for each DAI of the set of DAIS.

Some examples of the method, apparatuses, and non-transitory computer-readable medium described herein may further include operations, features, means, or instructions for determining feedback values for the set of ACK or NACK bits of a first DAI associated with the first DCI based on the first DCI scheduling a set of PDSCH resources, each of the set of ACK or NACK bits of the first DAI corresponding to a different one of the first PDSCH resource and the second PDSCH resource.

Some examples of the method, apparatuses, and non-transitory computer-readable medium described herein may further include operations, features, means, or instructions for determining a first feedback value for a first bit of the set of ACK or NACK bits of a second DAI associated with the second DCI based on the second DCI scheduling a single PDSCH resource, and including a NACK for a second bit of the set of ACK or NACK bits of the second DAI associated with the second DCI.

In some examples of the method, apparatuses, and non-transitory computer-readable medium described herein, the set of DAIS may be ordered first based on ascending order of an associated serving cell index with DCI in a given PMO then based at last in part on ascending order of PMO index.

A method for wireless communications at a base station is described. The method may include transmitting, during a PMO, a first DCI scheduling a UE for a first PDSCH resource on a first component carrier and a second PDSCH resource on a second component carrier, transmitting, during the PMO, a second DCI scheduling the UE for a third PDSCH resource on the second component carrier, receiving feedback for at least the first PDSCH resource, the second PDSCH resource, and the third PDSCH resource on a physical uplink control channel (PUCCH), identifying a set of DAIS for the first DCI and the second DCI, where the first DCI has one or more DAIS whose values are based on the first DCI scheduling PDSCH resources on different component carriers, and decoding the feedback based on the set of DAIS.

An apparatus for wireless communications at a base station is described. The apparatus may include a processor, memory in electronic communication with the processor, and instructions stored in the memory. The instructions may be executable by the processor to cause the apparatus to transmit, during a PMO, a first DCI scheduling a UE for a first PDSCH resource on a first component carrier and a second PDSCH resource on a second component carrier, transmit, during the PMO, a second DCI scheduling the UE for a third PDSCH resource on the second component carrier, receive feedback for at least the first PDSCH resource, the second PDSCH resource, and the third PDSCH resource on a PUCCH, identify a set of DAIS for the first DCI and the second DCI, where the first DCI has one or more DAIS whose values are based on the first DCI scheduling PDSCH resources on different component carriers, and decode the feedback based on the set of DAIS.

Another apparatus for wireless communications at a base station is described. The apparatus may include means for transmitting, during a PMO, a first DCI scheduling a UE for a first PDSCH resource on a first component carrier and a second PDSCH resource on a second component carrier, means for transmitting, during the PMO, a second DCI scheduling the UE for a third PDSCH resource on the second component carrier, means for receiving feedback for at least the first PDSCH resource, the second PDSCH resource, and the third PDSCH resource on a PUCCH, means for identifying a set of DAIs for the first DCI and the second DCI, where the first DCI has one or more DAIs whose values are based on the first DCI scheduling PDSCH resources on different component carriers, and means for decoding the feedback based on the set of DAIs.

A non-transitory computer-readable medium storing code for wireless communications at a base station is described. The code may include instructions executable by a processor to transmit, during a PMO, a first DCI scheduling a UE for a first PDSCH resource on a first component carrier and a second PDSCH resource on a second component carrier, transmit, during the PMO, a second DCI scheduling the UE for a third PDSCH resource on the second component carrier, receive feedback for at least the first PDSCH resource, the second PDSCH resource, and the third PDSCH resource on a PUCCH, identify a set of DAIs for the first DCI and the second DCI, where the first DCI has one or more DAIs whose values are based on the first DCI scheduling PDSCH resources on different component carriers, and decode the feedback based on the set of DAIs.

In some examples of the method, apparatuses, and non-transitory computer-readable medium described herein, identifying the set of DAIs further may include operations, features, means, or instructions for determining a first associated component carrier index for the first DCI based on a highest component carrier index of the first component carrier and the second component carrier.

In some examples of the method, apparatuses, and non-transitory computer-readable medium described herein, identifying the set of DAIs further may include operations, features, means, or instructions for determining a first associated component carrier index for the first DCI based on a lowest component carrier index of the first component carrier and the second component carrier.

In some examples of the method, apparatuses, and non-transitory computer-readable medium described herein, identifying the set of DAIs further may include operations, features, means, or instructions for determining a first associated component carrier index for the first DCI and a second associated component carrier index for the second DCI may be a same associated component carrier index based on the second PDSCH resource and the third PDSCH resource being scheduled on the second component carrier, and determining a first DAI for the first DCI and a second DAI for the second DCI based on a time domain order of the second PDSCH resource and the third PDSCH resource, where the feedback may be decoded based on the first DAI and the second DAI.

In some examples of the method, apparatuses, and non-transitory computer-readable medium described herein, identifying the set of DAIs further may include operations, features, means, or instructions for determining a first DAI for the first DCI corresponds to a first component carrier index associated with the first component carrier based on the first PDSCH resource, and determining a second DAI for the second DCI corresponds to a second component carrier index associated with the second component carrier based on the third PDSCH resource, where the feedback may be decoded based on the first DAI and the second DAI.

Some examples of the method, apparatuses, and non-transitory computer-readable medium described herein may further include operations, features, means, or instructions for determining a first DAI for the first DCI associated with the first component carrier and the first PDSCH resource, determining a second DAI for the first DCI associated with the second component carrier and the second PDSCH resource, and determining a third DAI for the second DCI associated with the second component carrier and the third PDSCH resource, where the feedback may be decoded based on the first DAI, the second DAI, and the third DAI.

In some examples of the method, apparatuses, and non-transitory computer-readable medium described herein, the second DAI and the third DAI may be based on a temporal ordering of the second PDSCH resource and the third PDSCH resource.

Some examples of the method, apparatuses, and non-transitory computer-readable medium described herein may further include operations, features, means, or instructions for transmitting, during the PMO, a third DCI scheduling the UE for a fourth PDSCH resource on the first component carrier.

In some examples of the method, apparatuses, and non-transitory computer-readable medium described herein, identifying the set of DAIs further may include operations, features, means, or instructions for determining a fourth DAI for the third DCI associated with the first component carrier and the fourth PDSCH resource, where the fourth DAI and the first DAI may be based on a temporal ordering of the first PDSCH resource and the fourth PDSCH resource, and where the feedback may be decoded based on the fourth DAI.

In some examples of the method, apparatuses, and non-transitory computer-readable medium described herein, the feedback includes a HARQ ACK codebook whose order may be generated based on the set of DAIs.

In some examples of the method, apparatuses, and non-transitory computer-readable medium described herein, the feedback includes a set of ACK or NACK bits for each DAI of the set of DAIs.

In some examples of the method, apparatuses, and non-transitory computer-readable medium described herein, decoding the feedback may include operations, features, means, or instructions for identifying feedback values for the set of ACK or NACK bits of a first DAI associated with the first DCI based on the first DCI scheduling a set of PDSCH resources, each of the set of ACK or NACK bits of the first DAI corresponding to a different one of the first PDSCH resource and the second PDSCH resource.

In some examples of the method, apparatuses, and non-transitory computer-readable medium described herein, decoding the feedback may include operations, features, means, or instructions for identifying a first feedback value for a first bit of the set of ACK or NACK bits of a second DAI associated with the second DCI based on the second DCI scheduling a single PDSCH resource, and identifying a NACK for a second bit of the set of ACK or NACK bits of the second DAI associated with the second DCI.

In some examples of the method, apparatuses, and non-transitory computer-readable medium described herein, the set of DAIs may be ordered first based on ascending order of an associated serving cell index with DCI in a corresponding PMO then based at last in part on ascending order of PMO index.

A method for wireless communications at a UE is described. The method may include receiving, from a base station during a PMO, one or more first DCI scheduling the UE for a corresponding one or more first PDSCH resources on a first component carrier, the one or more first DCI associated with a first CORESET pool index, receiving, during the PMO, one or more second DCI scheduling the UE for a corresponding one or more second PDSCH resources on the first component carrier, the one or more second DCI associated with a second CORESET pool index, identifying a set of DAIs for the one or more first DCI and the one or more second DCI, where values of the set of DAIs are based on the one or more first DCI and the one or more second DCI both scheduling PDSCH resources on a same component carrier, and transmitting feedback based on the set of DAIs.

An apparatus for wireless communications at a UE is described. The apparatus may include a processor, memory in electronic communication with the processor, and instructions stored in the memory. The instructions may be executable by the processor to cause the apparatus to receive, from a base station during a PMO, one or more first DCI scheduling the UE for a corresponding one or more first PDSCH resources on a first component carrier, the one or more first DCI associated with a first CORESET pool index, receive, during the PMO, one or more second DCI scheduling the UE for a corresponding one or more second PDSCH resources on the first component carrier, the one or more second DCI associated with a second CORESET pool index, identify a set of DAIs for the one or more first DCI and the one or more second DCI, where values of the set of DAIs are based on the one or more first DCI and the one or more second DCI both scheduling PDSCH resources on a same component carrier, and transmit feedback based on the set of DAIs.

Another apparatus for wireless communications at a UE is described. The apparatus may include means for receiving, from a base station during a PMO, one or more first DCI scheduling the UE for a corresponding one or more first PDSCH resources on a first component carrier, the one or more first DCI associated with a first CORESET pool index, means for receiving, during the PMO, one or more second DCI scheduling the UE for a corresponding one or more second PDSCH resources on the first component carrier, the one or more second DCI associated with a second CORESET pool index, means for identifying a set of DAIs for the one or more first DCI and the one or more second DCI, where values of the set of DAIs are based on the one or more first DCI and the one or more second DCI both scheduling PDSCH resources on a same component carrier, and means for transmitting feedback based on the set of DAIs.

A non-transitory computer-readable medium storing code for wireless communications at a UE is described. The code may include instructions executable by a processor to receive, from a base station during a PMO, one or more first DCI scheduling the UE for a corresponding one or more first PDSCH resources on a first component carrier, the one or more first DCI associated with a first CORESET pool index, receive, during the PMO, one or more second DCI scheduling the UE for a corresponding one or more second PDSCH resources on the first component carrier, the one or more second DCI associated with a second CORESET pool index, identify a set of DAIs for the one or more first DCI and the one or more second DCI, where values of the set of DAIs are based on the one or more first DCI and the one or more second DCI both scheduling PDSCH resources on a same component carrier, and transmit feedback based on the set of DAIs.

Some examples of the method, apparatuses, and non-transitory computer-readable medium described herein may further include operations, features, means, or instructions for transmitting, to a base station, a UE capability associated with a number of PDSCH resources per PMO per cell, the number of PDSCH resources per PMO per cell, or both.

In some examples of the method, apparatuses, and non-transitory computer-readable medium described herein, identifying the set of DAIs further may include operations, features, means, or instructions for determining an ordering for the set of DAIs based on a temporal ordering of the PDSCH resources associated with a same CORESET pool index on the same component carrier scheduled during the PMO, then based on a CORESET pool index ordering on the same component carrier scheduled during the PMO, then based on a component carrier index ordering for the PMO, then based on a PMO ordering.

In some examples of the method, apparatuses, and non-transitory computer-readable medium described herein, identifying the set of DAIs further may include operations, features, means, or instructions for determining an ordering for the set of DAIs based on a CORESET pool index ordering for the PDSCH resources having a common starting resource in a time domain on the same common component carrier scheduled during the PMO, then based on a temporal ordering of the PDSCH resources on the same component carrier scheduled during the PMO, then based on a component carrier index ordering for component carriers scheduled during the PMO, then based on a PMO index ordering.

In some examples of the method, apparatuses, and non-transitory computer-readable medium described herein, the one or more first DCI and the one or more second DCI include up to a maximum number of DCI.

In some examples of the method, apparatuses, and non-transitory computer-readable medium described herein, the maximum number of DCI may be twice a value indicated by the UE.

In some examples of the method, apparatuses, and non-transitory computer-readable medium described herein, the maximum number of DCI may be indicated by the UE, where a first PDSCH resource and a second PDSCH resource may have a same starting resource in a time domain.

Some examples of the method, apparatuses, and non-transitory computer-readable medium described herein may further include operations, features, means, or instructions for determining the one or more first DCI allocate one or more third PDSCH resources in a second component carrier.

In some examples of the method, apparatuses, and non-transitory computer-readable medium described herein, the first CORESET pool index corresponds to a first TRP, and the second CORESET pool index corresponds to a second TRP.

In some examples of the method, apparatuses, and non-transitory computer-readable medium described herein, an ordering for the set of DAIs may be based on a PDSCH resource start time ordering, a CORESET pool index ordering, a component carrier index ordering, a PMO index ordering, or any combination thereof.

A method for wireless communications at a base station is described. The method may include transmitting, to a UE during a PMO, one or more first DCI scheduling the UE for a corresponding one or more first PDSCH resources on a first component carrier, the one or more first DCI associated with a first CORESET pool index, transmitting, during the PMO, one or more second DCI scheduling the UE for a corresponding one or more second PDSCH resources on the first component carrier, the one or more second DCI associated with a second CORESET pool index, receiving feedback for the one or more first PDSCH resources and the one or more second PDSCH resources on a PUCCH, identifying a set of DAIs for the one or more first DCI and the one or more second DCI, where values of the set of DAIs are based on the one or more first DCI and the one or more second DCI both scheduling PDSCH resources on a same component carrier, and decoding the feedback based on the set of DAIs.

An apparatus for wireless communications at a base station is described. The apparatus may include a processor, memory in electronic communication with the processor, and instructions stored in the memory. The instructions may be executable by the processor to cause the apparatus to transmit, to a UE during a PMO, one or more first DCI scheduling the UE for a corresponding one or more first PDSCH resources on a first component carrier, the one or more first DCI associated with a first CORESET pool index, transmit, during the PMO, one or more second DCI scheduling the UE for a corresponding one or more second PDSCH resources on the first component carrier, the one or more second DCI associated with a second CORESET pool index, receive feedback for the one or more first PDSCH resources and the one or more second PDSCH resources on a PUCCH, identify a set of DAIs for the one or more first DCI and the one or more second DCI, where values of the set of DAIs are based on the one or more first DCI and the one or more second DCI both scheduling PDSCH resources on a same component carrier, and decode the feedback based on the set of DAIs.

Another apparatus for wireless communications at a base station is described. The apparatus may include means for transmitting, to a UE during a PMO, one or more first DCI scheduling the UE for a corresponding one or more first PDSCH resources on a first component carrier, the one or more first DCI associated with a first CORESET pool index, means for transmitting, during the PMO, one or more second DCI scheduling the UE for a corresponding one or more second PDSCH resources on the first component carrier, the one or more second DCI associated with a second CORESET pool index, means for receiving feedback for the one or more first PDSCH resources and the one or more second PDSCH resources on a PUCCH, means for identifying a set of DAIs for the one or more first DCI and the one or more second DCI, where values of the set of DAIs are based on the one or more first DCI and the one or more second DCI both scheduling PDSCH resources on a same component carrier, and means for decoding the feedback based on the set of DAIs.

A non-transitory computer-readable medium storing code for wireless communications at a base station is described. The code may include instructions executable by a processor to transmit, to a UE during a PMO, one or more first DCI scheduling the UE for a corresponding one or more first PDSCH resources on a first component carrier, the one or more first DCI associated with a first CORESET pool index, transmit, during the PMO, one or more second DCI scheduling the UE for a corresponding one or more second PDSCH resources on the first component carrier, the one or more second DCI associated with a second CORESET pool index, receive feedback for the one or more first PDSCH resources and the one or more second PDSCH resources on a PUCCH, identify a set of DAIs for the one or more first DCI and the one or more second DCI, where values of the set of DAIs are based on the one or more first DCI and the one or more second DCI both scheduling PDSCH resources on a same component carrier, and decode the feedback based on the set of DAIs.

Some examples of the method, apparatuses, and non-transitory computer-readable medium described herein may further include operations, features, means, or instructions for receiving, from the UE, a UE capability associated with a number of PDSCH resources per PMO per cell, the number of PDSCH resources per PMO per cell, or both.

In some examples of the method, apparatuses, and non-transitory computer-readable medium described herein, identifying the set of DAIs further may include operations, features, means, or instructions for determining an ordering for the set of DAIs based on a temporal ordering of the PDSCH resources associated with a same CORESET pool index on the same component carrier scheduled during the PMO, then based on a CORESET pool index ordering on the same component carrier scheduled during the PMO, then based on a component carrier index ordering for the PMO, then based on a PMO ordering.

In some examples of the method, apparatuses, and non-transitory computer-readable medium described herein, identifying the set of DAIs further may include operations, features, means, or instructions for determining an ordering for the set of DAIs based on a CORESET pool index ordering for the PDSCH resources having a common starting resource in a time domain on the same common component carrier scheduled during the PMO, then based on a temporal ordering of the PDSCH resources on the same component carrier scheduled during the PMO, then based on a component carrier index ordering for component carriers scheduled during the PMO, then based on a PMO index ordering.

In some examples of the method, apparatuses, and non-transitory computer-readable medium described herein, the one or more first DCI and the one or more second DCI include up to a maximum number of DCI instances based.

In some examples of the method, apparatuses, and non-transitory computer-readable medium described herein, the maximum number of DCI may be twice a value indicated by the UE.

In some examples of the method, apparatuses, and non-transitory computer-readable medium described herein, the maximum number of DCI may be indicated by the UE, where a first PDSCH resource and a second PDSCH resource may have a same starting resource in a time domain.

Some examples of the method, apparatuses, and non-transitory computer-readable medium described herein may further include operations, features, means, or instructions for determining the one or more first DCI allocate one or more third PDSCH resources on a second component carrier.

In some examples of the method, apparatuses, and non-transitory computer-readable medium described herein, the first CORESET pool index corresponds to a first TRP, and the second CORESET pool index corresponds to a second TRP.

DETAILED DESCRIPTION

Figure 1:
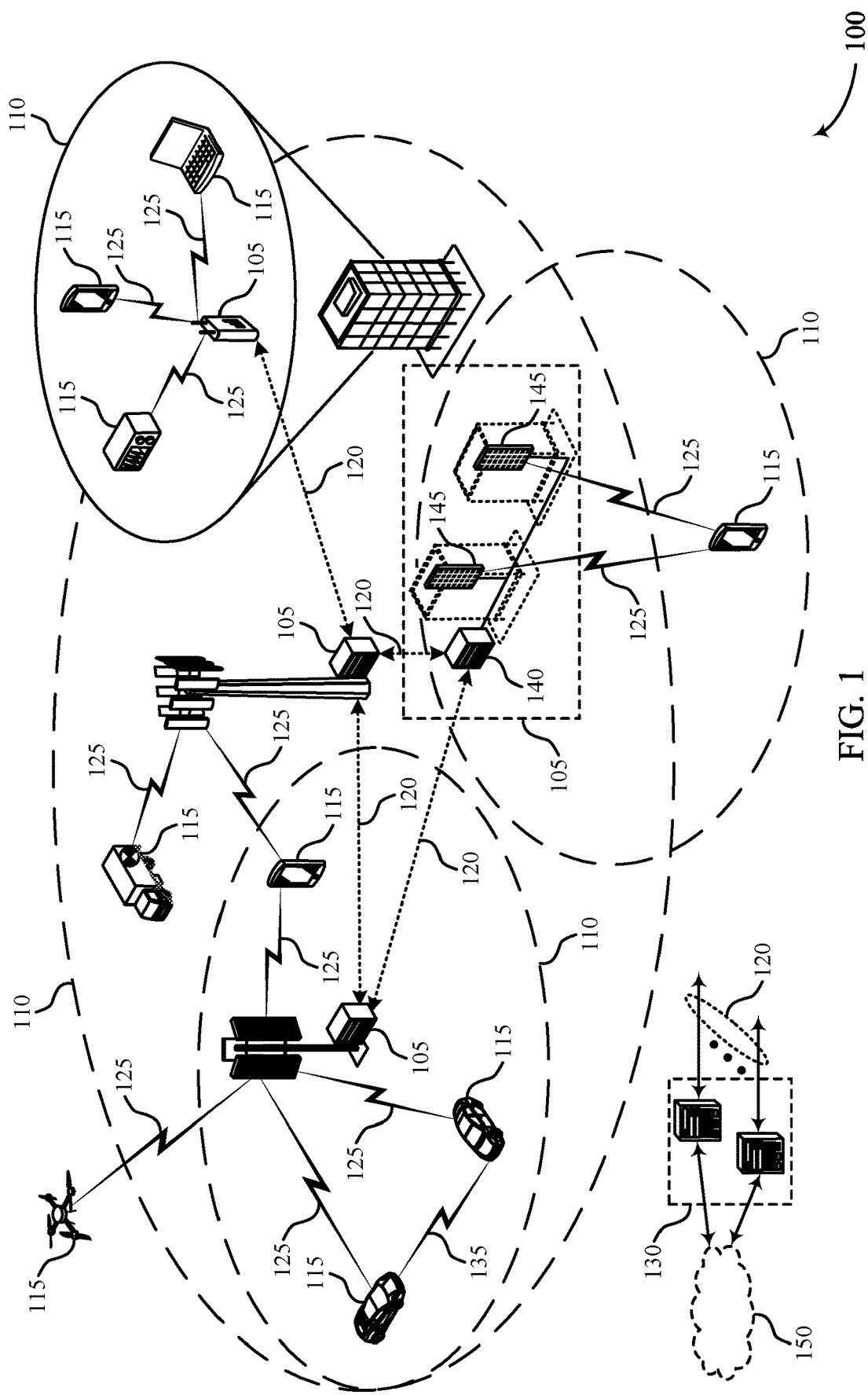
FIGS. 1 and 2 illustrate examples of wireless communications systems that support feedback schemes for multiple component carrier scheduling and joint feedback reporting in accordance with aspects of the present disclosure.

A user equipment (UE) may communicate with a base station on multiple component carriers. The base station may transmit downlink control information (DCI) to schedule the UE for physical downlink shared channel (PDSCH) resources on one or more of the component carriers for a data transmission to the UE. The DCI may be transmitted to the UE during a physical downlink control channel (PDCCH) monitoring occasion (PMO), and the base station may transmit one or more DCI in one or more component carriers per-PMO to schedule the UE for one or more PDSCH resources. In some cases, the UE may be configured to report hybrid automatic repeat request (HARQ) acknowledgement (ACK) feedback for multiple PDSCH resources. For example, the UE may generate a HARQ ACK codebook, where indices of the codebook correspond to ACK or negative ACK (NACK) feedback for scheduled PDSCH resources. The ordering of the codebook may be based on downlink assignment indicator (DAI) values, which may be indicated by or correspond to DCI which schedule the PDSCH resources. A value of a DAI field in DCI may denote an accumulative number of serving cell and PMO pairs in which PDSCH reception is present up to the current serving cell and current PMO. The DAI may increment first in an ascending order of serving cell index, then in ascending order of PMO index.

UEs described herein may support multiple different techniques for PDSCH resource scheduling. In some examples, a UE may receive two DCI in one PMO, each DCI scheduling the UE for different PDSCH resources on a same component carrier. In some examples, a UE may receive one DCI scheduling two PDSCHs in different component carriers. In some cases, the UE may be scheduled according to both of these examples at the same time. For example, a UE may receive at least two DCI in a PMO, where a first DCI schedules the UE for a first PDSCH resource on a first component carrier and a second PDSCH resource on a second component carrier, and a second DCI schedules the UE for a third PDSCH resource on the first component carrier or the second component carrier. The techniques described herein support generating feedback for scheduling techniques where, during a PMO, a UE is scheduled for PDSCH resources on multiple component carriers by a single DCI and, during the PMO, the UE is scheduled for multiple PDSCH resources on a single component carrier.

Additional techniques are described herein to support providing joint feedback for multiple PDSCH resources corresponding to different control resource set (CORESET) pool indices. The multiple PDSCH resources for the different CORESET pool indices may be scheduled for the same component carrier during the same PMO. The UE may generate a HARQ ACK codebook for the PDSCH resources corresponding to the different CORESET pool indices and report the feedback on an uplink control channel. In some examples, the different CORESET pool indices may correspond to different transmission and reception points (TRPs). The described techniques may enable the UE to transmit HARQ ACK feedback with improved efficiency and reduced processing costs, among other benefits.

Aspects of the disclosure are initially described in the context of wireless communications systems. Aspects of the disclosure are further illustrated by and described with reference to apparatus diagrams, system diagrams, and flowcharts that relate to feedback schemes for multiple component carrier scheduling and joint feedback reporting.

FIG. 1 illustrates an example of a wireless communications system 100 that supports feedback schemes for multiple component carrier scheduling and joint feedback reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

A UE 115 may receive two DCI in one PMO, each DCI scheduling the UE 115 for different PDSCH resources on a same component carrier. In some examples, a UE 115 may receive one DCI scheduling two PDSCHs in different component carriers. In some cases, the UE 115 may be scheduled according to both of these examples at the same time. For example, a UE 115 may receive at least two DCI in a PMO, where a first DCI schedules the UE 115 for a first PDSCH resource on a first component carrier and a second PDSCH resource on a second component carrier, and a second DCI schedules the UE 115 for a third PDSCH resource on the first component carrier or the second component carrier. The techniques described herein support generating feedback for scheduling techniques where, during a PMO, a UE 115 is scheduled for PDSCH resources on multiple component carriers by a single DCI and, during the PMO, the UE 115 is scheduled for multiple PDSCH resources on a single component carrier.

Additional techniques are described herein to support providing joint feedback for multiple PDSCH resources corresponding to different CORESET pool indices. The multiple PDSCH resources for the different CORESET pool indices may be scheduled for the same component carrier during the same PMO. The UE 115 may generate a HARQ ACK codebook for the PDSCH resources corresponding to the different CORESET pool indices and report the feedback on an uplink control channel. In some examples, the different CORESET pool indices may correspond to different TRPs.

Figure 2:
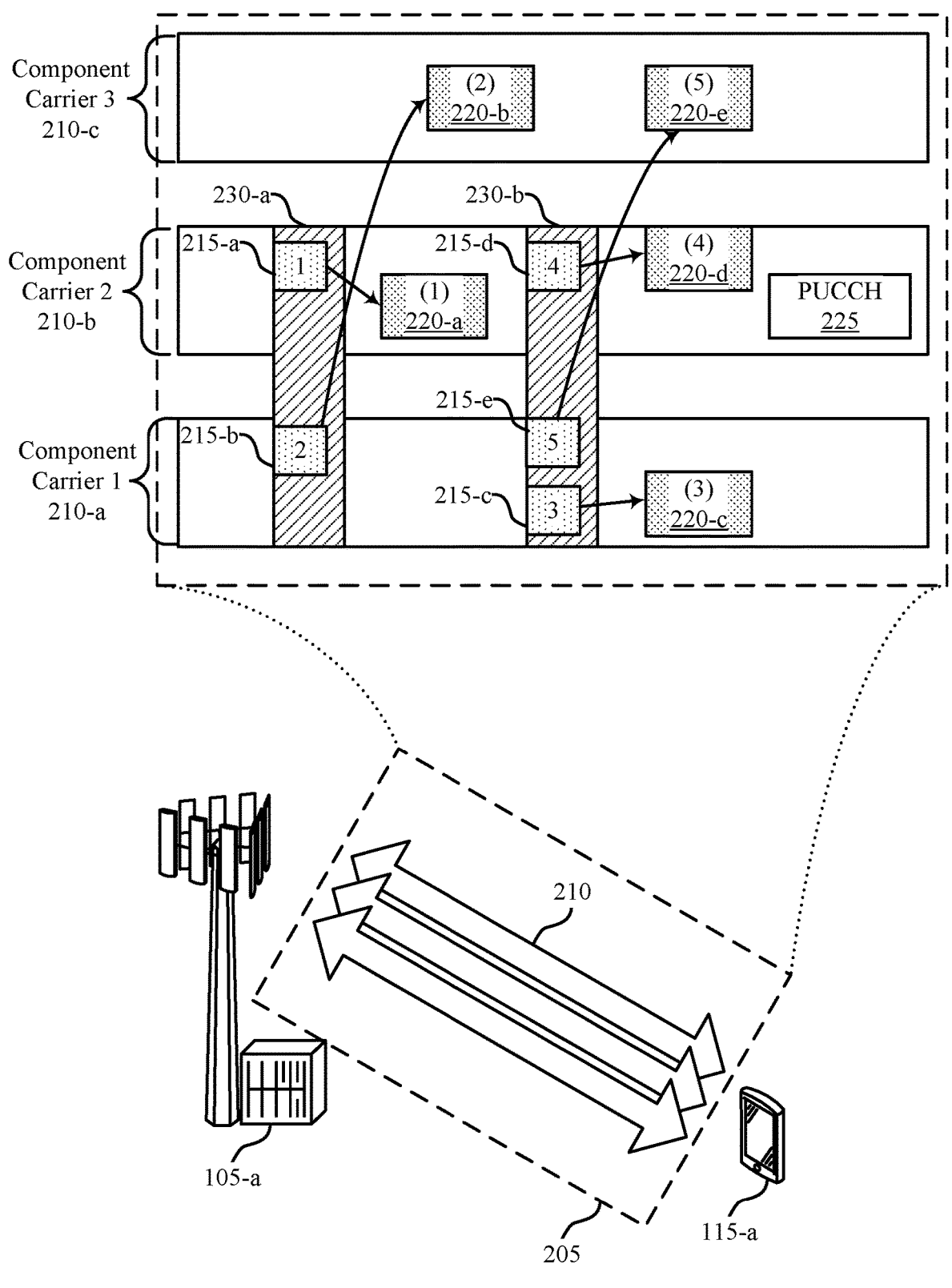

FIG. 2 illustrates an example of a wireless communications system 200 that supports feedback schemes for multiple component carrier scheduling and joint feedback reporting in accordance with aspects of the present disclosure. In some examples, wireless communications system 200 may implement aspects of wireless communication system 100. Wireless communications system 200 may include base station 105-a and UE 115-a, which may be respective examples of a UE 115 and a base station 105 described with reference to FIG. 1.

UE 115-a may communicate with base station 105-a on a set 205 of component carriers 210. Base station 105-a may transmit DCI 215 to schedule UE 115-a for PDSCH resources 220 on one or more of the component carriers 210 for a data transmission to UE 115-a. The DCI 215 may be transmitted to UE 115-a during a PMO 230, and UE 115-a may monitor CORESETs in a PMO 230 to receive the DCI 215. In some cases, base station 105-a may transmit one or more DCI 215 on one or more component carriers 210 per-PMO 230 to schedule UE 115-a for one or more PDSCH resources 220. In some cases, UE 115-a may be configured to report HARQ ACK feedback on a physical uplink control channel (PUCCH) resource 225 for multiple PDSCH resources 220. In some cases, UE 115-a may be configured to report HARQ ACK feedback for each scheduled PDSCH resource 220 in one HARQ ACK codebook on the PUCCH resource 225. For example, UE 115-a may generate a HARQ ACK codebook, where indices of the codebook correspond to ACK/NACK feedback for scheduled PDSCH resources 220.

The ordering of the codebook may be based on DAI values, which may be indicated by or correspond to DCI 215 which schedule the PDSCH resources 220. A value of a counter DAI field in DCI formats may denote an accumulative number of serving cell and PMO pairs in which PDSCH reception or semi-persistent scheduled (SPS) PDSCH release associated with the DCI formats is present up to the current serving cell and current PMO. The DAI may increment first in an ascending order of serving cell index, then in ascending order of PMO index. In some cases, the serving cell may refer to a scheduled cell (e.g., a component carrier 210 on which the PDSCH resource 220 is scheduled) and not the scheduling cell (e.g., a component carrier 210 on which the DCI 215 is received).

In an example, UE 115-a may receive DCI 215-a and DCI 215-b in first PMO 230-a and DCIS 215-c, 215-d, and 215-e in second PMO 230-b. Component carrier 210-a and component carrier 210-b may be configured with self-scheduling, and component carrier 210-c may be configured with cross-carrier scheduling (e.g., from component carrier 210-a). Each DCI 215 may schedule a PDSCH resource 220, and the value of a counter DAI may be indicated in each DCI 215.

As described, the DAI may be ordered first in ascending order of serving cell index, then in ascending order of PMO. DCI 215-a and DCI 215-b may occur in PMO 230-a, which has an earlier PMO index than PMO 230-b, so DCI 215-a and DCI 215-b may be ordered first and before DCIS 215-c, 215-d, and 215-e. DCI 215-a may schedule PDSCH resource 220-a on component carrier 210-b, and DCI 215-b may schedule PDSCH resource 220-b on component carrier 210-c. Per the ascending ordering of component carriers, DCI 215-a may correspond to, or indicate, a first DAI index, and DCI 215-b may correspond to a second DAI index. For PMO 230-b, DCI 215-c may schedule PDSCH resource 220-c on component carrier 210-a, DCI 215-d may schedule PDSCH resource 220-d on component carrier 210-b, and DCI 215-e may schedule PDSCH resource 220-e on component carrier 210-c. According to the component carrier ordering, DCI 215-c may correspond to a third DAI index, DCI 215-d may correspond to a fourth DAI index, and DCI 215-e may correspond to a fifth DAI index.

UE 115-a may construct the HARQ ACK codebook corresponding to the PDSCH resources 220 based on the counter DAI values. For example, a first index in the codebook may include HARQ ACK feedback for PDSCH resource 220-a, the second index in the codebook may include HARQ ACK feedback for PDSCH resource 220-b, and so on. In some cases, there may be a gap or a hole in the counter DAI values. For example, if UE 115-a does not receive or misses DCI 215-c, UE 115-a may determine that UE 115-a never received a DCI 215 corresponding to the third index, and UE 115-a may include a NACK in the corresponding index in the codebook. In some cases, the HARQ ACK codebook may be an example of a Type 2 dynamic HARQ ACK codebook.

UE 115-a, and other UEs 115 described herein, may support multiple different techniques for PDSCH resource scheduling. In some examples, UE 115-a may receive two DCI 215 in one PMO 230, each DCI 215 scheduling UE 115-a for different PDSCH resources 220 on a same component carrier 210. In some cases, the DAI ordering in cases where multiple DCIs in the same PMO schedule the same serving cell may be based on PDSCH reception start time. For example, DAI may be ordered first based on an increasing order of PDSCH reception start time for the same serving cell scheduled during a same PMO, then in ascending order of serving cell index, then in ascending order of PMO index. As an example, Frequency Range 1 (FR1), with 30 kHz subcarrier spacing (SCS), may schedule Frequency Range 2 (FR2), with 120 kHz SCS, as one slot in FR1 may be equal to 4 slots in FR2, and the scheduling component carrier in FR1 may schedule multiple PDSCH resources 220 by multiple DCI 215 in the same PMO 230. In some cases, UE 115-a may indicate support for this scheduling by reporting a UE capability, such as "PDSCH-Number-per-MOperCell." In some cases, UE 115-a may report a number of PDSCH supported per PMO per cell, $N_{PDSCH}^{MO}$.

In some examples, UE 115-a may receive one DCI 215 scheduling two PDSCH resources 220 in different component carriers 210. A DCI 215 which schedules two PDSCH resources 220 may be referred to as a multi-component carrier scheduling DCI.

In some cases, DAI ordering and numbering may be adjusted for a DCI 215 which schedules multiple PDSCH resources 220. In a first example, counter DAI may be incremented by one value per DCI 215, even when a DCI 215 schedules two component carriers 210. However, UE 115-a may generate two HARQ ACK bits per DAI position in the codebook. If a DCI 215 schedules just one PDSCH resource 220, then the second bit in the codebook corresponding to the DCI 215 may be a NACK. In the first example, UE 115-a may identify an associated component carrier index for a DCI 215 that schedules multiple (e.g., two) component carriers 210, so that the DCI 215 is associated with one of the scheduled component carriers 210. For example, UE 115-a may identify either a larger component carrier index or a smaller component carrier index for the associated component carrier index.

For DAI ordering in this first example, a counter DAI in a current DCI may denote the accumulative number of DCI and PMO pairs in which PDSCH reception or SPS PDSCH release associated with a DCI format is present up to the current DCI and current PMO, first in ascending order of an associated serving cell index with DCIS in a given PMO, then in ascending order of PMO index. The HARQ ACK codebook may be generated based on the counter DAI definition and the counter DAI values of the received DCIS.

In a second example of multi-component carrier scheduling DCI, a DCI 215 may indicate one DAI value per scheduled PDSCH resource 220. For example, if a DCI 215 schedules two PDSCH resources 220, the DCI may indicate two DAI values, one for each scheduled PDSCH resource 220.

In some cases, UE 115-*a* may be scheduled according to both of these examples at the same time. For example, UE 115-*a* may receive at least two DCI 215 in a PMO 230, where a first DCI 215 schedules UE 115-*a* for a first PDSCH resource 220 on a first component carrier 210 and a second PDSCH resource 220 on a second component carrier 210, and a second DCI 215 schedules UE 115-*a* for a third PDSCH resource 220 on the first component carrier 210 or the second component carrier 210. The techniques described herein support generating feedback for cases where, during a PMO, a UE 115 is scheduled for PDSCH resources 220 on multiple component carriers 210 by a single DCI 215 and, during the PMO 230, the UE 115 is scheduled for multiple PDSCH resources 220 on a single component carrier 210.

Other examples are provided, or these techniques can be applied for other examples. For example, the UE 115 may receive two multi-component carrier scheduling DCIS 215 in the same PMO 230 both scheduling the same component carriers 210. In some cases, there may be two multi-component carrier scheduling DCIS in the same PMO, where a first DCI 215 is for a first and second component carrier and the second DCI 215 is for a first and a third component carrier. In some cases, there may be a first DCI 215 scheduling a single component carrier 210 and a second DCI 215 scheduling multiple component carriers 210 in the same PMO 230, where the first DCI 215 schedules a first component carrier 210, and the second DCI 215 schedules the first component carrier 210 and a second component carrier 210. A UE 115 described herein may be able to provide HARQ ACK feedback (e.g., in a HARQ ACK codebook) for any of these scheduling examples, among others.

Additional techniques are described herein to support providing joint feedback for multiple PDSCH resources 220 corresponding to different CORESET pool indices. The multiple PDSCH resources 220 for the different CORESET pool indices may be scheduled for the same component carrier 210 during the same PMO 230. The UE may generate a HARQ ACK codebook for the PDSCH resources 220 corresponding to the different CORESET pool indices and report the feedback on a PUCCH resource 225. In some examples, the different CORESET pool indices may correspond to different TRPs.

Figure 3:
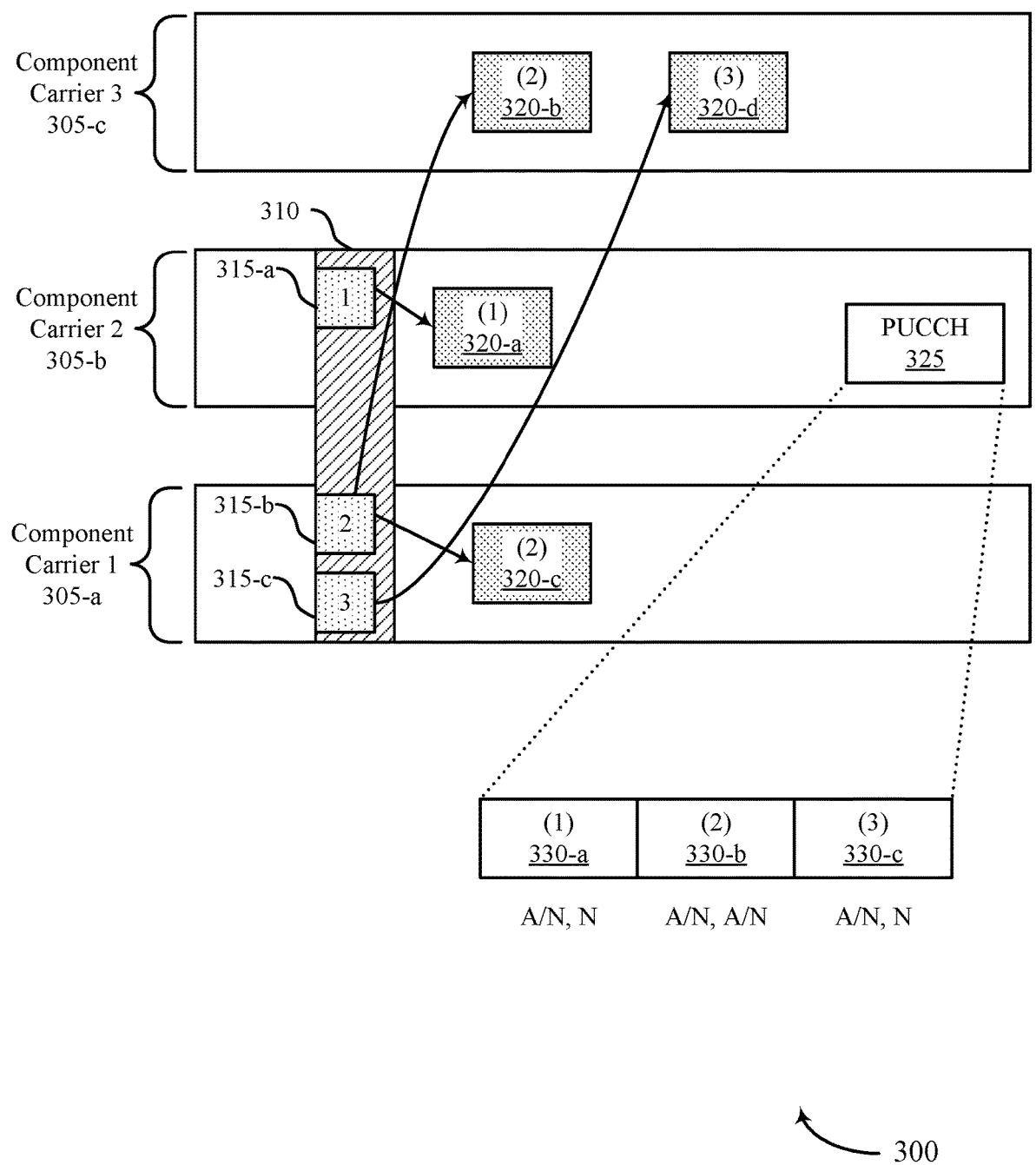
FIGS. 3 through 5 illustrate examples of scheduling schemes that support feedback schemes for multiple component carrier scheduling and joint feedback reporting in accordance with aspects of the present disclosure.

FIG. 3 illustrates an example of a scheduling scheme 300 that supports feedback schemes for multiple component carrier scheduling and joint feedback reporting in accordance with aspects of the present disclosure. In some examples, scheduling scheme 300 may implement aspects of wireless communication system 100.

A base station 105 may transmit DCI 315 to schedule a UE 115 for PDSCHs 320 on one or more component carriers 305. The UE 115 may generate feedback for the PDSCH 320 and transmit the feedback on a PUCCH 325. The UE 115 may generate a HARQ ACK codebook, where each index of the codebook corresponds to a DCI which schedules a PDSCH resource.

The UE 115 may receive two DCI 315 scheduling component carrier 305-*c*, and one of the DCI 315 may schedule multiple component carriers 305. For example, the UE 115 may receive DCI 315-*a*, DCI 315-*b*, and DCI 315-*b* during a PMO 310. DCI 315-*a* may schedule PDSCH 320-*a*, DCI 315-*b* may schedule PDSCH 320-*b* and PDSCH 320-*c*, and DCI 315-*c* may schedule PDSCH 320-*d*.

In the example of the scheduling scheme 300, a counter DAI may be incremented by one value per DCI 315, even when a DCI 315 schedules two component carriers 305. The UE 115 may generate two bits per DAI position in the codebook. If a DCI 315 schedules just one PDSCH 320, then the second bit for the DCI 315 may be a NACK.

The UE 115 may identify an associated component carrier index for each DCI 315. If a DCI 315 schedules one component carrier 305, the associated component carrier index may be the scheduled component carrier index. If a DCI 315 schedules two component carriers, the associated component carrier index may be one of the scheduled component carrier indices. In some cases, the associated component carrier index may correspond to a scheduled component carrier with a higher index or a lower index.

DCI 315-*a* may schedule PDSCH 320-*a* in component carrier 305-*b*, so the associated component carrier index may be "2" for DCI 315-*a*. DCI 315-*b* may schedule PDSCH 320-*b* and PDSCH 320-*c*, which may be in component carrier 305-*a* and component carrier 305-*c*, respectively. In the example of the scheduling scheme 300, the UE 115 may identify component carrier 305-*c* for the associated component carrier index, so the associated component carrier index may be "3" for DCI 315-*b*. DCI 315-*c* may schedule PDSCH 320-*d* on component carrier 305-*c*, so the associated component carrier index may also be "3" for DCI 315-*c*.

If two or more DCIs 315 have the same associated component carrier index in the same PMO, the value of a DAI may be ordered in increasing order of the PDSCH reception starting time in the associated component carrier index. For example, PDSCH 320-*b* is received before PDSCH 320-*d*, so PDSCH 320-*b* may have the lower DAI value. DCI 315-*a* may have the lower associated component carrier index of "2", so DCI 315-*a* may be associated with a first DAI. DCI 315-*b* and DCI 315-*c* may each have the associated component carrier index of "3", but PDSCH 320-*b* may be received before PDSCH 320-*b*, so DCI 315-*b* may have a second DAI, and DCI 315-*c* may be associated with a third DAI.

The UE 115 may generate a HARQ ACK codebook based on the DAI and transmit the codebook on a PUCCH 325. A first index 330-*a* of the codebook may include two bits of HARQ ACK feedback for PDSCH 320-*a*, a second index 330-*b* of the codebook may include two bits of HARQ ACK feedback for PDSCH 320-*b* and PDSCH 320-*c*, and a third index 330-*c* of the codebook may include two bits of HARQ ACK feedback for PDSCH 320-*d*. The second bit of HARQ ACK feedback for PDSCH 320-*a* and PDSCH 320-*d* may be NACKs, as the scheduling DCIs 315 schedule just one PDSCH 320 each.

Figure 4:
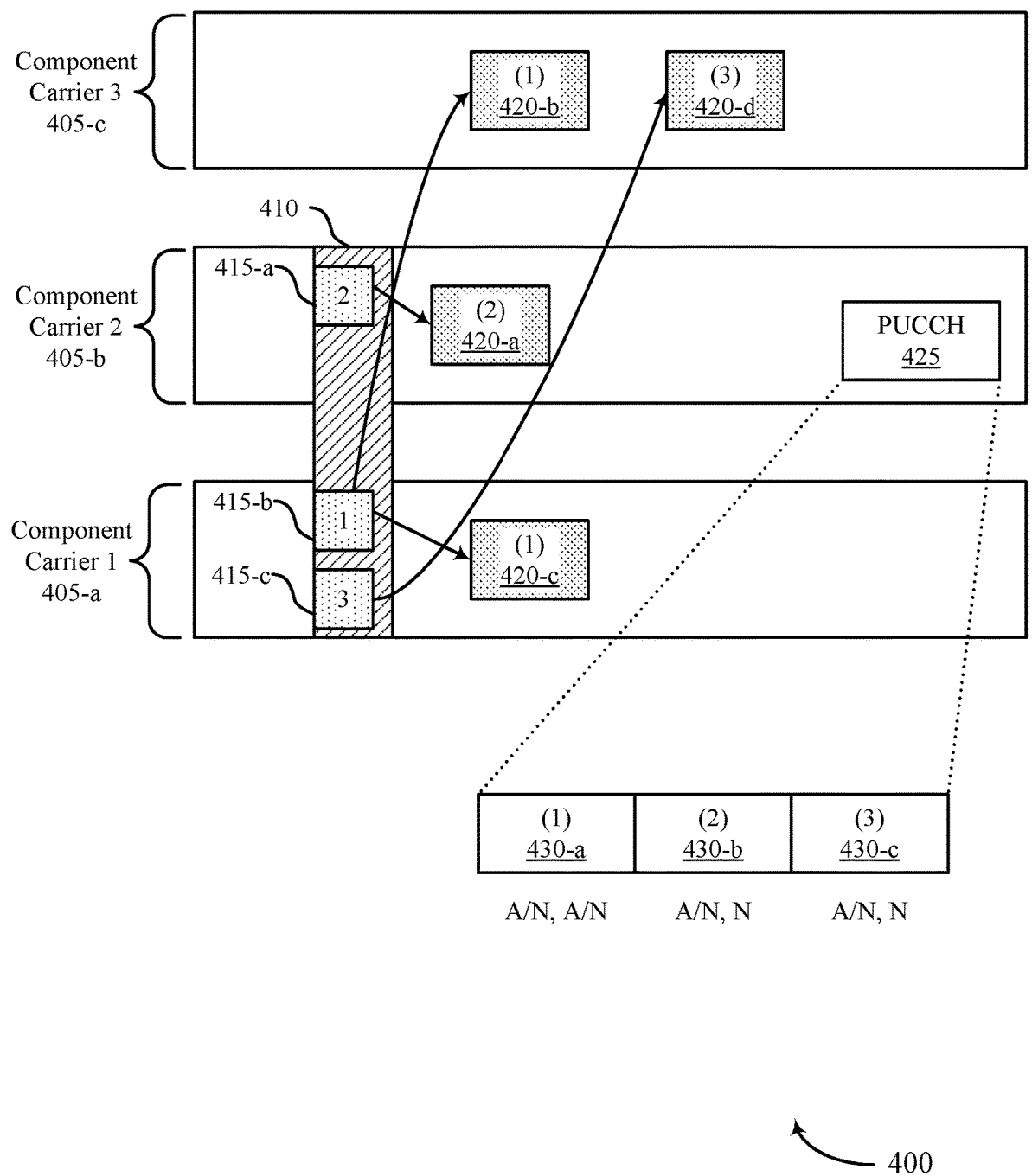

FIG. 4 illustrates an example of a scheduling scheme 400 that supports feedback schemes for multiple component carrier scheduling and joint feedback reporting in accordance with aspects of the present disclosure. In some examples, scheduling scheme 400 may implement aspects of wireless communication system 100.

A base station 105 may transmit DCI 415 to schedule a UE 115 for PDSCHs 420 on one or more component carriers 405. The UE 115 may generate feedback for the PDSCH 420 and transmit the feedback on a PUCCH 425. The UE 115 may generate a HARQ ACK codebook, where each index of the codebook corresponds to a DCI which schedules a PDSCH resource.

The UE 115 may receive two DCI 415 scheduling component carrier 405-c, and one of the DCI 415 may schedule multiple component carriers 405. For example, the UE 115 may receive DCI 415-a, DCI 415-b, and DCI 415-b during a PMO 410. DCI 415-a may schedule PDSCH 420-a, DCI 415-b may schedule PDSCH 420-b and PDSCH 420-c, and DCI 415-c may schedule PDSCH 420-d.

In the example of the scheduling scheme 400, a counter DAI may be incremented by one value per DCI 415, even when a DCI 415 schedules two component carriers 405. The UE 115 may generate two bits per DAI position in the codebook. If a DCI 415 schedules two PDSCH 420, then each bit of the two bits may correspond to feedback for one of the two PDSCH 420. If a DCI 415 schedules just one PDSCH 420, then the second bit for the DCI 415 may be a NACK.

The UE 115 may identify an associated component carrier index for each DCI 415. If a DCI 415 schedules one component carrier 405, the associated component carrier index may be the scheduled component carrier index. If a DCI 415 schedules two component carriers, the associated component carrier index may be one of the scheduled component carrier indices. In some cases, the associated component carrier index may correspond to a scheduled component carrier with a higher index or a lower index.

DCI 415-a may schedule PDSCH 420-a in component carrier 405-b, so the associated component carrier index may be "2" for DCI 415-a. DCI 415-b may schedule PDSCH 420-b and PDSCH 420-c, which may be in component carrier 405-a and component carrier 405-c, respectively. In the example of the scheduling scheme 400, the UE 115 may identify component carrier 405-a for the associated component carrier index, so the associated component carrier index may be "1" for DCI 415-b. DCI 415-c may schedule PDSCH 420-d on component carrier 405-c, so the associated component carrier index may also be "3" for DCI 415-c. Each DCI 415 may have a different associated component carrier index, so the DAI ordering may be based on the associated component carrier indices. For example, DCI 415-b may have a first DAI, DCI 415-a may have a second DAI, and DCI 415-c may have a third DAI.

The UE 115 may generate a HARQ ACK codebook based on the DAI and transmit the codebook on a PUCCH 425. A first index 430-a of the codebook may include two bits of HARQ ACK feedback for PDSCH 420-b and PDSCH 420-c, a second index 430-b of the codebook may include two bits of HARQ ACK feedback for PDSCH 420-a, and a third index 430-c of the codebook may include two bits of HARQ ACK feedback for PDSCH 420-d. The second bit of HARQ ACK feedback for PDSCH 420-a and PDSCH 420-d may be NACKs, as the scheduling DCIS 415 schedule just one PDSCH 420 each.

Figure 5:
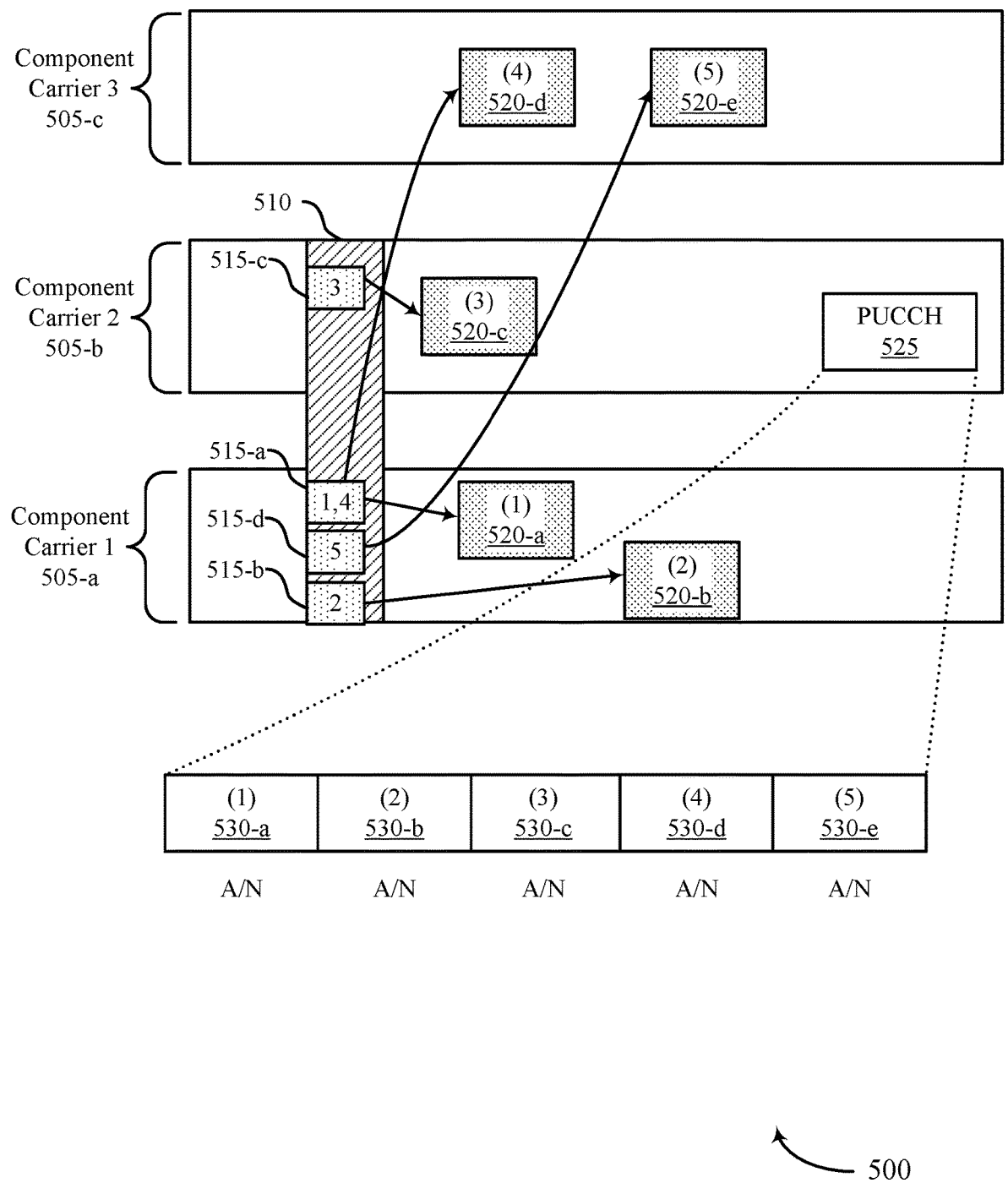

FIG. 5 illustrates an example of a scheduling scheme 500 that supports feedback schemes for multiple component carrier scheduling and joint feedback reporting in accordance with aspects of the present disclosure. In some examples, scheduling scheme 500 may implement aspects of wireless communication system 100.

A base station 105 may transmit DCI 515 to schedule a UE 115 for PDSCHs 520 on one or more component carriers 505. The UE 115 may generate feedback for the PDSCH 520 and transmit the feedback on a PUCCH 525. The UE 115 may generate a HARQ ACK codebook, where each index of the codebook corresponds to a DCI which schedules a PDSCH resource.

The UE 115 may receive two DCI 515 scheduling component carrier 505-a, and one of the DCI 515 may schedule multiple component carriers 505. Additionally, the UE 115 may receive two DCI 515 scheduling component carrier 505-a, and one of the DCI 515 may schedule multiple component carriers 505. For example, the UE 115 may receive DCI 515-a, DCI 515-b, DCI 515-c, and DCI 515-d during a PMO 510. DCI 515-a may schedule PDSCH 520-a and PDSCH 520-d, DCI 515-b may schedule PDSCH 520-b, DCI 515-c may schedule PDSCH 520-c, and DCI 515-d may schedule PDSCH 520-e.

In the example of the scheduling scheme 500, a DCI 515 that schedules two PDSCH 520 in two component carriers 505 may indicate two DAI values corresponding to the two scheduled component carriers 505. For example, DCI 515-a may schedule PDSCH 520-a and PDSCH 520-d, and DCI 515-a may therefore indicate two DAI values.

If another DCI schedules at least one of the two component carriers 505 which is scheduled by a multi-component carrier scheduling DCI, the value of the DAI may be based on which PDSCH has an earlier starting time. For example, DCI 515-a and DCI 515-b both schedule component carrier 505-a, but PDSCH 520-a may be earlier than PDSCH 520-b. Therefore, one of the two DAI corresponding to DCI 515-a, which schedules PDSCH 520-a, may be ordered first (e.g., before) the DAI corresponding to DCI 515-b, which schedules PDSCH 520-b. Similarly, DCI 515-a and DCI 515-d both schedule component carrier 505-c, but PDSCH 520-d occurs before PDSCH 520-e in the time domain. Therefore, the other one of the two DAI for DCI 515-a may be ordered before the DAI corresponding to DCI 515-d.

A first index 530-a of the codebook may correspond to DCI 515-a, which schedules PDSCH 520-a on component carrier 505-a. A second index 530-b may correspond to DCI 515-b, which also schedules on component carrier 505-a, but PDSCH 520-b occurs after PDSCH 520-b in the time domain. The next highest serving cell index, corresponding to component carrier 505-b, includes PDSCH 520-c, which is scheduled by DCI 515-c. Therefore, a third index 530-c may correspond to DCI 515-c. Component carrier 505-c includes PDSCH 520-d and PDSCH 520-e. A fourth index 530-d may correspond to DCI 515-a, as PDSCH 520-d occurs before PDSCH 520-e in the time domain. A fifth index 530-e may correspond to DCI 515-d. Each index 530 may include HARQ ACK feedback for PDSCH 520 scheduled by the corresponding DCI 515. For example, first index 530-a may include HARQ ACK feedback for PDSCH 520-a.

Figure 6:
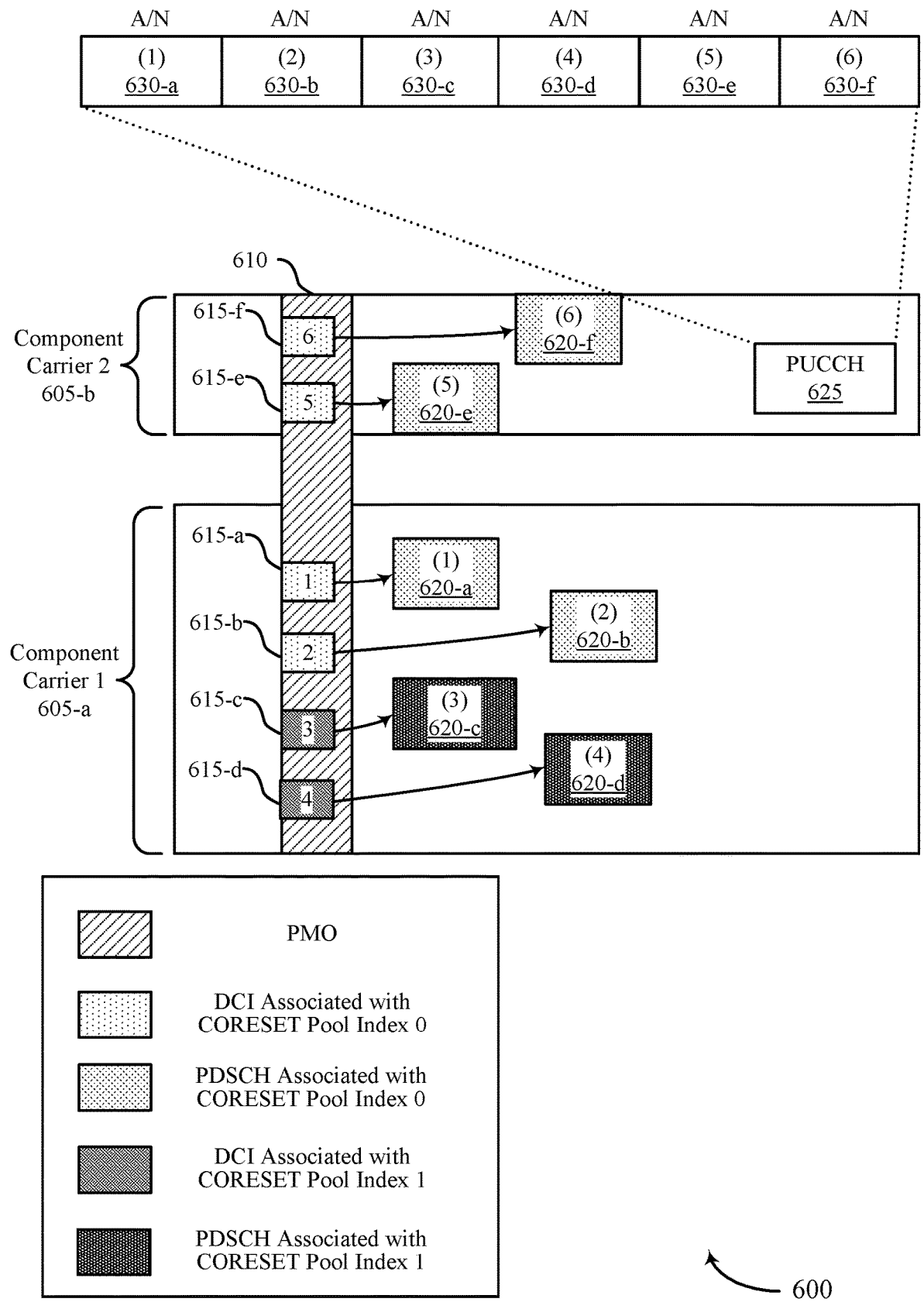
FIGS. 6 and 7 illustrate examples of joint feedback reporting schemes that support feedback schemes for multiple component carrier scheduling and joint feedback reporting in accordance with aspects of the present disclosure.

FIG. 6 illustrates an example of a joint feedback scheme 600 that supports feedback schemes for multiple component carrier scheduling and joint feedback reporting in accordance with aspects of the present disclosure. In some examples, joint feedback scheme 600 may implement aspects of wireless communication system 100.

In some cases, a UE 115 may support joint feedback for transmissions from multiple TRPs. In some cases, different TRPs may have different CORESET pool index values. For example, a CORESET pool index may be configured per CORESET, and the UE 115 may group the CORESETs into two groups corresponding to a CORESET pool index values 0 and 1. For joint feedback, DAI may first be ordered in increasing order of CORESET pool index values in the same component carrier and same PMO 610, second in increasing order of component carrier index, and third in increasing order of PMO index. For example, if the UE 115 is not provided a CORESET pool index for an active downlink bandwidth part of a serving cell or is provided CORESET pool index with value 0 for one or more first CORESETs, and the UE 115 is provided CORESET pool index with value 1 for one or more second CORESETs, and the UE 115 is configured for joint feedback, the value of the counter DAI may be in the order of the first CORESETs and then the second CORESETs for a same serving cell index and a same PMO 610.

For HARQ ACK codebook construction based on DAI values, each component carrier with two values of CORESET pool index may be counted two times. A PDSCH 620 may be associated with a CORESET pool index value through the scheduling DCI 615. For example, the PDSCH 620 may be associated with CORESET pool index value 0 if the scheduling DCI 615 is received in a first CORESET, or the PDSCH 620 may be associated with CORESET pool index value 1 if the scheduling DCI 615 is received in a second CORESET. For example, if the UE 115 is not provided a CORESET pool index for an active downlink bandwidth part of a serving cell or is provided CORESET pool index with value 0 for one or more first CORESETs, and the UE 115 is provided CORESET pool index with value 1 for one or more second CORESETs, and the UE 115 is configured for joint feedback, the serving cell may be counted two times, where the first time corresponds to the first group of CORESETs and the second time corresponds to the second group of CORESETs.

In some cases, the UE 115 may indicate support for being scheduled with multiple PDSCH per PMO per cell. For example, the UE 115 may send a UE capability to a base station 105 indicating support for being scheduled for multiple PDSCH on a component carrier during a single PMO. In some cases, the UE 115 may indicate support for "PDSCH-Number-perMOperCell" to the base station 105. In some cases, the UE 115 may indicate a number of PDSCHs 620 the UE 115 can be scheduled with per component carrier 605 per PMO 610, or $N_{PDSCH}^{MO}$.

In the example of joint feedback scheme 600, the UE 115 may not be provided a CORESET pool index for an active downlink BWP of a serving cell, or the UE 115 may be provided CORESET pool index with value 0 for one or more first CORESETs. Additionally, the UE 115 may be provided CORESET pool index with value 1 for one or more second CORESETs. The UE 115 may receive, during a PMO 610, DCI 615-a through DCI 615-d on component carrier 605-a and receive DCI 615-e and DCI 615-f on component carrier 605-b. DCI 615-a, DCI 615-b, DCI 615-e, and DCI 615-f may be associated with a control resource pool index with value 0, and DCI 615-c and DCI 615-d may be associated with a CORESET pool index with value 1.

There may be a total number of DCIs 615 scheduling the same component carrier 605, such as the component carrier 605 with both values of the CORESET pool index, in the same PMO 610. In a first example, there may be up to twice as many DCIs as indicated by the UE capability. For example, the UE 115 may indicate support for "PDSCH-Number-perMOperCell," which may indicate the UE capability to enable ordering the DAIs with respect to PDSCH start time for the same component carrier and same PMO. Additionally, or alternatively, the UE 115 may indicate a number of PDSCHs that can be scheduled at the same PMO for the same component carrier, which may be denoted by $N_{PDSCH}^{MO}$. In a first example, there may be up to 2* $N_{PDSCH}^{MO}$ DCIs scheduling the same component carrier 605 in the same PMO 610 for the component carrier 605 with both CORESET pool index values. For example, the number $N_{PDSCH}^{MO}$ indicated through UE capability signaling may correspond to the number PDSCHs associated with a given value of CORESET pool index that can be scheduled per component carrier during the same PMO.

In an example, $PN_{PDSCH}^{MO}$ may be 2. Therefore, there may be up to 4 DCIs 615 scheduling the same component carrier 605 in the same PMO 610. In an example illustrated by the joint feedback scheme 600, DCI 615-a through DCI 615-d (e.g., 4 DCIs 615) may be received during PMO 610 and schedule PDSCH 620-a through PDSCH 620-d, respectively, in component carrier 605-a. DCI 615-a and DCI 615-b may be associated with CORESET pool index 0, and DCI 615-c and DCI 615-d may be associated with CORESET pool index 1, so component carrier 605-a may have both values of CORESET pool indices.

In some cases, DAI may be ordered based on a total number of DCI scheduling the same component carrier 605 in the same PMO 610. For example, DAI may be ordered first in increasing order of PDSCH start time for the same CORESET pool index, same component carrier 605, and same PMO 610, then DAI may be ordered in increasing order of CORESET pool index value for the same component carrier 605 and same PMO 610, then DAI may be ordered in increasing order of component carrier index for the same PMO 610, then DAI may be ordered in increasing order of PMO index. Component carrier 605-a, with both values of CORESET pool indices, may be counted 2*$N_{PDSCH}^{MO}$ times for creating the HARQ ACK codebook in a given PMO.

For example, for CORESET pool index 0 in component carrier 605-a, PDSCH 620-a may occur earlier than PDSCH 620-b, so DCI 615-a may be associated with a first DAI 630-a and DCI 615-b may be associated with a second DAI 630-b. After the DAI for CORESET pool index 0 in component carrier 605-a for PMO 610 have been ordered, the DAI for CORESET pool index 1 in component carrier 605-a for PMO 610 may be ordered. In component carrier 605-a, PDSCH 620-c may occur before PDSCH 620-d, so DCI 615-c may be associated with a third DAI 630-c and DCI 615-d may be associated with a fourth DAI 630-d. After the DAI in component carrier 605-a have been ordered, DAI in component carrier 605-b may be ordered. PDSCH 620-e and PDSCH 620-f may both be associated with CORESET pool index 0, but PDSCH 620-e may occur before PDSCH 620-f in the time domain. Therefore, DCI 615-e may be associated with a fifth DAI 630-e, and DCI 615-f may be associated with a sixth DAI 630-f. The UE 115 may generate the HARQ ACK codebook by setting bits in the codebook with HARQ ACK feedback for PDSCH 620 scheduled by the associated DCI 615 and transmit the HARQ ACK codebook on PUCCH 625.

Figure 7:
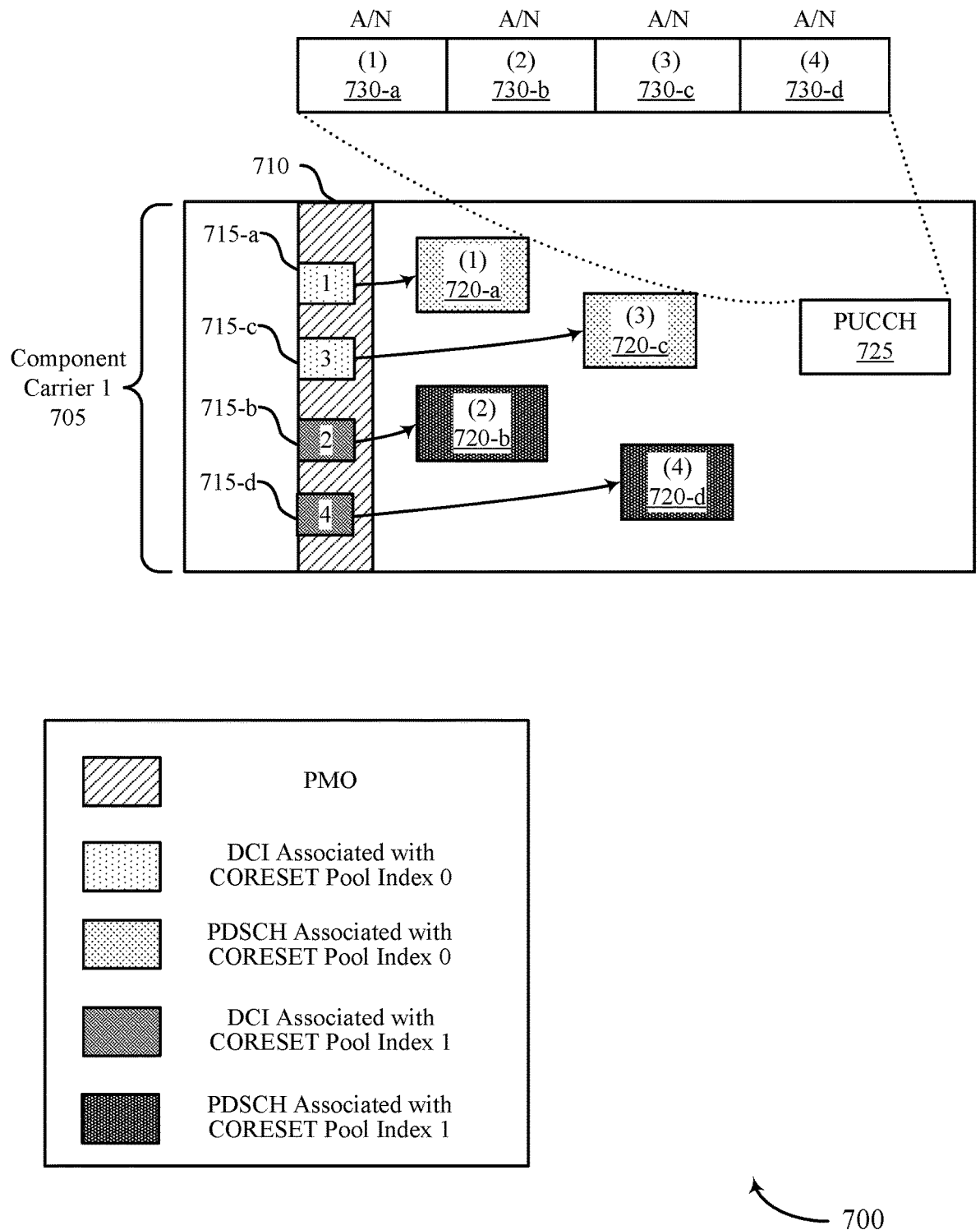

FIG. 7 illustrates an example of a joint feedback scheme 700 that supports feedback schemes for multiple component carrier scheduling and joint feedback reporting in accordance with aspects of the present disclosure. In some examples, joint feedback scheme 700 may implement aspects of wireless communication system 100.

As described with reference to FIG. 6, a UE 115 may be configured for joint feedback reporting for multiple CORESET pools. The UE 115 may indicate support for being scheduled with multiple PDSCH per PMO per cell. For example, the UE 115 may send a UE capability to a base station 105 indicating support for being scheduled for multiple PDSCH on a component carrier during a single PMO. In some cases, the UE 115 may indicate support for ordering the DAIs with respect to PDSCH start time for the same component carrier and same PMO to the base station 105 (e.g., by indicating a UE capability). In some cases, the UE 115 may indicate a number of PDSCHs 720 the UE 115 can be scheduled with per component carrier 705 per PMO 710. In other words, the number $N_{PDSCH}^{MO}$ indicated through UE capability signaling is interpreted as the total number PDSCHs associated with both values of CORESET pool index that can be scheduled per component during the same PMO, and not per CORESET index value.

In the example of joint feedback scheme 700, the UE 115 may not be provided a CORESET pool index for an active downlink bandwidth part of a serving cell, or the UE 115 may be provided CORESET pool index with value 0 for one or more first CORESETs. Additionally, the UE 115 may be provided a CORESET pool index with value 1 for one or more second CORESETs. The UE 115 may receive, during a PMO 710, DCI 715-a through DCI 715-d on a component carrier 705. DCI 715-a and DCI 715-c may be associated with a control resource pool index with value 0, and DCI 715-b, and DCI 715-d may be associated with a CORESET pool index with value 1.

There may be a total number of DCIs 715 scheduling the same component carrier 705, such as the component carrier 705 with both values of the CORESET pool index, in the same PMO 710. A first example may be described with reference to FIG. 6. In a second example, there may be up to as many DCIs as indicated by the UE. For example, the UE 115 may indicate support for "PDSCH-Number-perMO-perCell," and there may be up to $N_{PDSCH}^{MO}$ DCIs scheduling the same component carrier 705 in the same PMO 710 for the component carrier 705 with both CORESET pool index values. In this example, two PDSCHs 720 associated with different CORESET pool index values may have a same starting point.

In an example, $N_{PDSCH}^{MO}$ may be 4. Therefore, there may be up to 4 DCIs 715 scheduling the same component carrier 705 in the same PMO 710. In an example illustrated by the joint feedback scheme 700, DCI 715-a through DCI 715-d (e.g., 4 DCIs 715) may be received during PMO 710 and schedule PDSCH 720-a through PDSCH 720-d, respectively, in component carrier 705. DCI 715-a and DCI 715-c may be associated with CORESET pool index 0, and DCI 715-b and DCI 715-d may be associated with CORESET pool index 1, so component carrier 705 may have both values of CORESET pool indices.

In some cases, DAI may be ordered based on a total number of DCI scheduling the same component carrier 705 in the same PMO 710. For example, DAI may be ordered first in increasing order of CORESET pool index value for the same PDSCH start time, the same component carrier 705, and same PMO 710, then DAI may be ordered in increasing order of PDSCH starting time for the same component carrier 705 and same PMO 710, then DAI may be ordered in increasing order of component carrier index for the same PMO 710, then DAI may be ordered in increasing order of PMO index. Component carrier 705, with both values of CORESET pool indices, may be counted $N_{PDSCH}^{MO}$ times for creating the HARQ ACK codebook in a given PMO 710.

For example, PDSCH 720-a and PDSCH 720-b may have a same start time and be scheduled on the same component carrier 705 during the same PMO 710, but PDSCH 720-a may be associated with the smaller CORESET pool index value. Therefore, DCI 715-a may be associated with a first DAI 730-a, and DCI 715-b may be associated with a second DAI 730-b. PDSCH 720-c may have the next earliest PDSCH start time, so DCI 715-c may be associated with a third DAI 730-c and DCI 715-d may be associated with a fourth DAI 730-d. The UE 115 may generate the HARQ ACK codebook by setting bits in the codebook with HARQ ACK feedback for PDSCH 720 scheduled by the associated DCI 715 and transmit the HARQ ACK codebook on PUCCH 725.

Figure 8:
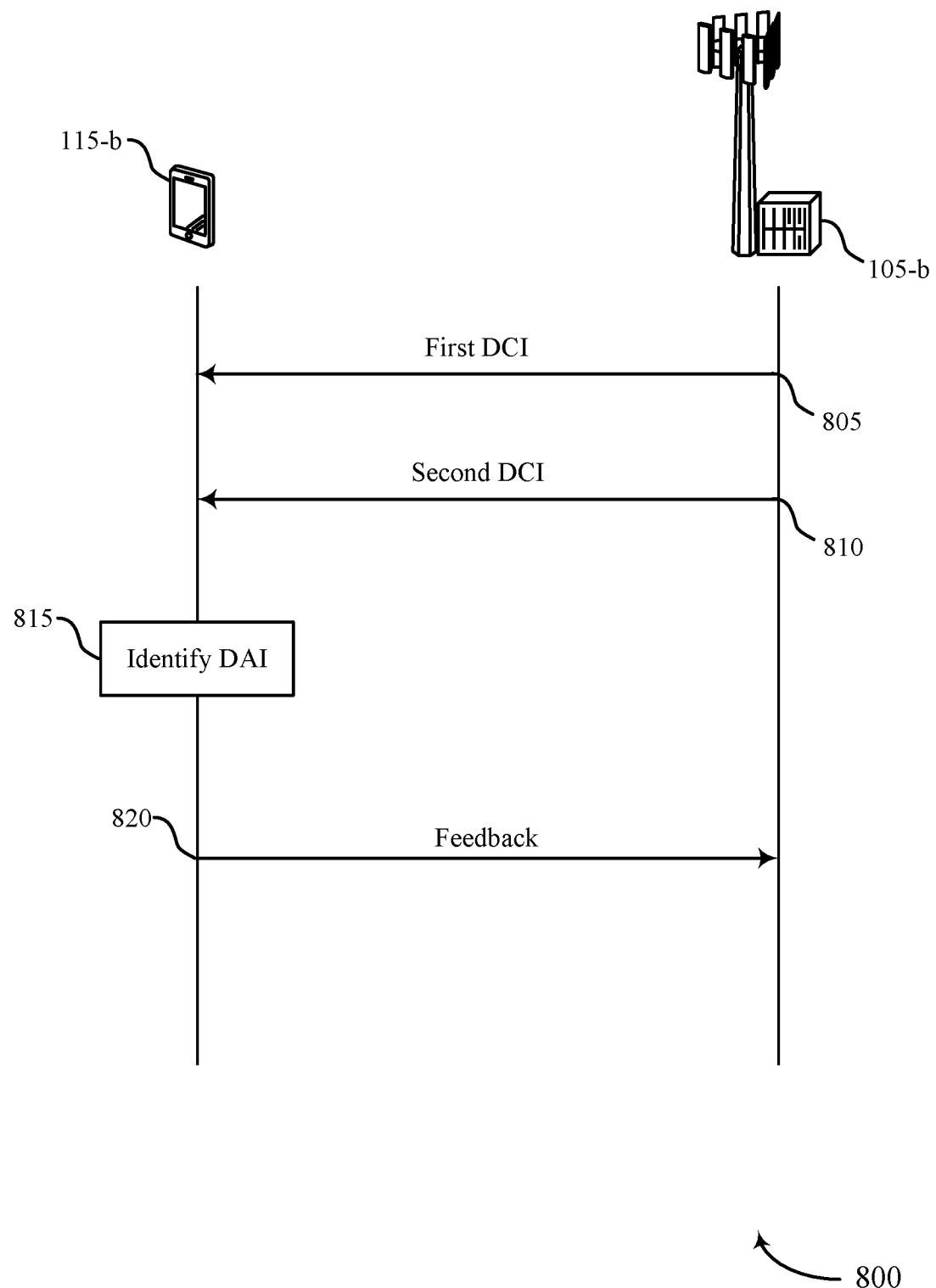
FIGS. 8 and 9 illustrate examples of process flows that support feedback schemes for multiple component carrier scheduling and joint feedback reporting in accordance with aspects of the present disclosure.

FIG. 8 illustrates an example of a process flow 800 that supports feedback schemes for multiple component carrier scheduling and joint feedback reporting in accordance with aspects of the present disclosure. In some examples, the process flow 800 may implement aspects of wireless communication system 100. The process flow 800 may be implemented by UE 115-b, base station 105-b, or both, which may be examples of a UE 115 and a base station 105 described with reference to FIGS. 1 and 2.

At 805, UE 115-b may receive, from base station 105-b during a PMO, first DCI scheduling UE 115-b for a first PDSCH resource on a first component carrier and for a second PDSCH resource on a second component carrier. At 810, UE 115-b may receive, from base station 105-b during the PMO, second DCI scheduling UE 115-b for a third PDSCH resource on the second component carrier. UE 115-b may monitor for data from base station 105-b during the first, second, and third PDSCH resources.

At 815, UE 115-b may identify a set of DAIs for the first DCI and the second DCI, where the first DCI has one or more DAIS whose values are based on the first DCI scheduling PDSCH resources on different component carriers.

In some cases, UE 115-b may generate a HARQ ACK codebook whose order is based on the set of DAIs. At 820, UE 115-b may transmit feedback (e.g., including the codebook) based on the set of DAIs.

Figure 9:
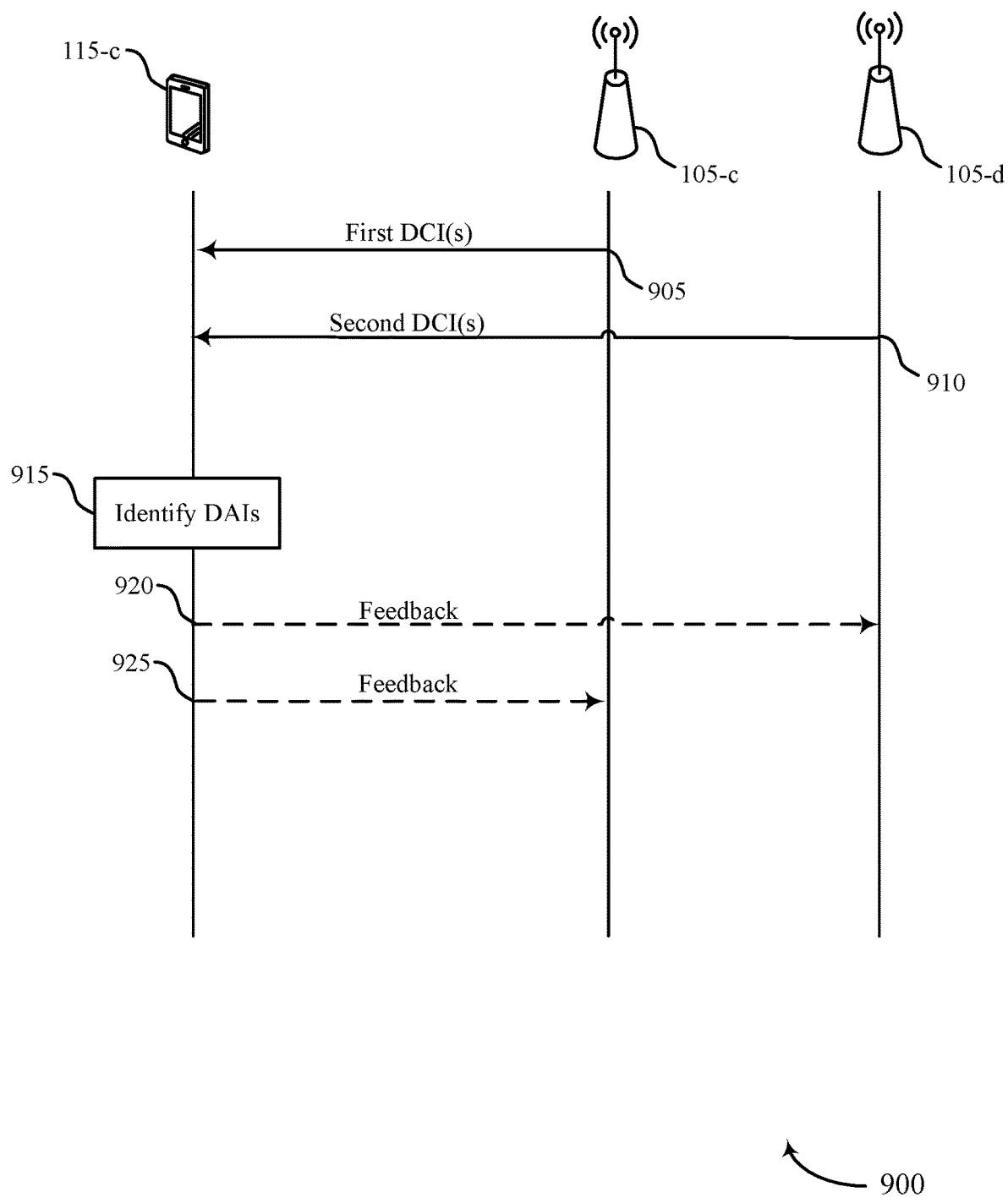

FIG. 9 illustrates an example of a process flow 900 that supports feedback schemes for multiple component carrier scheduling and joint feedback reporting in accordance with aspects of the present disclosure. In some examples, process flow 900 may implement aspects of wireless communication system 100. The process flow 900 may be implemented by UE 115-c, TRP 105-c, TRP 105-d, or any combination thereof. UE 115-c may be an example of a UE 115 described with reference to FIGS. 1 and 2. In some cases, TRP 105-c and TRP 105-d may each be an example of a base station 105 described with reference to FIGS. 1 and 2, or TRP 105-c and TRP 105-d may be examples of TRPs of a base station 105. For example, TRP 105-c and TRP 105-d may separate transmitters and receivers, which may convey communications for a base station 105.

At 905, UE 115-c may receive, during a PMO, one or more first DCI scheduling UE 115-c for a corresponding one or more first PDSCH resources on a first component carrier, the one or more first DCI associated with a first CORESET pool index. At 910, UE 115-c may receive, during the PMO, one or more second DCI scheduling the UE for a corresponding one or more second PDSCH resources on the first component carrier, the one or more second DCI associated with a second CORESET pool index. In some cases, the first CORESET pool index may be associated with TRP 105-c, and the second CORESET pool index may be associated with TRP 105-d.

At 915, UE 115-c may identifying a set of DAIs for the one or more first DCI and the one or more second DCI, where values of the set of DAIs are based on the one or more first DCI and the one or more second DCI both schedule PDSCH resources on a same component carrier.

UE 115-c may transmit feedback based on the set of DAIs. For example, UE 115-c may generate a HARQ ACK codebook including feedback for the set of PDSCH resources. In some cases, at 920, UE 115-c may transmit the feedback to TRP 105-c. Additionally, or alternatively, UE 115-c may transmit the feedback to TRP 105-d.

Figure 10:
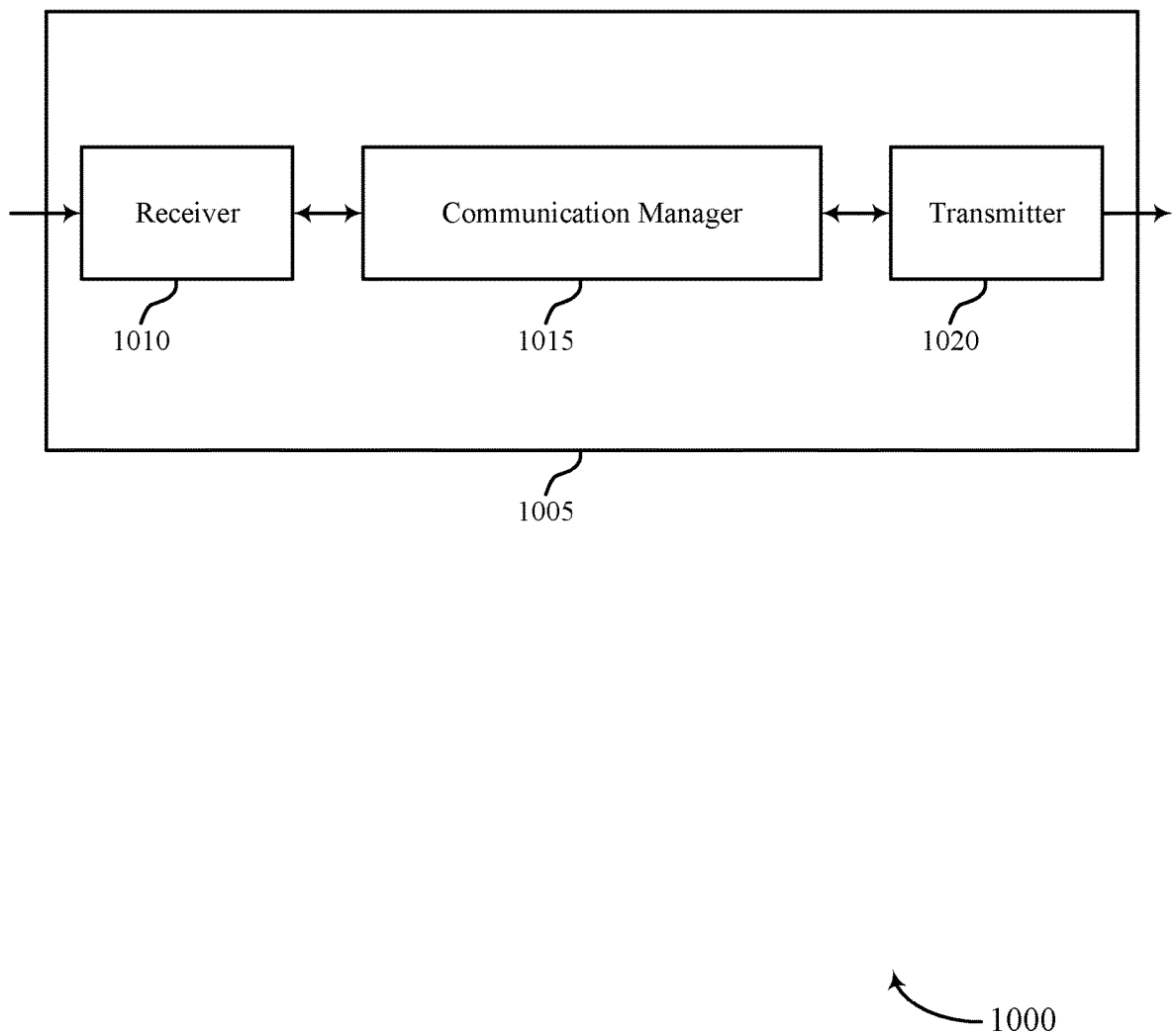
FIGS. 10 and 11 show block diagrams of devices that support feedback schemes for multiple component carrier scheduling and joint feedback reporting in accordance with aspects of the present disclosure.

FIG. 10 shows a block diagram 1000 of a device 1005 that supports feedback schemes for multiple component carrier scheduling and joint feedback reporting in accordance with aspects of the present disclosure. The device 1005 may be an example of aspects of a UE 115 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to feedback schemes for multiple component carrier scheduling and joint feedback reporting, etc.). Information may be passed on to other components of the device 1005. The receiver 1010 may be an example of aspects of the transceiver 1315 described with reference to FIG. 13. The receiver 1010 may utilize a single antenna or a set of antennas.

The communication manager 1015 may receive, from a base station during a PMO, first DCI scheduling the UE for a first PDSCH resource on a first component carrier and for a second PDSCH resource on a second component carrier, identify a set of DAIs for the first DCI and the second DCI, where the first DCI has one or more DAIs whose values are based on the first DCI scheduling PDSCH resources on different component carriers, transmit feedback based on the set of DAIs, and receive, during the PMO, second DCI scheduling the UE for a third PDSCH resource on the second component carrier. The communication manager 1015 may also receive, from a base station during a PMO, one or more first DCI scheduling the UE for a corresponding one or more first PDSCH resources on a first component carrier, the one or more first DCI associated with a first CORESET pool index, identify a set of DAIs for the one or more first DCI and the one or more second DCI, where values of the set of DAIs are based on the one or more first DCI and the one or more second DCI both scheduling PDSCH resources on a same component carrier, transmit feedback based on the set of DAIs, and receive, during the PMO, one or more second DCI scheduling the UE for a corresponding one or more second PDSCH resources on the first component carrier, the one or more second DCI associated with a second CORESET pool index. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communication manager 1015 in accordance with examples described herein, the device 1005 (e.g., a processor controlling or otherwise coupled to the receiver 1010, the transmitter 1020, the communication manager 1015, or a combination thereof) may support techniques for reduced processing and reduced power consumption based on transmitting joint feedback for multiple DCI.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1315 described with reference to FIG. 13. The transmitter 1020 may utilize a single antenna or a set of antennas.

Figure 11:
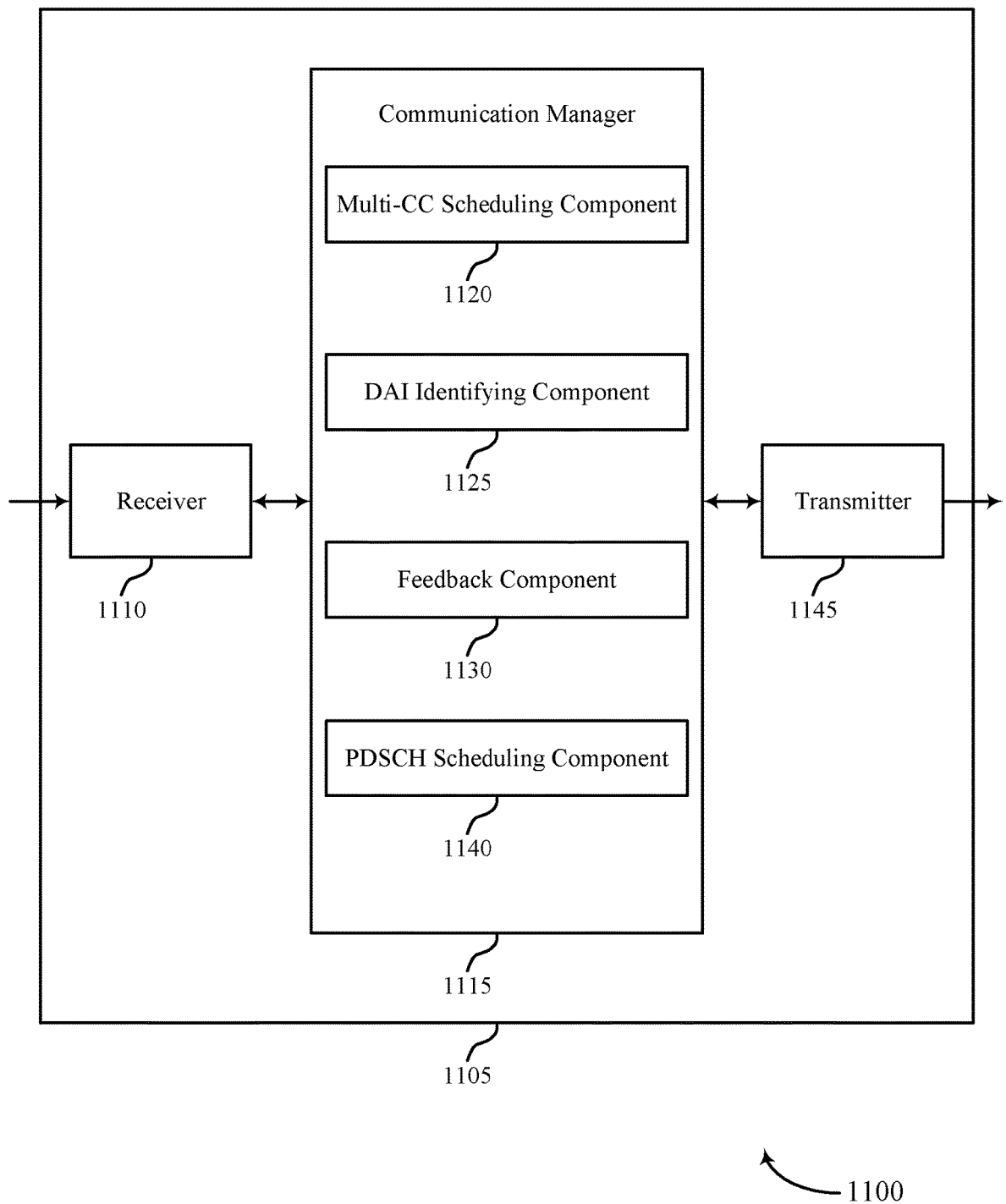

FIG. 11 shows a block diagram 1100 of a device 1105 that supports feedback schemes for multiple component carrier scheduling and joint feedback reporting in accordance with aspects of the present disclosure. The device 1105 may be an example of aspects of a device 1005, or a UE 115 as described herein. The device 1105 may include a receiver 1110, a communication manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback schemes for multiple component carrier scheduling and joint feedback reporting, etc.). Information may be passed on to other components of the device 1105. The receiver 1110 may be an example of aspects of the transceiver 1315 described with reference to FIG. 13. The receiver 1110 may utilize a single antenna or a set of antennas.

The communication manager 1115 may be an example of aspects of the communication manager 1015 as described herein. The communication manager 1115 may include a multi-CC scheduling component 1120, a DAI identifying component 1125, a feedback component 1130, and a PDSCH scheduling component 1140. The communication manager 1115 may be an example of aspects of the communication manager 1310 described herein.

The multi-CC scheduling component 1120 may receive, from a base station during a PMO, first DCI scheduling the UE for a first PDSCH resource on a first component carrier and for a second PDSCH resource on a second component carrier. The multi-CC scheduling component 1120 may receive, from a base station during a PMO, one or more first DCI scheduling the UE for a corresponding one or more first PDSCH resources on a first component carrier, the one or more first DCI associated with a first CORESET pool index.

The DAI identifying component 1125 may identify a set of DAIs for the first DCI and the second DCI, where the first DCI has one or more DAIs whose values are based on the first DCI scheduling PDSCH resources on different component carriers. The DAI identifying component 1125 may identify a set of DAIs for the one or more first DCI and the one or more second DCI, where values of the set of DAIs are based on the one or more first DCI and the one or more second DCI both scheduling PDSCH resources on a same component carrier.

The PDSCH scheduling component 1140 may receive, during the PMO, second DCI scheduling the UE for a third PDSCH resource on the second component carrier. The PDSCH scheduling component 1140 may receive, during the PMO, one or more second DCI scheduling the UE for a corresponding one or more second PDSCH resources on the first component carrier, the one or more second DCI associated with a second CORESET pool index.

The feedback component 1130 may transmit feedback based on the set of DAIs.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1315 described with reference to FIG. 13. The transmitter 1145 may utilize a single antenna or a set of antennas.

Figure 12:
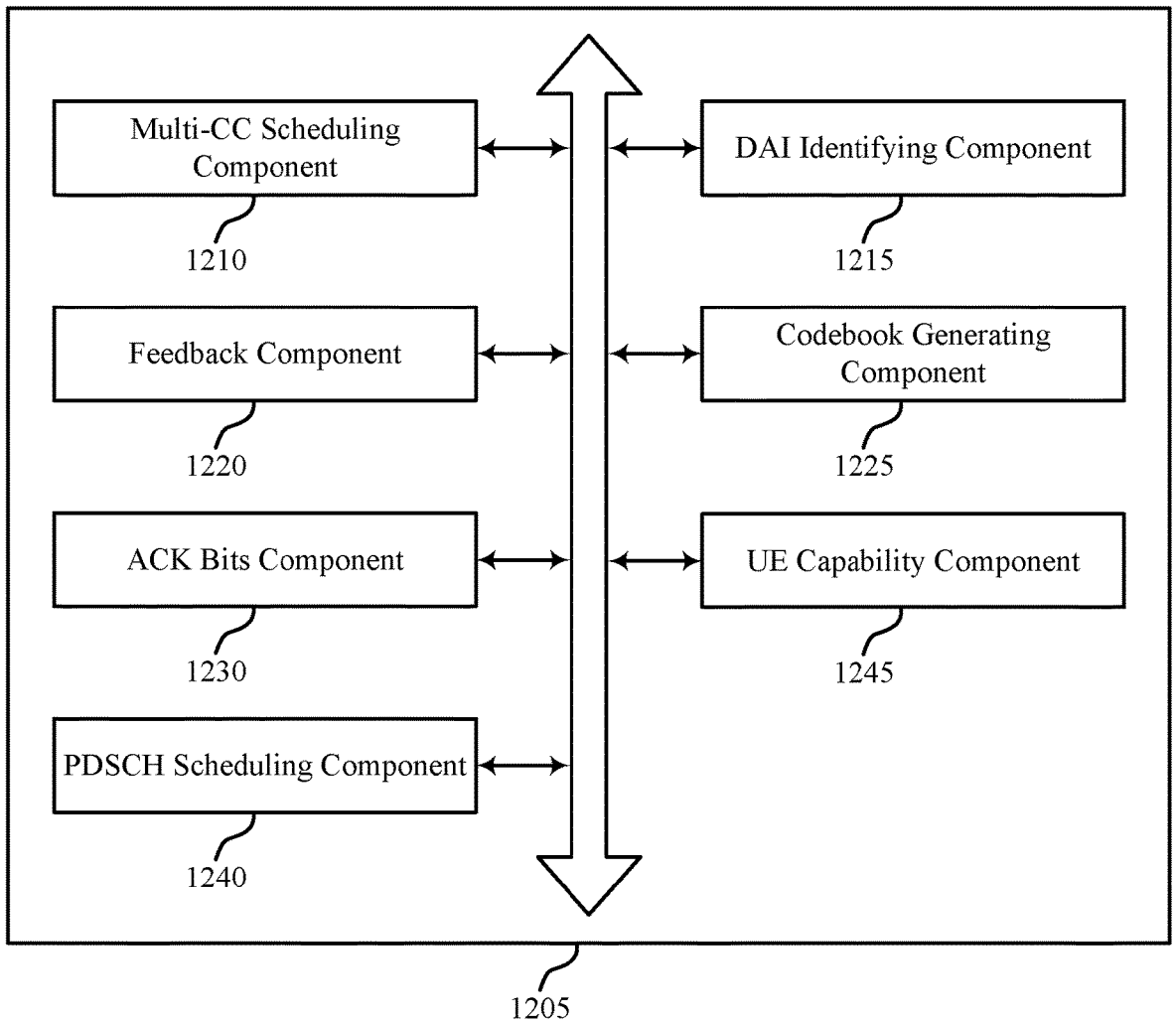
FIG. 12 shows a block diagram of a communication manager that supports feedback schemes for multiple component carrier scheduling and joint feedback reporting in accordance with aspects of the present disclosure.

FIG. 12 shows a block diagram 1200 of a communication manager 1205 that supports feedback schemes for multiple component carrier scheduling and joint feedback reporting in accordance with aspects of the present disclosure. The communication manager 1205 may be an example of aspects of a communication manager 1015, a communication manager 1115, or a communication manager 1310 described herein. The communication manager 1205 may include a multi-CC scheduling component 1210, a DAI identifying component 1215, a feedback component 1220, a codebook generating component 1225, an ACK bits component 1230, a PDSCH scheduling component 1240, and a UE capability component 1245. Each of these modules may communicate, directly or indirectly, with one another (e.g., via one or more buses).

The multi-CC scheduling component 1210 may receive, from a base station during a PMO, first DCI scheduling the UE for a first PDSCH resource on a first component carrier and for a second PDSCH resource on a second component carrier.

In some examples, the multi-CC scheduling component 1210 may receive, from a base station during a PMO, one or more first DCI scheduling the UE for a corresponding one or more first PDSCH resources on a first component carrier, the one or more first DCI associated with a first CORESET pool index.

The DAI identifying component 1215 may identify a set of DAIs for the first DCI and the second DCI, where the first DCI has one or more DAIs whose values are based on the first DCI scheduling PDSCH resources on different component carriers. In some examples, the DAI identifying component 1215 may identify a set of DAIs for the one or more first DCI and the one or more second DCI, where values of the set of DAIs are based on the one or more first DCI and the one or more second DCI both scheduling PDSCH resources on a same component carrier. In some examples, the DAI identifying component 1215 may determine a first associated component carrier index for the first DCI based on a highest component carrier index of the first component carrier and the second component carrier. In some examples, the DAI identifying component 1215 may determine a first associated component carrier index for the first DCI based on a lowest component carrier index of the first component carrier and the second component carrier. In some examples, the DAI identifying component 1215 may determine that a first associated component carrier index for the first DCI and a second associated component carrier index for the second DCI are a same associated component carrier index based on the second PDSCH resource and the third PDSCH resource being scheduled on the second component carrier.

In some examples, the DAI identifying component 1215 may determine a first DAI for the first DCI and a second DAI for the second DCI based on a time domain order of the second PDSCH resource and the third PDSCH resource. In some examples, the DAI identifying component 1215 may determine a first DAI for the first DCI corresponds to a first component carrier index associated with the first component carrier based on the first PDSCH resource. In some examples, the DAI identifying component 1215 may determine a second DAI for the second DCI corresponds to a second component carrier index associated with the second component carrier based on the third PDSCH resource. In some examples, the DAI identifying component 1215 may determine a first DAI for the first DCI associated with the first component carrier and the first PDSCH resource. In some examples, the DAI identifying component 1215 may determine a second DAI for the first DCI associated with the second component carrier and the second PDSCH resource.

In some examples, the DAI identifying component 1215 may determine a third DAI for the second DCI associated with the second component carrier and the third PDSCH resource. In some examples, the DAI identifying component 1215 may receive, during the PMO, a third DCI scheduling the UE for a fourth PDSCH resource on the first component carrier. In some examples, the DAI identifying component 1215 may determine a fourth DAI for the third DCI associated with the first component carrier and the fourth PDSCH resource, where the fourth DAI and the first DAI are based on a temporal ordering of the first PDSCH resource and the fourth PDSCH resource. In some examples, the DAI identifying component 1215 may determine an ordering for the set of DAIS based on a temporal ordering of the PDSCH resources associated with a same CORESET pool index on the same component carrier scheduled during the PMO, then based on a CORESET pool index ordering on the same component carrier scheduled during the PMO, then based on a component carrier index ordering for the PMO, then based on a PMO ordering. In some examples, the DAI identifying component 1215 may determine an ordering for the set of DAIS based on a CORESET pool index ordering for the PDSCH resources having a common starting resource in a time domain on the same common component carrier scheduled during the PMO, then based on a temporal ordering of the PDSCH resources on the same component carrier scheduled during the PMO, then based on a component carrier index ordering for component carriers scheduled during the PMO, then based on a PMO index ordering.

The feedback component 1220 may transmit feedback based on the set of DAIS.

The PDSCH scheduling component 1240 may receive, during the PMO, second DCI scheduling the UE for a third PDSCH resource on the second component carrier. In some examples, the PDSCH scheduling component 1240 may receive, during the PMO, one or more second DCI scheduling the UE for a corresponding one or more second PDSCH resources on the first component carrier, the one or more second DCI associated with a second CORESET pool index. In some examples, the PDSCH scheduling component 1240 may determine the one or more first DCI allocate one or more third PDSCH resources in a second component carrier.

The codebook generating component 1225 may generate a HARQ ACK codebook whose order is based on the set of DAIS.

The ACK bits component 1230 may determine a set of ACK or NACK bits for each DAI of the set of DAIs. In some examples, the ACK bits component 1230 may determine feedback values for the set of ACK or NACK bits of a first DAI associated with the first DCI based on the first DCI scheduling a set of PDSCH resources, each of the set of ACK or NACK bits of the first DAI corresponding to a different one of the first PDSCH resource and the second PDSCH resource. In some examples, the ACK bits component 1230 may determine a first feedback value for a first bit of the set of ACK or NACK bits of a second DAI associated with the second DCI based on the second DCI scheduling a single PDSCH resource. In some examples, the ACK bits component 1230 may include a NACK for a second bit of the set of ACK or NACK bits of the second DAI associated with the second DCI.

The UE capability component 1245 may transmit, to a base station, a UE capability associated with a number of PDSCH resources per PMO per cell, the number of PDSCH resources per PMO per cell, or both.

Figure 13:
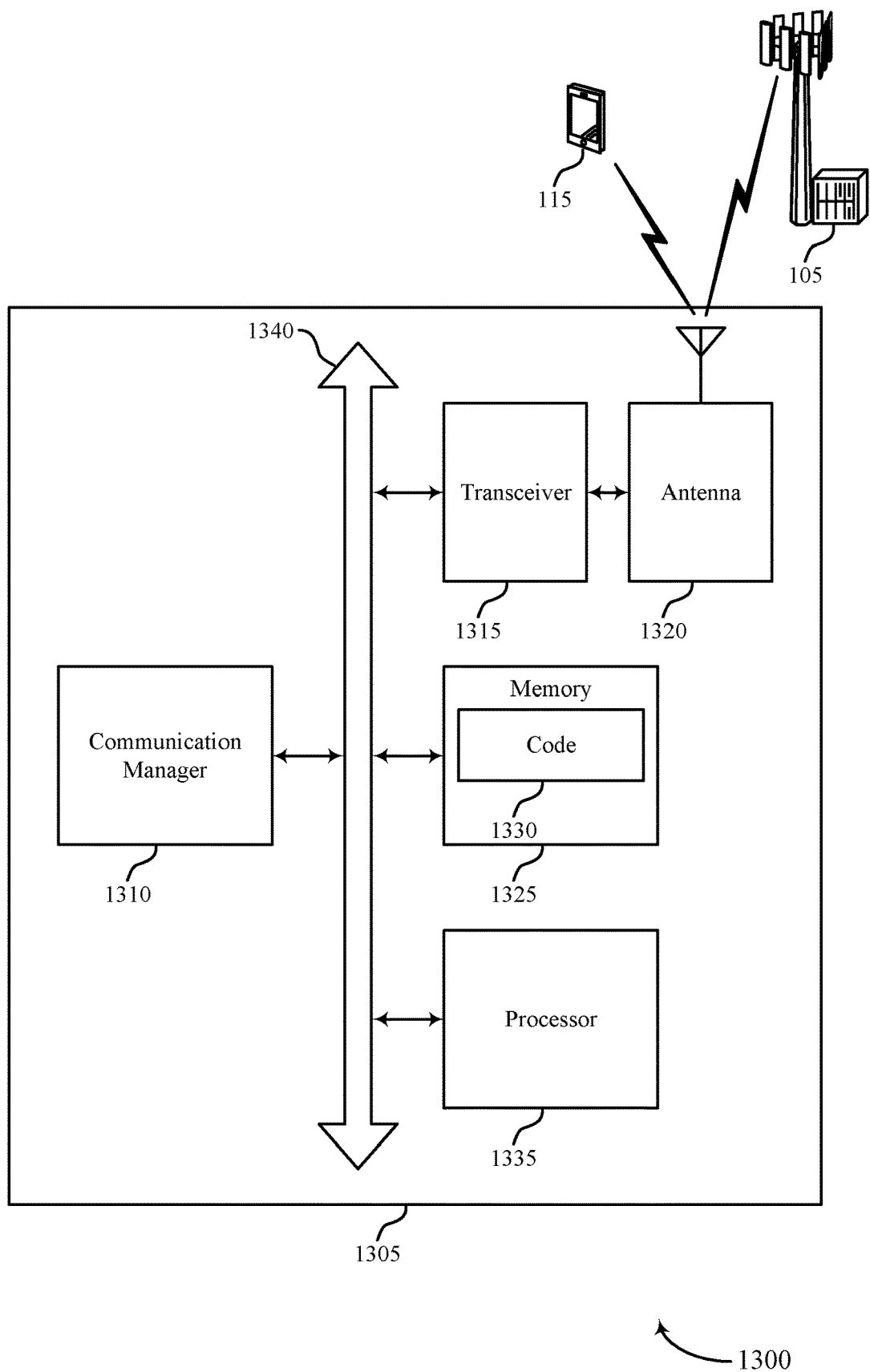
FIG. 13 shows a diagram of a system including a device that supports feedback schemes for multiple component carrier scheduling and joint feedback reporting in accordance with aspects of the present disclosure.

FIG. 13 shows a diagram of a system 1300 including a device 1305 that supports feedback schemes for multiple component carrier scheduling and joint feedback reporting in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communication manager 1310, a transceiver 1315, an antenna 1320, memory 1325, and a processor 1335. These components may be in electronic communication via one or more buses (e.g., bus 1340).

The communication manager 1310 may receive, from a base station during a PMO, first DCI scheduling the UE for a first PDSCH resource on a first component carrier and for a second PDSCH resource on a second component carrier, identify a set of DAIs for the first DCI and the second DCI, where the first DCI has one or more DAIs whose values are based on the first DCI scheduling PDSCH resources on different component carriers, transmit feedback based on the set of DAIs, and receive, during the PMO, second DCI scheduling the UE for a third PDSCH resource on the second component carrier. The communication manager 1310 may also receive, from a base station during a PMO, one or more first DCI scheduling the UE for a corresponding one or more first PDSCH resources on a first component carrier, the one or more first DCI associated with a first CORESET pool index, identify a set of DAIs for the one or more first DCI and the one or more second DCI, where values of the set of DAIs are based on the one or more first DCI and the one or more second DCI both scheduling PDSCH resources on a same component carrier, transmit feedback based on the set of DAIs, and receive, during the PMO, one or more second DCI scheduling the UE for a corresponding one or more second PDSCH resources on the first component carrier, the one or more second DCI associated with a second CORESET pool index.

The transceiver 1315 may communicate bi-directionally, via one or more antennas, wired, or wireless links as described above. For example, the transceiver 1315 may represent a wireless transceiver and may communicate bi-directionally with another wireless transceiver. The transceiver 1315 may also include a modem to modulate the packets and provide the modulated packets to the antennas for transmission, and to demodulate packets received from the antennas.

In some cases, the wireless device may include a single antenna 1320. However, in some cases the device may have more than one antenna 1320, which may be capable of concurrently transmitting or receiving multiple wireless transmissions.

The memory 1325 may include random-access memory (RAM) and read-only memory (ROM). The memory 1325 may store computer-readable, computer-executable code 1330 including instructions that, when executed, cause the processor to perform various functions described herein. In some cases, the memory 1325 may contain, among other things, a basic I/O system (BIOS) which may control basic hardware or software operation such as the interaction with peripheral components or devices.

The code 1330 may include instructions to implement aspects of the present disclosure, including instructions to support wireless communications. The code 1330 may be stored in a non-transitory computer-readable medium such as system memory or other type of memory. In some cases, the code 1330 may not be directly executable by the processor 1335 but may cause a computer (e.g., when compiled and executed) to perform functions described herein.

The processor 1335 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1335 may be configured to operate a memory array using a memory controller. In other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting feedback schemes for multiple component carrier scheduling and joint feedback reporting).

Figure 14:
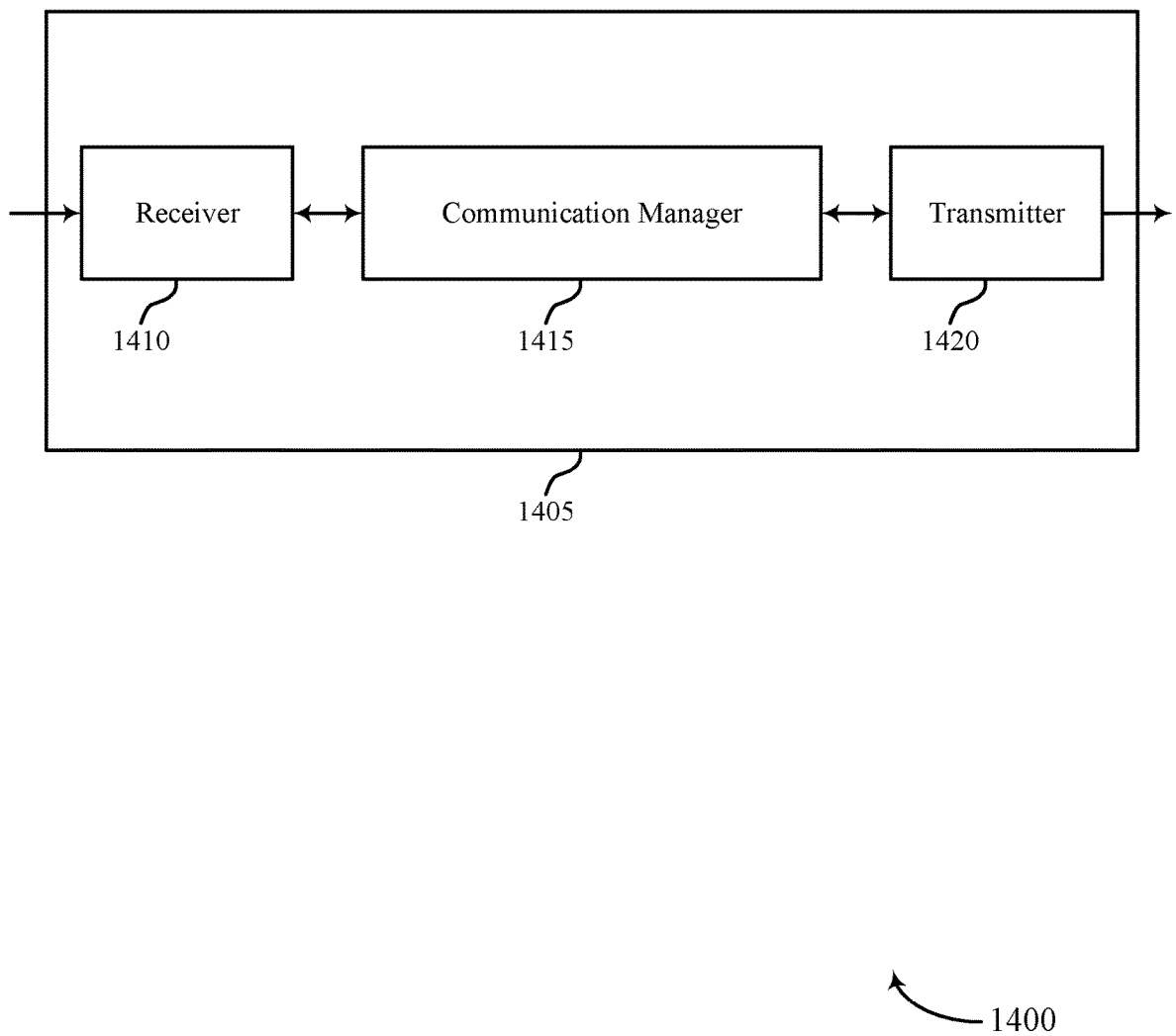
FIGS. 14 and 15 show block diagrams of devices that support feedback schemes for multiple component carrier scheduling and joint feedback reporting in accordance with aspects of the present disclosure.

FIG. 14 shows a block diagram 1400 of a device 1405 that supports feedback schemes for multiple component carrier scheduling and joint feedback reporting in accordance with aspects of the present disclosure. The device 1405 may be an example of aspects of a base station 105 as described herein. The device 1405 may include a receiver 1410, a communication manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to feedback schemes for multiple component carrier scheduling and joint feedback reporting, etc.). Information may be passed on to other components of the device 1405. The receiver 1410 may be an example of aspects of the transceiver 1720 described with reference to FIG. 17. The receiver 1410 may utilize a single antenna or a set of antennas.

The communication manager 1415 may transmit, during a PMO, a first DCI scheduling a UE for a first PDSCH resource on a first component carrier and a second PDSCH resource on a second component carrier, transmit, during the PMO, a second DCI scheduling the UE for a third PDSCH resource on the second component carrier, receive feedback for at least the first PDSCH resource, the second PDSCH resource, and the third PDSCH resource on a PUCCH, identify a set of DAIs for the first DCI and the second DCI, where the first DCI has one or more DAIs whose values are based on the first DCI scheduling PDSCH resources on different component carriers, and decode the feedback based on the set of DAIs. The communication manager 1415 may also transmit, to a UE during a PMO, one or more first DCI scheduling the UE for a corresponding one or more first PDSCH resources on a first component carrier, the one or more first DCI associated with a first CORESET pool index, transmit, during the PMO, one or more second DCI scheduling the UE for a corresponding one or more second PDSCH resources on the first component carrier, the one or more second DCI associated with a second CORESET pool index, receive feedback for the one or more first PDSCH resources and the one or more second PDSCH resources on a PUCCH, identify a set of DAIs for the one or more first DCI and the one or more second DCI, where values of the set of DAIs are based on the one or more first DCI and the one or more second DCI both scheduling PDSCH resources on a same component carrier, and decode the feedback based on the set of DAIs. The communication manager 1415 may be an example of aspects of the communication manager 1710 described herein.

The communication manager 1415, or its sub-components, may be implemented in hardware, code (e.g., software or firmware) executed by a processor, or any combination thereof. If implemented in code executed by a processor, the functions of the communication manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1415, or its sub-components, may be physically located at various positions, including being distributed such that portions of functions are implemented at different physical locations by one or more physical components. In some examples, the communication manager 1415, or its sub-components, may be a separate and distinct component in accordance with various aspects of the present disclosure. In some examples, the communication manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

By including or configuring the communication manager 1415 in accordance with examples described herein, the device 1405 (e.g., a processor controlling or otherwise coupled to the receiver 1410, the transmitter 1420, the communication manager 1415, or a combination thereof) may support techniques for more efficient utilization of communication resources based on transmitting joint feedback for multiple DCI.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
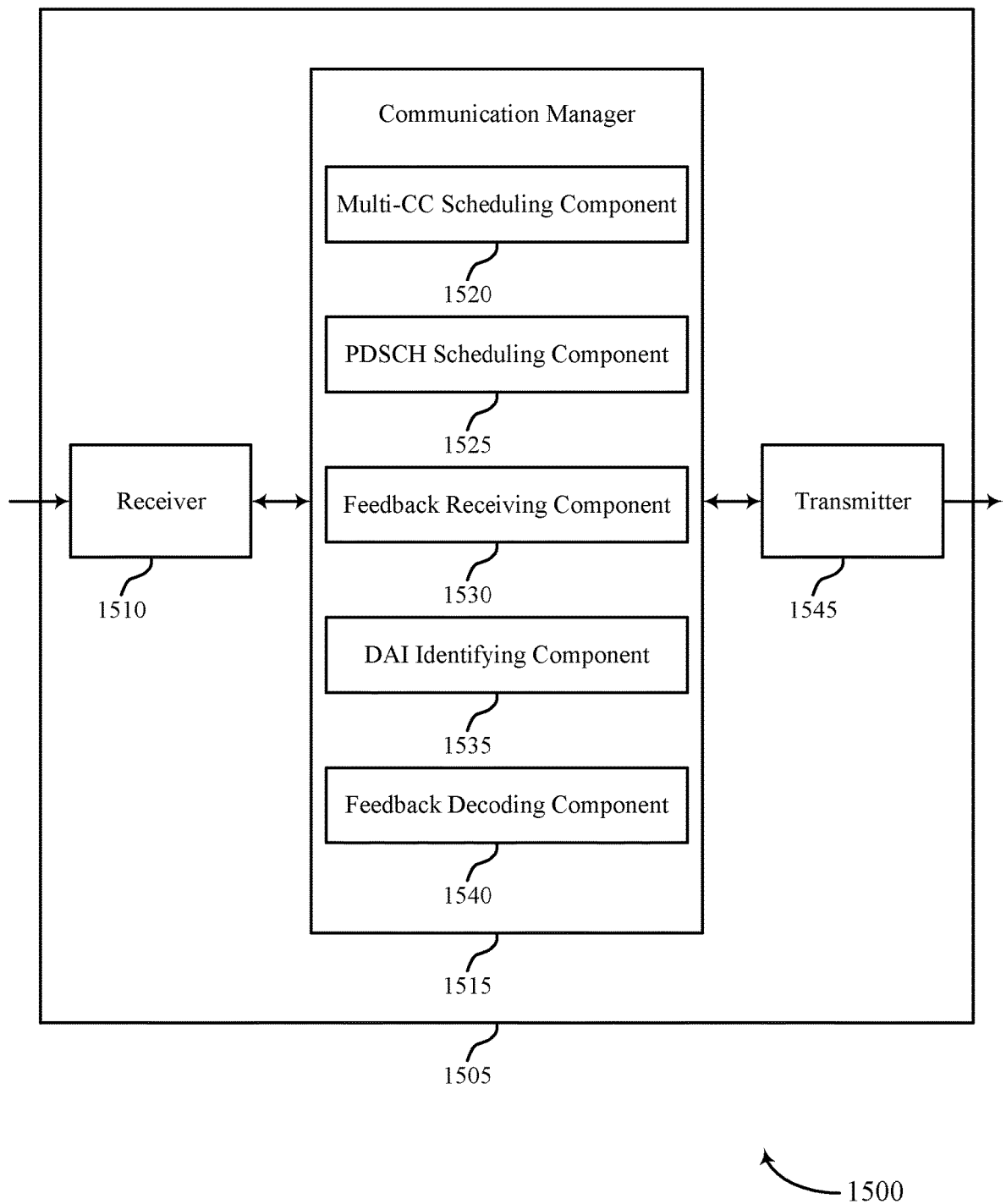

FIG. 15 shows a block diagram 1500 of a device 1505 that supports feedback schemes for multiple component carrier scheduling and joint feedback reporting in accordance with aspects of the present disclosure. The device 1505 may be an example of aspects of a device 1405, or a base station 105 as described herein. The device 1505 may include a receiver 1510, a communication manager 1515, and a transmitter 1545. The device 1505 may also include a processor. Each of these components may be in communication with one another (e.g., via one or more buses).

The receiver 1510 may receive information such as packets, user data, or control information associated with various information channels (e.g., control channels, data channels, and information related to feedback schemes for multiple component carrier scheduling and joint feedback reporting, etc.). Information may be passed on to other components of the device 1505. The receiver 1510 may be an example of aspects of the transceiver 1720 described with reference to FIG. 17. The receiver 1510 may utilize a single antenna or a set of antennas.

The communication manager 1515 may be an example of aspects of the communication manager 1415 as described herein. The communication manager 1515 may include a multi-CC scheduling component 1520, a PDSCH scheduling component 1525, a feedback receiving component 1530, a DAI identifying component 1535, and a feedback decoding component 1540. The communication manager 1515 may be an example of aspects of the communication manager 1710 described herein.

The multi-CC scheduling component 1520 may transmit, during a PMO, a first DCI scheduling a UE for a first PDSCH resource on a first component carrier and a second PDSCH resource on a second component carrier. The multi-CC scheduling component 1520 may transmit, to a UE during a PMO, one or more first DCI scheduling the UE for a corresponding one or more first PDSCH resources on a first component carrier, the one or more first DCI associated with a first CORESET pool index.

The PDSCH scheduling component 1525 may transmit, during the PMO, a second DCI scheduling the UE for a third PDSCH resource on the second component carrier. The PDSCH scheduling component 1525 may transmit, during the PMO, one or more second DCI scheduling the UE for a corresponding one or more second PDSCH resources on the first component carrier, the one or more second DCI associated with a second CORESET pool index.

The feedback decoding component 1540 may decode the feedback based on the set of DAIs.

The DAI identifying component 1535 may identify a set of DAIs for the first DCI and the second DCI, where the first DCI has one or more DAIs whose values are based on the first DCI scheduling PDSCH resources on different component carriers. The DAI identifying component 1535 may identify a set of DAIs for the one or more first DCI and the one or more second DCI, where values of the set of DAIs are based on the one or more first DCI and the one or more second DCI both scheduling PDSCH resources on a same component carrier.

The feedback receiving component 1530 may receive feedback for at least the first PDSCH resource, the second PDSCH resource, and the third PDSCH resource on a PUCCH. The feedback receiving component 1530 may receive feedback for the one or more first PDSCH resources and the one or more second PDSCH resources on a PUCCH.

The transmitter 1545 may transmit signals generated by other components of the device 1505. In some examples, the transmitter 1545 may be collocated with a receiver 1510 in a transceiver module. For example, the transmitter 1545 may be an example of aspects of the transceiver 1720 described with reference to FIG. 17. The transmitter 1545 may utilize a single antenna or a set of antennas.

Figure 16:
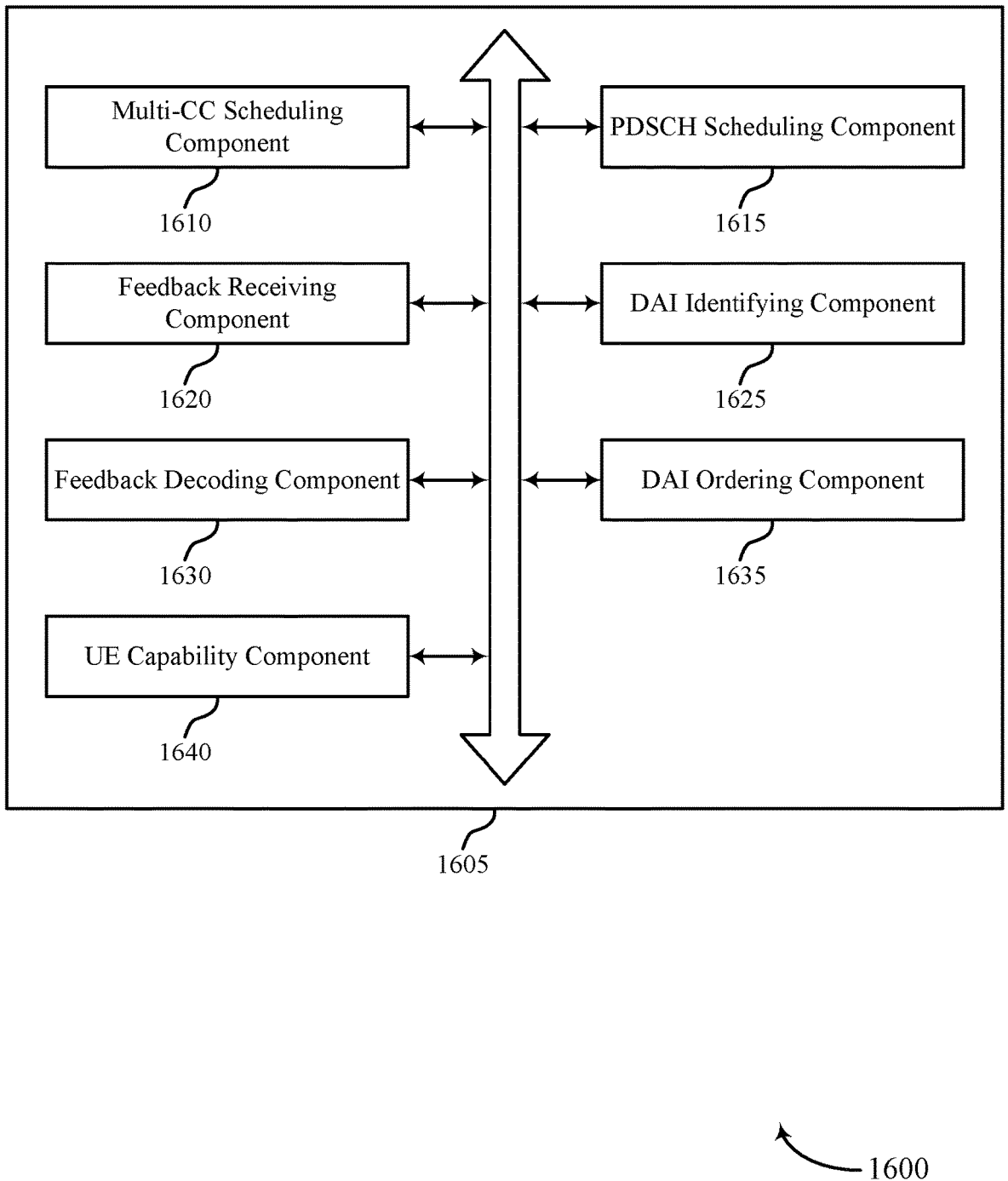
FIG. 16 shows a block diagram of a communication manager that supports feedback schemes for multiple component carrier scheduling and joint feedback reporting in accordance with aspects of the present disclosure.

FIG. 16 shows a block diagram 1600 of a communication manager 1605 that supports feedback schemes for multiple component carrier scheduling and joint feedback reporting in accordance with aspects of the present disclosure. The communication manager 1605 may be an example of aspects of a communication manager 1415, a communication manager 1515, or a communication manager 1710 described herein. The communication manager 1605 may include a multi-CC scheduling component 1610, a PDSCH scheduling component 1615, a feedback receiving component 1620, a DAI identifying component 1625, a feedback decoding component 1630, a DAI ordering component 1635, and a UE capability component 1640. Each of these modules may communicate, directly or indirectly, with one another (e.g., via one or more buses).

The multi-CC scheduling component 1610 may transmit, during a PMO, a first DCI scheduling a UE for a first PDSCH resource on a first component carrier and a second PDSCH resource on a second component carrier. In some examples, the multi-CC scheduling component 1610 may transmit, to a UE during a PMO, one or more first DCI scheduling the UE for a corresponding one or more first PDSCH resources on a first component carrier, the one or more first DCI associated with a first CORESET pool index.

The PDSCH scheduling component 1615 may transmit, during the PMO, a second DCI scheduling the UE for a third PDSCH resource on the second component carrier. In some examples, the PDSCH scheduling component 1615 may transmit, during the PMO, one or more second DCI scheduling the UE for a corresponding one or more second PDSCH resources on the first component carrier, the one or more second DCI associated with a second CORESET pool index. In some examples, the PDSCH scheduling component 1615 may determine the one or more first DCI allocate one or more third PDSCH resources on a second component carrier.

The feedback receiving component 1620 may receive feedback for at least the first PDSCH resource, the second PDSCH resource, and the third PDSCH resource on a PUCCH. In some examples, the feedback receiving component 1620 may receive feedback for the one or more first PDSCH resources and the one or more second PDSCH resources on a PUCCH.

The DAI identifying component 1625 may identify a set of DAIS for the first DCI and the second DCI, where the first DCI has one or more DAIS whose values are based on the first DCI scheduling PDSCH resources on different component carriers. In some examples, the DAI identifying component 1625 may identify a set of DAIS for the one or more first DCI and the one or more second DCI, where values of the set of DAIS are based on the one or more first DCI and the one or more second DCI both scheduling PDSCH resources on a same component carrier. In some examples, the DAI identifying component 1625 may determine a first associated component carrier index for the first DCI based on a highest component carrier index of the first component carrier and the second component carrier.

In some examples, the DAI identifying component 1625 may determine a first associated component carrier index for the first DCI based on a lowest component carrier index of the first component carrier and the second component carrier. In some examples, the DAI identifying component 1625 may determine a first associated component carrier index for the first DCI and a second associated component carrier index for the second DCI are a same associated component carrier index based on the second PDSCH resource and the third PDSCH resource being scheduled on the second component carrier. In some examples, the DAI identifying component 1625 may determine a first DAI for the first DCI and a second DAI for the second DCI based on a time domain order of the second PDSCH resource and the third PDSCH resource, where the feedback is decoded based on the first DAI and the second DAI.

In some examples, the DAI identifying component 1625 may determine a first DAI for the first DCI corresponds to a first component carrier index associated with the first component carrier based on the first PDSCH resource. In some examples, the DAI identifying component 1625 may determine a second DAI for the second DCI corresponds to a second component carrier index associated with the second component carrier based on the third PDSCH resource, where the feedback is decoded based on the first DAI and the second DAI. In some examples, the DAI identifying component 1625 may determine an ordering for the set of DAIs based on a temporal ordering of the PDSCH resources associated with a same CORESET pool index on the same component carrier scheduled during the PMO, then based on a CORESET pool index ordering on the same component carrier scheduled during the PMO, then based on a component carrier index ordering for the PMO, then based on a PMO ordering.

In some examples, the DAI identifying component 1625 may determine an ordering for the set of DAIs based on a CORESET pool index ordering for the PDSCH resources having a common starting resource in a time domain on the same common component carrier scheduled during the PMO, then based on a temporal ordering of the PDSCH resources on the same component carrier scheduled during the PMO, then based on a component carrier index ordering for component carriers scheduled during the PMO, then based on a PMO index ordering.

The feedback decoding component 1630 may decode the feedback based on the set of DAIs. In some examples, the feedback decoding component 1630 may identify feedback values for the set of ACK or NACK bits of a first DAI associated with the first DCI based on the first DCI scheduling a set of PDSCH resources, each of the set of ACK or NACK bits of the first DAI corresponding to a different one of the first PDSCH resource and the second PDSCH resource. In some examples, the feedback decoding component 1630 may identify a first feedback value for a first bit of the set of ACK or NACK bits of a second DAI associated with the second DCI based on the second DCI scheduling a single PDSCH resource. In some examples, the feedback decoding component 1630 may identify a NACK for a second bit of the set of ACK or NACK bits of the second DAI associated with the second DCI.

The DAI ordering component 1635 may determine a first DAI for the first DCI associated with the first component carrier and the first PDSCH resource. In some examples, the DAI ordering component 1635 may determine a second DAI for the first DCI associated with the second component carrier and the second PDSCH resource. In some examples, the DAI ordering component 1635 may determine a third DAI for the second DCI associated with the second component carrier and the third PDSCH resource, where the feedback is decoded based on the first DAI, the second DAI, and the third DAI. In some examples, the DAI ordering component 1635 may transmit, during the PMO, a third DCI scheduling the UE for a fourth PDSCH resource on the first component carrier. In some examples, the DAI ordering component 1635 may determine a fourth DAI for the third DCI associated with the first component carrier and the fourth PDSCH resource, where the fourth DAI and the first DAI are based on a temporal ordering of the first PDSCH resource and the fourth PDSCH resource, and where the feedback is decoded based on the fourth DAI.

The UE capability component 1640 may receive, from the UE, a UE capability associated with a number of PDSCH resources per PMO per cell, the number of PDSCH resources per PMO per cell, or both.

Figure 17:
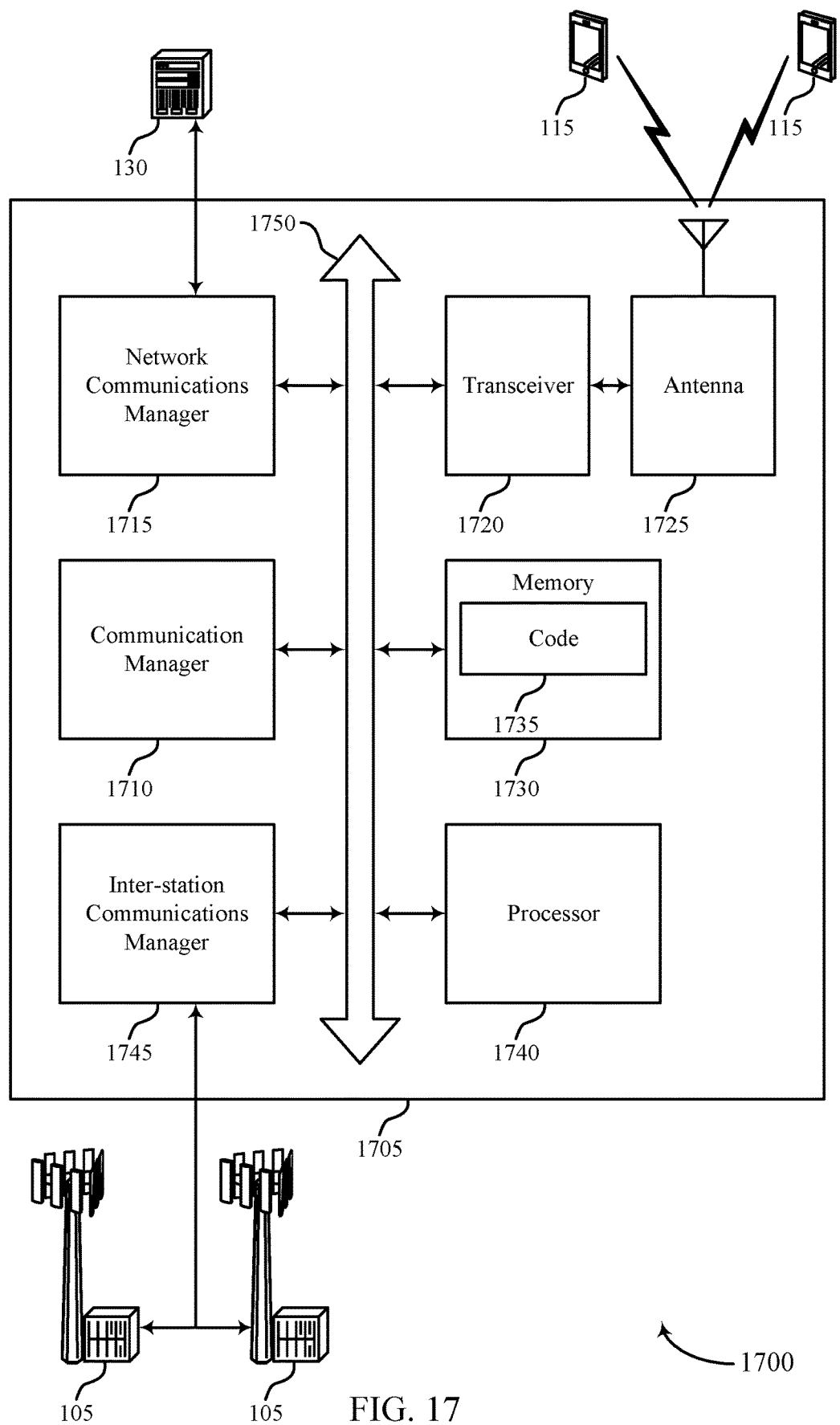
FIG. 17 shows a diagram of a system including a device that supports feedback schemes for multiple component carrier scheduling and joint feedback reporting in accordance with aspects of the present disclosure.

FIG. 17 shows a diagram of a system 1700 including a device 1705 that supports feedback schemes for multiple component carrier scheduling and joint feedback reporting in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communication manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communication manager 1710 may transmit, during a PMO, a first DCI scheduling a UE for a first PDSCH resource on a first component carrier and a second PDSCH resource on a second component carrier, transmit, during the PMO, a second DCI scheduling the UE for a third PDSCH resource on the second component carrier, receive feedback for at least the first PDSCH resource, the second PDSCH resource, and the third PDSCH resource on a PUCCH, identify a set of DAIs for the first DCI and the second DCI, where the first DCI has one or more DAIs whose values are based on the first DCI scheduling PDSCH resources on different component carriers, and decode the feedback based on the set of DAIs. The communication manager 1710 may also transmit, to a UE during a PMO, one or more first DCI scheduling the UE for a corresponding one or more first PDSCH resources on a first component carrier, the one or more first DCI associated with a first CORESET pool index, transmit, during the PMO, one or more second DCI scheduling the UE for a corresponding one or more second PDSCH resources on the first component carrier, the one or more second DCI associated with a second CORESET pool index, receive feedback for the one or more first PDSCH resources and the one or more second PDSCH resources on a PUCCH, identify a set of DAIs for the one or more first DCI and the one or more second DCI, where values of the set of DAIs are based on the one or more first DCI and the one or more second DCI both scheduling PDSCH resources on a same component carrier, and decode the feedback based on the set of DAIs.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM and ROM. The memory 1730 may store computer-readable, computer-executable code 1735 including instructions that, when executed, cause the processor to perform various functions described herein. In some cases, the memory 1730 may contain, among other things, a BIOS which may control basic hardware or software operation such as the interaction with peripheral components or devices.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting feedback schemes for multiple component carrier scheduling and joint feedback reporting).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

Figure 18:
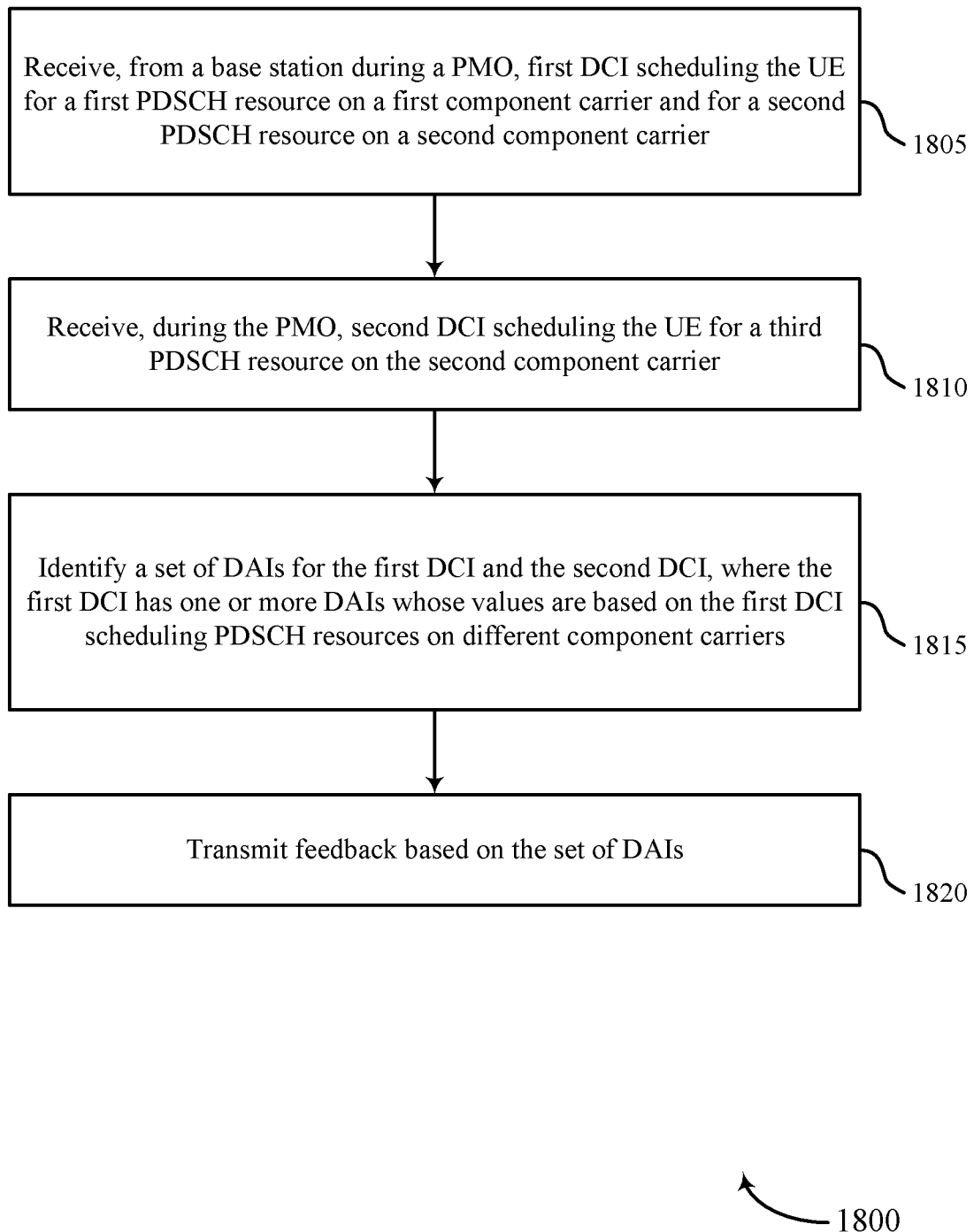
FIGS. 18 through 23 show flowcharts illustrating methods that support feedback schemes for multiple component carrier scheduling and joint feedback reporting in accordance with aspects of the present disclosure.

FIG. 18 shows a flowchart illustrating a method 1800 that supports feedback schemes for multiple component carrier scheduling and joint feedback reporting in accordance with aspects of the present disclosure. The operations of method 1800 may be implemented by a UE 115 or its components as described herein. For example, the operations of method 1800 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1805, the UE may receive, from a base station during a PMO, first DCI scheduling the UE for a first PDSCH resource on a first component carrier and for a second PDSCH resource on a second component carrier. The operations of 1805 may be performed according to the methods described herein. In some examples, aspects of the operations of 1805 may be performed by a multi-CC scheduling component as described with reference to FIGS. 10 through 13.

At 1810, the UE may receive, during the PMO, second DCI scheduling the UE for a third PDSCH resource on the second component carrier. The operations of 1810 may be performed according to the methods described herein. In some examples, aspects of the operations of 1810 may be performed by a PDSCH scheduling component as described with reference to FIGS. 10 through 13.

At 1815, the UE may identify a set of DAIs for the first DCI and the second DCI, where the first DCI has one or more DAIs whose values are based on the first DCI scheduling PDSCH resources on different component carriers. The operations of 1815 may be performed according to the methods described herein. In some examples, aspects of the operations of 1815 may be performed by a DAI identifying component as described with reference to FIGS. 10 through 13.

At 1820, the UE may transmit feedback based on the set of DAIs. The operations of 1820 may be performed according to the methods described herein. In some examples, aspects of the operations of 1820 may be performed by a feedback transmitting component as described with reference to FIGS. 10 through 13.

Figure 19:
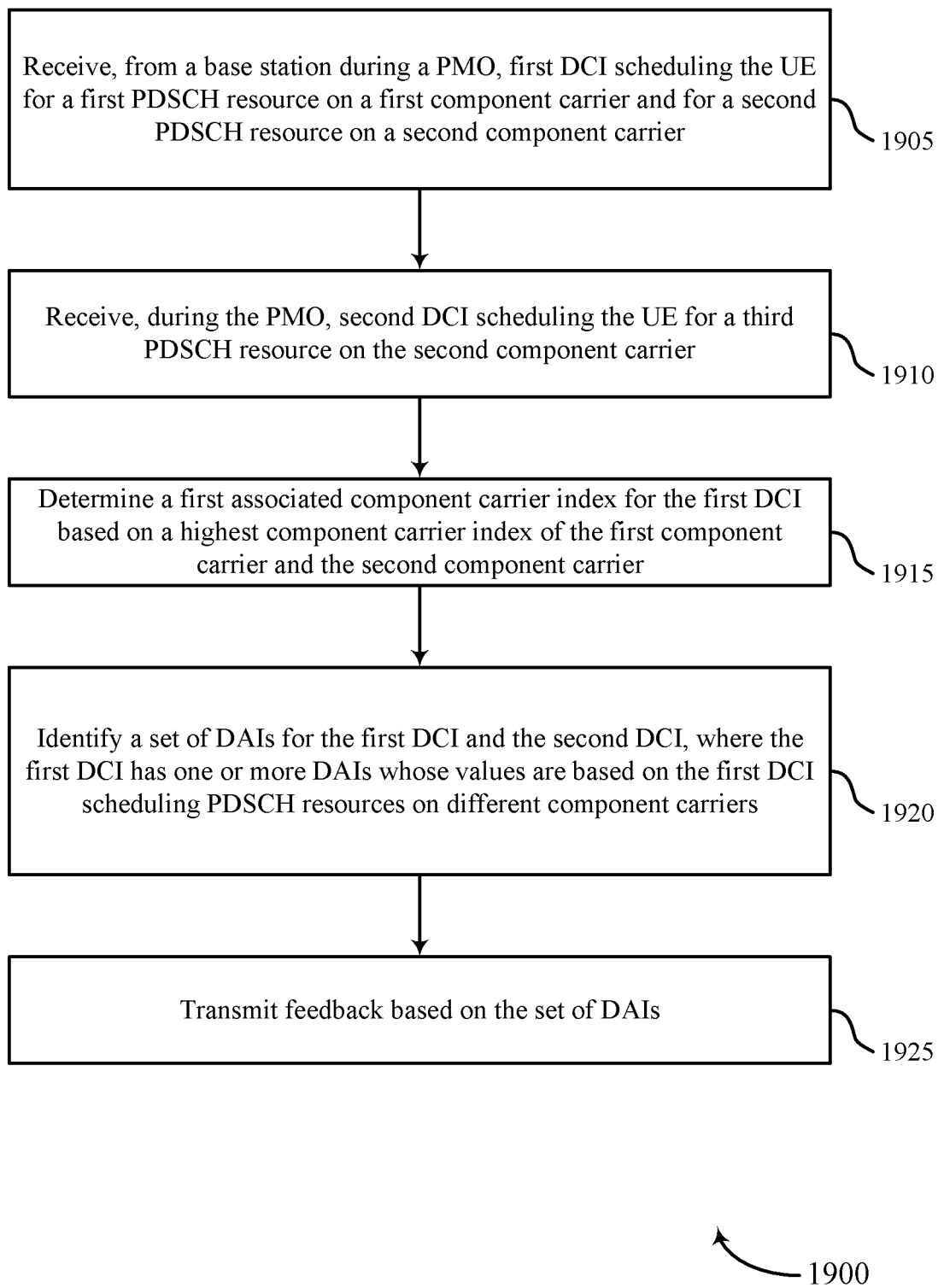

FIG. 19 shows a flowchart illustrating a method 1900 that supports feedback schemes for multiple component carrier scheduling and joint feedback reporting in accordance with aspects of the present disclosure. The operations of method 1900 may be implemented by a UE 115 or its components as described herein. For example, the operations of method 1900 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1905, the UE may receive, from a base station during a PMO, first DCI scheduling the UE for a first PDSCH resource on a first component carrier and for a second PDSCH resource on a second component carrier. The operations of 1905 may be performed according to the methods described herein. In some examples, aspects of the operations of 1905 may be performed by a multi-CC scheduling component as described with reference to FIGS. 10 through 13.

At 1910, the UE may receive, during the PMO, second DCI scheduling the UE for a third PDSCH resource on the second component carrier. The operations of 1910 may be performed according to the methods described herein. In some examples, aspects of the operations of 1910 may be performed by a PDSCH scheduling component as described with reference to FIGS. 10 through 13.

At 1915, the UE may determine a first associated component carrier index for the first DCI based on a highest component carrier index of the first component carrier and the second component carrier. The operations of 1915 may be performed according to the methods described herein. In some examples, aspects of the operations of 1915 may be performed by a DAI identifying component as described with reference to FIGS. 10 through 13.

At 1920, the UE may identify a set of DAIs for the first DCI and the second DCI, where the first DCI has one or more DAIs whose values are based on the first DCI scheduling PDSCH resources on different component carriers. The operations of 1920 may be performed according to the methods described herein. In some examples, aspects of the operations of 1920 may be performed by a DAI identifying component as described with reference to FIGS. 10 through 13.

At 1925, the UE may transmit feedback based on the set of DAIs. The operations of 1925 may be performed according to the methods described herein. In some examples, aspects of the operations of 1925 may be performed by a feedback transmitting component as described with reference to FIGS. 10 through 13.

Figure 20:
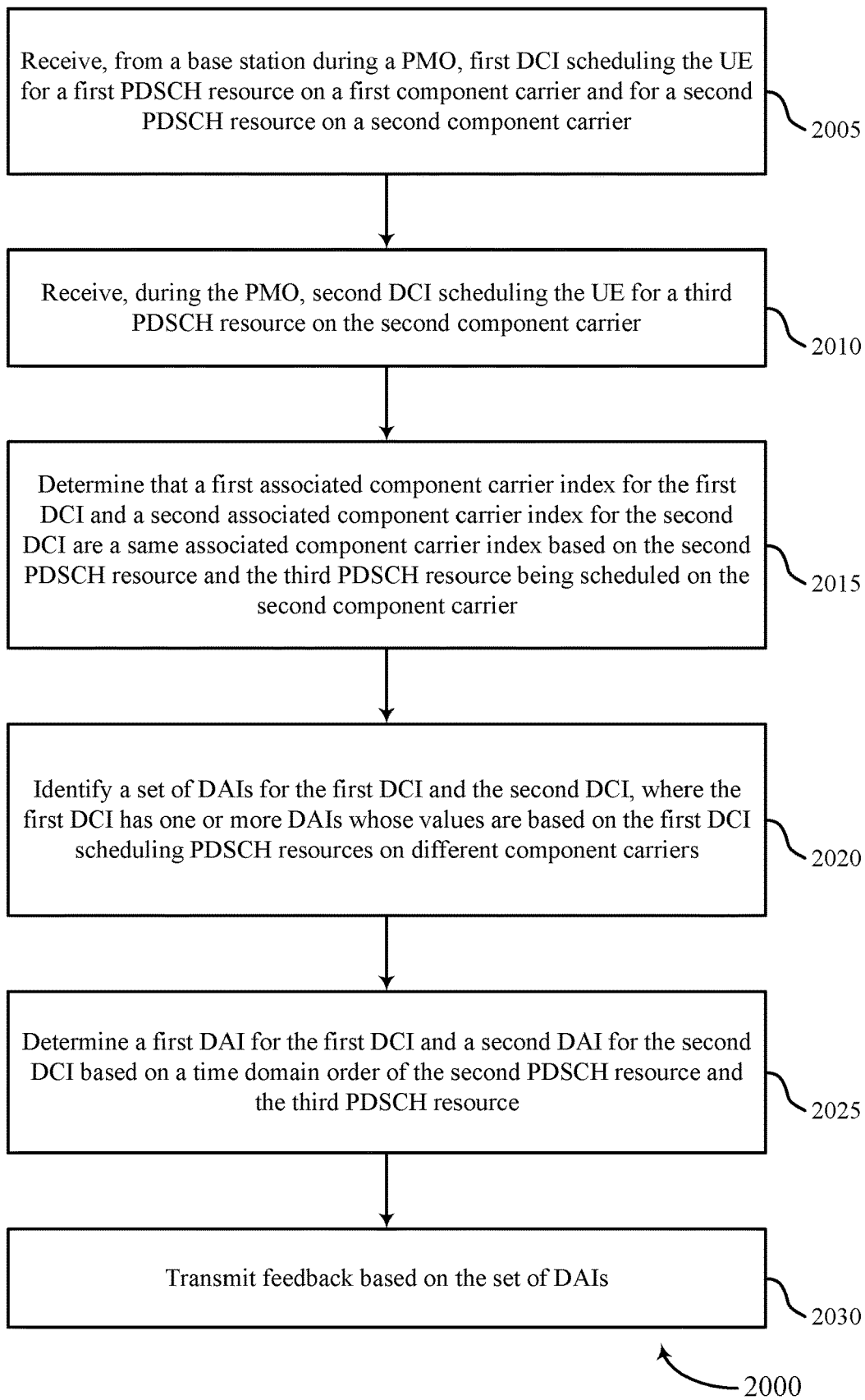

FIG. 20 shows a flowchart illustrating a method 2000 that supports feedback schemes for multiple component carrier scheduling and joint feedback reporting in accordance with aspects of the present disclosure. The operations of method 2000 may be implemented by a UE 115 or its components as described herein. For example, the operations of method 2000 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2005, the UE may receive, from a base station during a PMO, first DCI scheduling the UE for a first PDSCH resource on a first component carrier and for a second PDSCH resource on a second component carrier. The operations of 2005 may be performed according to the methods described herein. In some examples, aspects of the operations of 2005 may be performed by a multi-CC scheduling component as described with reference to FIGS. 10 through 13.

At 2010, the UE may receive, during the PMO, second DCI scheduling the UE for a third PDSCH resource on the second component carrier. The operations of 2010 may be performed according to the methods described herein. In some examples, aspects of the operations of 2010 may be performed by a PDSCH scheduling component as described with reference to FIGS. 10 through 13.

At 2015, the UE may determine that a first associated component carrier index for the first DCI and a second associated component carrier index for the second DCI are a same associated component carrier index based on the second PDSCH resource and the third PDSCH resource being scheduled on the second component carrier. The operations of 2015 may be performed according to the methods described herein. In some examples, aspects of the operations of 2015 may be performed by a DAI identifying component as described with reference to FIGS. 10 through 13.

At 2020, the UE may identify a set of DAIs for the first DCI and the second DCI, where the first DCI has one or more DAIs whose values are based on the first DCI scheduling PDSCH resources on different component carriers. The operations of 2020 may be performed according to the methods described herein. In some examples, aspects of the operations of 2020 may be performed by a DAI identifying component as described with reference to FIGS. 10 through 13.

At 2025, the UE may determine a first DAI for the first DCI and a second DAI for the second DCI based on a time domain order of the second PDSCH resource and the third PDSCH resource. The operations of 2025 may be performed according to the methods described herein. In some examples, aspects of the operations of 2025 may be performed by a DAI identifying component as described with reference to FIGS. 10 through 13.

At 2030, the UE may transmit feedback based on the set of DAIs. The operations of 2030 may be performed according to the methods described herein. In some examples, aspects of the operations of 2030 may be performed by a feedback transmitting component as described with reference to FIGS. 10 through 13.

Figure 21:
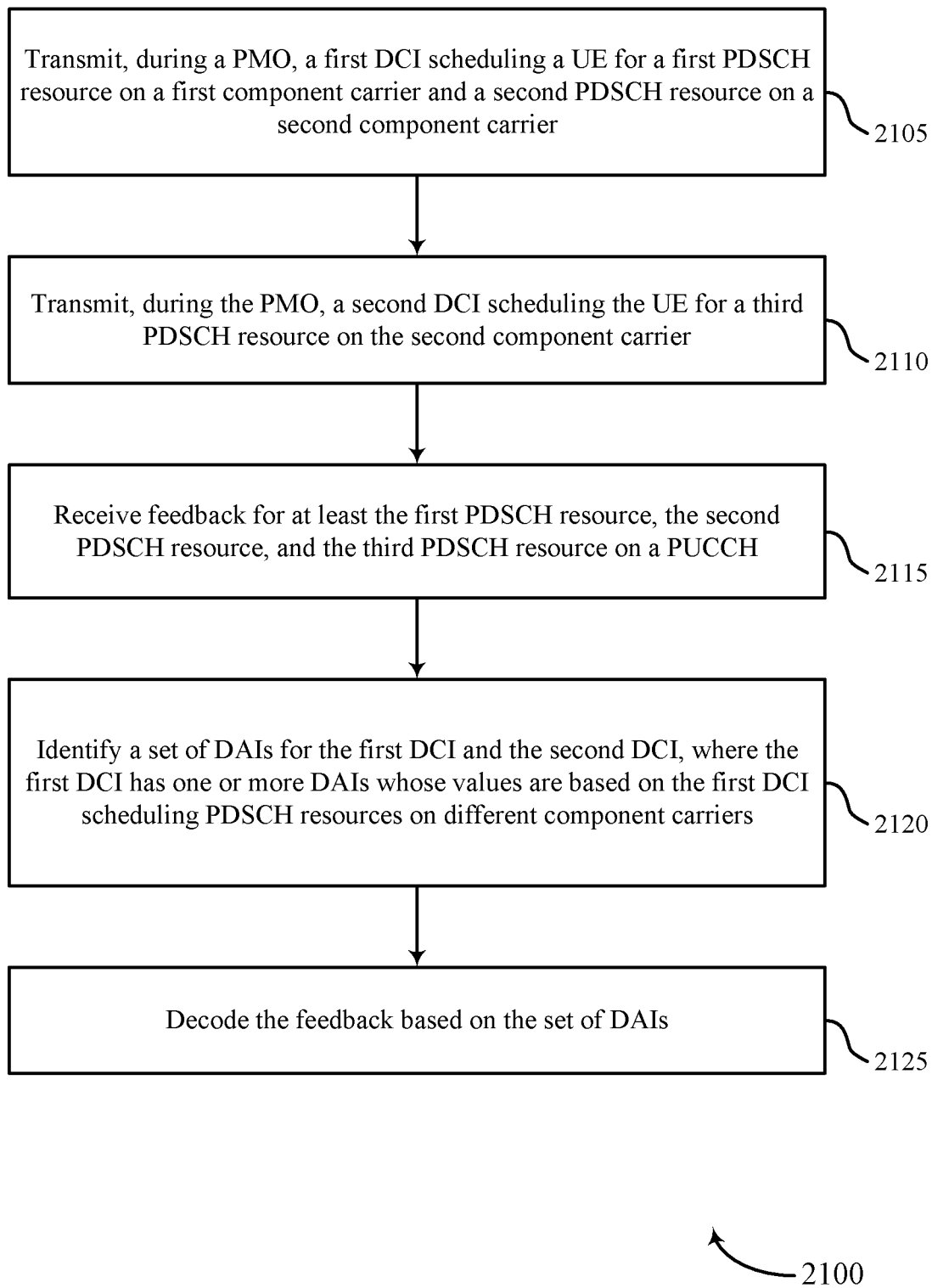

FIG. 21 shows a flowchart illustrating a method 2100 that supports feedback schemes for multiple component carrier scheduling and joint feedback reporting in accordance with aspects of the present disclosure. The operations of method 2100 may be implemented by a base station 105 or its components as described herein. For example, the operations of method 2100 may be performed by a communication manager as described with reference to FIGS. 14 through 17. In some examples, a base station may execute a set of instructions to control the functional elements of the base station to perform the described functions. Additionally or alternatively, a base station may perform aspects of the described functions using special-purpose hardware.

At 2105, the base station may transmit, during a PMO, a first DCI scheduling a UE for a first PDSCH resource on a first component carrier and a second PDSCH resource on a second component carrier. The operations of 2105 may be performed according to the methods described herein. In some examples, aspects of the operations of 2105 may be performed by a multi-CC scheduling component as described with reference to FIGS. 14 through 17.

At 2110, the base station may transmit, during the PMO, a second DCI scheduling the UE for a third PDSCH resource on the second component carrier. The operations of 2110 may be performed according to the methods described herein. In some examples, aspects of the operations of 2110 may be performed by a PDSCH scheduling component as described with reference to FIGS. 14 through 17.

At 2115, the base station may receive feedback for at least the first PDSCH resource, the second PDSCH resource, and the third PDSCH resource on a PUCCH. The operations of 2115 may be performed according to the methods described herein. In some examples, aspects of the operations of 2115 may be performed by a feedback receiving component as described with reference to FIGS. 14 through 17.

At 2120, the base station may identify a set of DAIs for the first DCI and the second DCI, where the first DCI has one or more DAIs whose values are based on the first DCI scheduling PDSCH resources on different component carriers. The operations of 2120 may be performed according to the methods described herein. In some examples, aspects of the operations of 2120 may be performed by a DAI identifying component as described with reference to FIGS. 14 through 17.

At 2125, the base station may decode the feedback based on the set of DAIs. The operations of 2125 may be performed according to the methods described herein. In some examples, aspects of the operations of 2125 may be performed by a feedback decoding component as described with reference to FIGS. 14 through 17.

Figure 22:
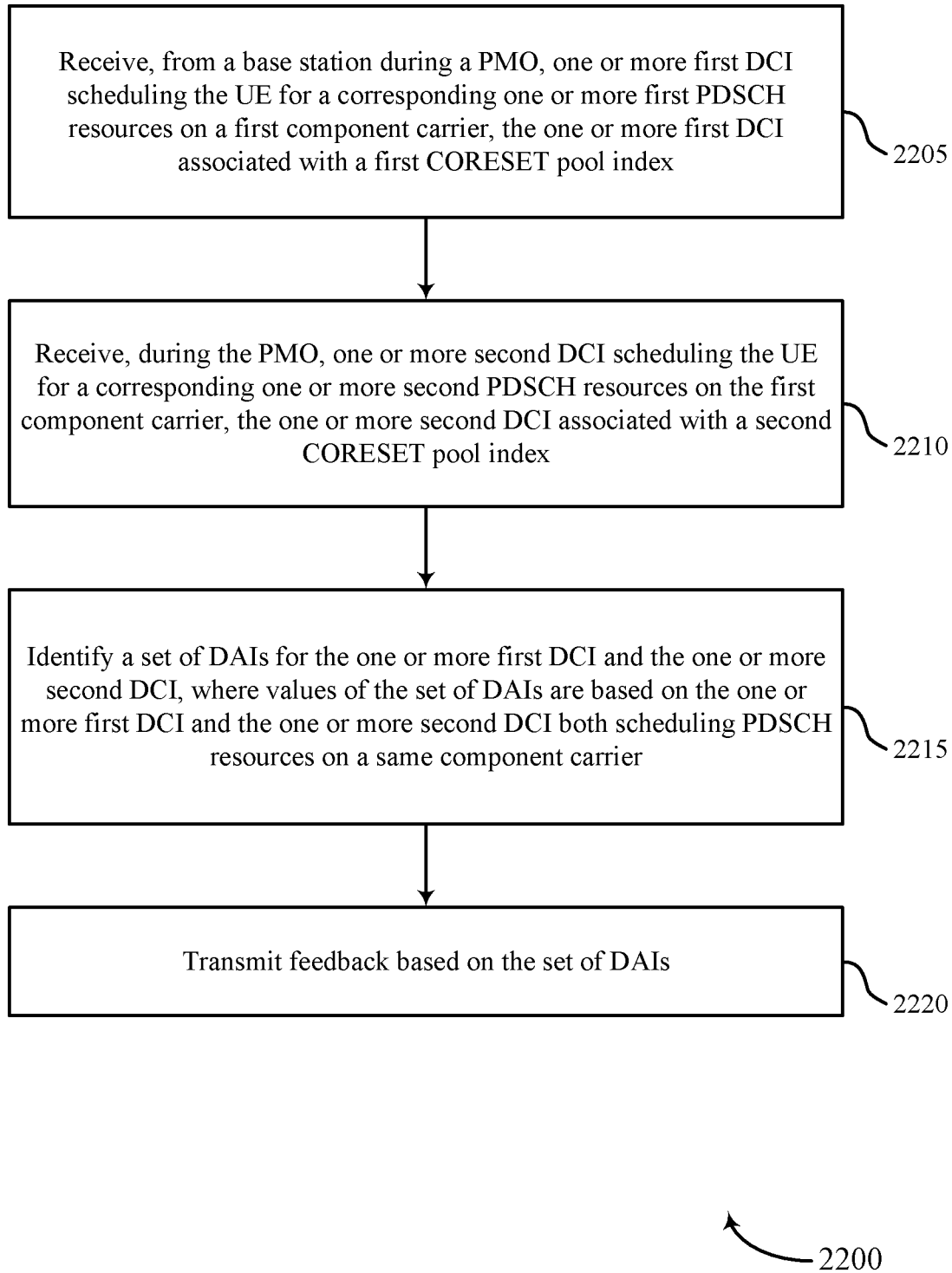

FIG. 22 shows a flowchart illustrating a method 2200 that supports feedback schemes for multiple component carrier scheduling and joint feedback reporting in accordance with aspects of the present disclosure. The operations of method 2200 may be implemented by a UE 115 or its components as described herein. For example, the operations of method 2200 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2205, the UE may receive, from a base station during a PMO, one or more first DCI scheduling the UE for a corresponding one or more first PDSCH resources on a first component carrier, the one or more first DCI associated with a first CORESET pool index. The operations of 2205 may be performed according to the methods described herein. In some examples, aspects of the operations of 2205 may be performed by a multi-CC scheduling component as described with reference to FIGS. 10 through 13.

At 2210, the UE may receive, during the PMO, one or more second DCI scheduling the UE for a corresponding one or more second PDSCH resources on the first component carrier, the one or more second DCI associated with a second CORESET pool index. The operations of 2210 may be performed according to the methods described herein. In some examples, aspects of the operations of 2210 may be performed by a PDSCH scheduling component as described with reference to FIGS. 10 through 13.

At 2215, the UE may identify a set of DAIs for the one or more first DCI and the one or more second DCI, where values of the set of DAIs are based on the one or more first DCI and the one or more second DCI both scheduling PDSCH resources on a same component carrier. The operations of 2215 may be performed according to the methods described herein. In some examples, aspects of the operations of 2215 may be performed by a DAI identifying component as described with reference to FIGS. 10 through 13.

At 2220, the UE may transmit feedback based on the set of DAIs. The operations of 2220 may be performed according to the methods described herein. In some examples, aspects of the operations of 2220 may be performed by a feedback component as described with reference to FIGS. 10 through 13.

Figure 23:
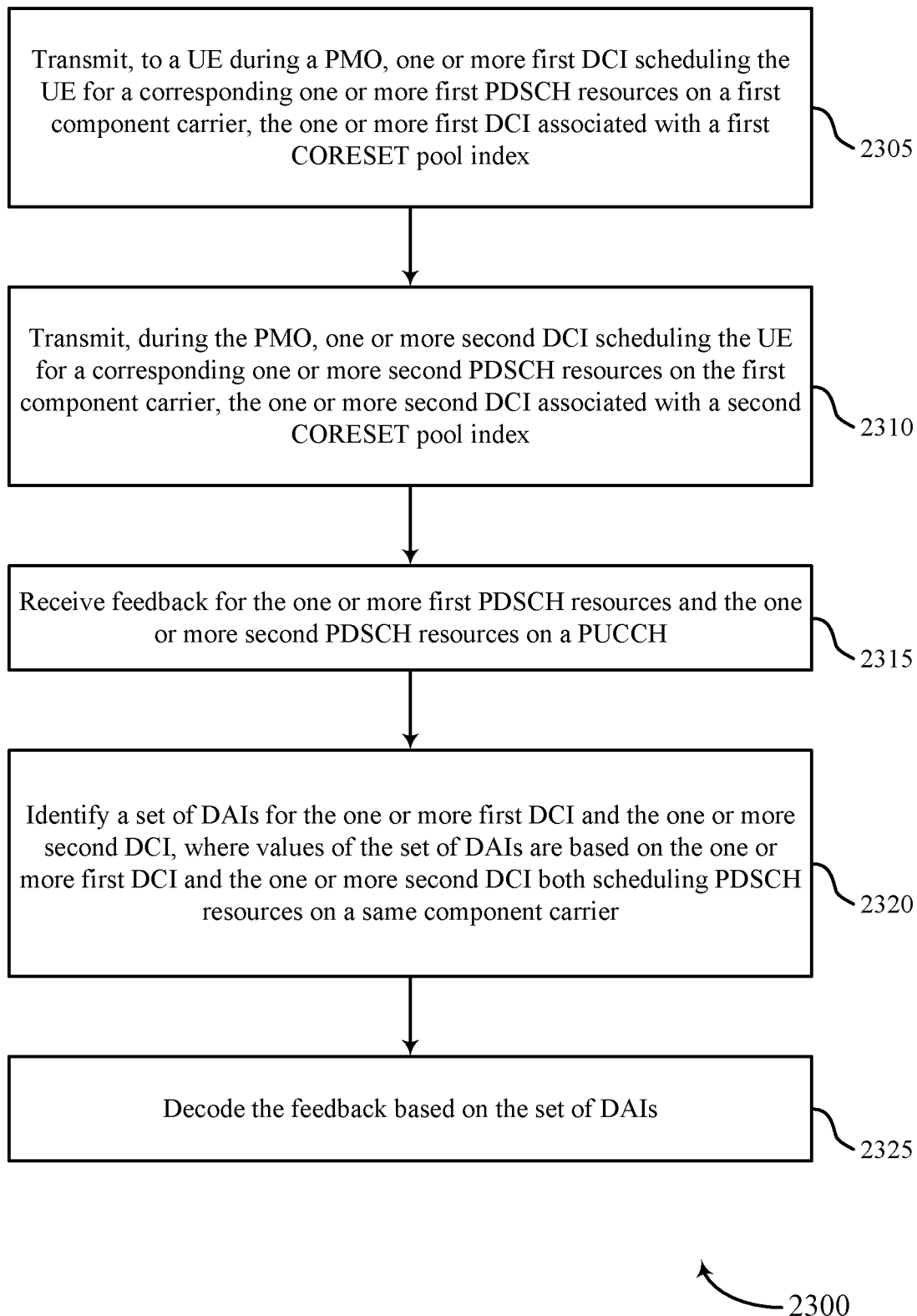

FIG. 23 shows a flowchart illustrating a method 2300 that supports feedback schemes for multiple component carrier scheduling and joint feedback reporting in accordance with aspects of the present disclosure. The operations of method 2300 may be implemented by a base station 105 or its components as described herein. For example, the operations of method 2300 may be performed by a communication manager as described with reference to FIGS. 14 through 17. In some examples, a base station may execute a set of instructions to control the functional elements of the base station to perform the described functions. Additionally or alternatively, a base station may perform aspects of the described functions using special-purpose hardware.

At 2305, the base station may transmit, to a UE during a PMO, one or more first DCI scheduling the UE for a corresponding one or more first PDSCH resources on a first component carrier, the one or more first DCI associated with a first CORESET pool index. The operations of 2305 may be performed according to the methods described herein. In some examples, aspects of the operations of 2305 may be performed by a multi-CC scheduling component as described with reference to FIGS. 14 through 17.

At 2310, the base station may transmit, during the PMO, one or more second DCI scheduling the UE for a corresponding one or more second PDSCH resources on the first component carrier, the one or more second DCI associated with a second CORESET pool index. The operations of 2310 may be performed according to the methods described herein. In some examples, aspects of the operations of 2310 may be performed by a PDSCH scheduling component as described with reference to FIGS. 14 through 17.

At 2315, the base station may receive feedback for the one or more first PDSCH resources and the one or more second PDSCH resources on a PUCCH. The operations of 2315 may be performed according to the methods described herein. In some examples, aspects of the operations of 2315 may be performed by a feedback receiving component as described with reference to FIGS. 14 through 17.

At 2320, the base station may identify a set of DAIs for the one or more first DCI and the one or more second DCI, where values of the set of DAIs are based on the one or more first DCI and the one or more second DCI both scheduling PDSCH resources on a same component carrier. The operations of 2320 may be performed according to the methods described herein. In some examples, aspects of the operations of 2320 may be performed by a DAI identifying component as described with reference to FIGS. 14 through 17.

At 2325, the base station may decode the feedback based on the set of DAIs. The operations of 2325 may be performed according to the methods described herein. In some examples, aspects of the operations of 2325 may be performed by a feedback decoding component as described with reference to FIGS. 14 through 17.

Aspect 1: A method for wireless communications at a UE, comprising: receiving, from a base station during a physical downlink control channel monitoring occasion, first downlink control information scheduling the UE for a first physical downlink shared channel resource on a first component carrier and for a second physical downlink shared channel resource on a second component carrier; receiving, during the physical downlink control channel monitoring occasion, second downlink control information scheduling the UE for a third physical downlink shared channel resource on the second component carrier; identifying a plurality of downlink assignment indices for the first downlink control information and the second downlink control information, wherein the first downlink control information has one or more downlink assignment indices whose values are based at least in part on the first downlink control information scheduling physical downlink shared channel resources on different component carriers; and transmitting feedback based at least in part on the plurality of downlink assignment indices.

Aspect 2: The method of aspect 1, wherein identifying the plurality of downlink assignment indices further comprises: determining a first associated component carrier index for the first downlink control information based at least in part on a highest component carrier index of the first component carrier and the second component carrier.

Aspect 3: The method of aspect 1, wherein identifying the plurality of downlink assignment indices further comprises: determining a first associated component carrier index for the first downlink control information based at least in part on a lowest component carrier index of the first component carrier and the second component carrier.

Aspect 4: The method of any of aspects 1 to 3, wherein identifying the plurality of downlink assignment indices further comprises: determining that a first associated component carrier index for the first downlink control information and a second associated component carrier index for the second downlink control information are a same associated component carrier index based at least in part on the second physical downlink shared channel resource and the third physical downlink shared channel resource being scheduled on the second component carrier; and determining a first downlink assignment index for the first downlink control information and a second downlink assignment index for the second downlink control information based at least in part on a time domain order of the second physical downlink shared channel resource and the third physical downlink shared channel resource.

Aspect 5: The method of aspects 1 to 4, wherein identifying the plurality of downlink assignment indices further comprises: determining a first downlink assignment index for the first downlink control information corresponds to a first component carrier index associated with the first component carrier based at least in part on the first physical downlink shared channel resource; and determining a second downlink assignment index for the second downlink control information corresponds to a second component carrier index associated with the second component carrier based at least in part on the third physical downlink shared channel resource.

Aspect 6: The method of any of aspects 1 to 5, wherein identifying the plurality of downlink assignment indices further comprises: determining a first downlink assignment index for the first downlink control information associated with the first component carrier and the first physical downlink shared channel resource; determining a second downlink assignment index for the first downlink control information associated with the second component carrier and the second physical downlink shared channel resource; and determining a third downlink assignment index for the second downlink control information associated with the second component carrier and the third physical downlink shared channel resource.

Aspect 7: The method of aspect 6, wherein the second downlink assignment index and the third downlink assignment index are based at least in part on a temporal ordering of the second physical downlink shared channel resource and the third physical downlink shared channel resource.

Aspect 8: The method of any of aspects 1 to 7, further comprising: receiving, during the physical downlink control channel monitoring occasion, a third downlink control information scheduling the UE for a fourth physical downlink shared channel resource on the first component carrier.

Aspect 9: The method of aspect 8, wherein identifying the plurality of downlink assignment indices further comprises: determining a fourth downlink assignment index for the third downlink control information associated with the first component carrier and the fourth physical downlink shared channel resource, wherein the fourth downlink assignment index and the first downlink assignment index are based at least in part on a temporal ordering of the first physical downlink shared channel resource and the fourth physical downlink shared channel resource.

Aspect 10: The method of any of aspects 1 to 9, further comprising: generating a hybrid automatic repeat request acknowledgment codebook whose order is based at least in part on the plurality of downlink assignment indices.

Aspect 11: The method of any of aspects 1 to 10, further comprising: determining a plurality of acknowledgment or negative acknowledgment bits for each downlink assignment index of the plurality of downlink assignment indices.

Aspect 12: The method of aspect 11, further comprising: determining feedback values for the plurality of acknowledgment or negative acknowledgment bits of a first downlink assignment index associated with the first downlink control information based at least in part on the first downlink control information scheduling a plurality of physical downlink shared channel resources, each of the plurality of acknowledgment or negative acknowledgment bits of the first downlink assignment index corresponding to a different one of the first physical downlink shared channel resource and the second physical downlink shared channel resource.

Aspect 13: The method of aspect 11, further comprising: determining a first feedback value for a first bit of the plurality of acknowledgment or negative acknowledgment bits of a second downlink assignment index associated with the second downlink control information based at least in part on the second downlink control information scheduling a single physical downlink shared channel resource; and including a negative acknowledgment for a second bit of the plurality of acknowledgment or negative acknowledgment bits of the second downlink assignment index associated with the second downlink control information.

Aspect 14: The method of any of aspects 1 to 13, wherein the plurality of downlink assignment indices are ordered first based at least in part on ascending order of an associated serving cell index with downlink control information in a given physical downlink control channel monitoring occasion then based at last in part on ascending order of physical downlink control channel monitoring occasion index.

Aspect 15: A method for wireless communications at a base station, comprising: transmitting, during a physical downlink control channel monitoring occasion, a first downlink control information scheduling a UE for a first physical downlink shared channel resource on a first component carrier and a second physical downlink shared channel resource on a second component carrier; transmitting, during the physical downlink control channel monitoring occasion, a second downlink control information scheduling the UE for a third physical downlink shared channel resource on the second component carrier; receiving feedback for at least the first physical downlink shared channel resource, the second physical downlink shared channel resource, and the third physical downlink shared channel resource on a physical uplink control channel; identifying a plurality of downlink assignment indices for the first downlink control information and the second downlink control information, wherein the first downlink control information has one or more downlink assignment indices whose values are based at least in part on the first downlink control information scheduling physical downlink shared channel resources on different component carriers; and decoding the feedback based at least in part on the plurality of downlink assignment indices.

Aspect 16: The method of aspect 15, wherein identifying the plurality of downlink assignment indices further comprises: determining a first associated component carrier index for the first downlink control information based at least in part on a highest component carrier index of the first component carrier and the second component carrier.

Aspect 17: The method of aspect 15, wherein identifying the plurality of downlink assignment indices further comprises: determining a first associated component carrier index for the first downlink control information based at least in part on a lowest component carrier index of the first component carrier and the second component carrier.

Aspect 18: The method of any of aspects 15 to 17, wherein identifying the plurality of downlink assignment indices further comprises: determining a first associated component carrier index for the first downlink control information and a second associated component carrier index for the second downlink control information are a same associated component carrier index based at least in part on the second physical downlink shared channel resource and the third physical downlink shared channel resource being scheduled on the second component carrier; and determining a first downlink assignment index for the first downlink control information and a second downlink assignment index for the second downlink control information based at least in part on a time domain order of the second physical downlink shared channel resource and the third physical downlink shared channel resource, wherein the feedback is decoded based at least in part on the first downlink assignment index and the second downlink assignment index.

Aspect 19: The method of any of aspects 15 to 18, wherein identifying the plurality of downlink assignment indices further comprises: determining a first downlink assignment index for the first downlink control information corresponds to a first component carrier index associated with the first component carrier based at least in part on the first physical downlink shared channel resource; and determining a second downlink assignment index for the second downlink control information corresponds to a second component carrier index associated with the second component carrier based at least in part on the third physical downlink shared channel resource, wherein the feedback is decoded based at least in part on the first downlink assignment index and the second downlink assignment index.

Aspect 20: The method of any of aspects 15 to 19, further comprising: determining a first downlink assignment index for the first downlink control information associated with the first component carrier and the first physical downlink shared channel resource; determining a second downlink assignment index for the first downlink control information associated with the second component carrier and the second physical downlink shared channel resource; and determining a third downlink assignment index for the second downlink control information associated with the second component carrier and the third physical downlink shared channel resource, wherein the feedback is decoded based at least in part on the first downlink assignment index, the second downlink assignment index, and the third downlink assignment index.

Aspect 21: The method of aspect 20, wherein the second downlink assignment index and the third downlink assignment index are based at least in part on a temporal ordering of the second physical downlink shared channel resource and the third physical downlink shared channel resource.

Aspect 22: The method of any of aspects 20 or 21, further comprising: transmitting, during the physical downlink control channel monitoring occasion, a third downlink control information scheduling the UE for a fourth physical downlink shared channel resource on the first component carrier.

Aspect 23: The method of aspect 22, wherein identifying the plurality of downlink assignment indices further comprises: determining a fourth downlink assignment index for the third downlink control information associated with the first component carrier and the fourth physical downlink shared channel resource, wherein the fourth downlink assignment index and the first downlink assignment index are based at least in part on a temporal ordering of the first physical downlink shared channel resource and the fourth physical downlink shared channel resource, and wherein the feedback is decoded based at least in part on the fourth downlink assignment index.

Aspect 24: The method of any of aspects 15 to 23, wherein the feedback includes a hybrid automatic repeat request acknowledgment codebook whose order is generated based at least in part on the plurality of downlink assignment indices.

Aspect 25: The method of any of aspects 15 to 24, wherein the feedback includes a plurality of acknowledgment or negative acknowledgment bits for each downlink assignment index of the plurality of downlink assignment indices.

Aspect 26: The method of aspect 25, wherein decoding the feedback comprises: identifying feedback values for the plurality of acknowledgment or negative acknowledgment bits of a first downlink assignment index associated with the first downlink control information based at least in part on the first downlink control information scheduling a plurality of physical downlink shared channel resources, each of the plurality of acknowledgment or negative acknowledgment bits of the first downlink assignment index corresponding to a different one of the first physical downlink shared channel resource and the second physical downlink shared channel resource.

Aspect 27: The method of aspect 25, wherein decoding the feedback comprises: identifying a first feedback value for a first bit of the plurality of acknowledgment or negative acknowledgment bits of a second downlink assignment index associated with the second downlink control information based at least in part on the second downlink control information scheduling a single physical downlink shared channel resource; and identifying a negative acknowledgment for a second bit of the plurality of acknowledgment or negative acknowledgment bits of the second downlink assignment index associated with the second downlink control information.

Aspect 28: The method of any of aspects 15 to 27, wherein the plurality of downlink assignment indices are ordered first based at least in part on ascending order of an associated serving cell index with downlink control information in a corresponding physical downlink control channel monitoring occasion then based at last in part on ascending order of physical downlink control channel monitoring occasion index.

Aspect 29: A method for wireless communications at a UE, comprising: receiving, from a base station during a physical downlink control channel monitoring occasion, one or more first downlink control information scheduling the UE for a corresponding one or more first physical downlink shared channel resources on a first component carrier, the one or more first downlink control information associated with a first control resource set pool index; receiving, during the physical downlink control channel monitoring occasion, one or more second downlink control information scheduling the UE for a corresponding one or more second physical downlink shared channel resources on the first component carrier, the one or more second downlink control information associated with a second control resource set pool index; identifying a plurality of downlink assignment indices for the one or more first downlink control information and the one or more second downlink control information, wherein values of the plurality of downlink assignment indices are based at least in part on the one or more first downlink control information and the one or more second downlink control information both scheduling physical downlink shared channel resources on a same component carrier; and transmitting feedback based at least in part on the plurality of downlink assignment indices.

Aspect 30: The method of aspect 29, further comprising transmitting, to a base station, a UE capability associated with a number of physical downlink shared channel resources per physical downlink control channel monitoring occasion per cell, the number of physical downlink shared channel resources per physical downlink control channel monitoring occasion per cell, or both.

Aspect 31: The method of any of aspects 29 or 30, wherein identifying the plurality of downlink assignment indices further comprises: determining an ordering for the plurality of downlink assignment indices based at least in part on a temporal ordering of the physical downlink shared channel resources associated with a same control resource set pool index on the same component carrier scheduled during the physical downlink control channel monitoring occasion, then based at least in part on a control resource set pool index ordering on the same component carrier scheduled during the physical downlink control channel monitoring occasion, then based at least in part on a component carrier index ordering for the physical downlink control channel monitoring occasion, then based at least in part on a physical downlink control channel monitoring occasion ordering.

Aspect 32: The method of any of aspects 29 or 30, wherein identifying the plurality of downlink assignment indices further comprises: determining an ordering for the plurality of downlink assignment indices based at least in part on a control resource set pool index ordering for the physical downlink shared channel resources having a common starting resource in a time domain on the same common component carrier scheduled during the physical downlink control channel monitoring occasion, then based at least in part on a temporal ordering of the physical downlink shared channel resources on the same component carrier scheduled during the physical downlink control channel monitoring occasion, then based at least in part on a component carrier index ordering for component carriers scheduled during the physical downlink control channel monitoring occasion, then based at least in part on a physical downlink control channel monitoring occasion index ordering.

Aspect 33: The method of any of aspects 29 to 32, wherein the one or more first downlink control information and the one or more second downlink control information include up to a maximum number of downlink control information.

Aspect 34: The method of any of aspects 29 to 33, wherein the maximum number of downlink control information is twice a value indicated by the UE.

Aspect 35: The method of any of aspects 29 to 34, wherein the maximum number of downlink control information is indicated by the UE, wherein a first physical downlink shared channel resource and a second physical downlink shared channel resource have a same starting resource in a time domain.

Aspect 36: The method of any of aspects 29 to 35, further comprising: determining the one or more first downlink control information allocate one or more third physical downlink shared channel resources in a second component carrier.

Aspect 37: The method of any of aspects 29 to 36, wherein the first control resource set pool index corresponds to a first transmission and reception point, and the second control resource set pool index corresponds to a second transmission and reception point.

Aspect 38: The method of any of aspects 29 to 37, wherein an ordering for the plurality of downlink assignment indices is based at least in part on a physical downlink shared channel resource start time ordering, a control resource set pool index ordering, a component carrier index ordering, a monitoring occasion index ordering, or any combination thereof.

Aspect 39: A method for wireless communications at a base station, comprising: transmitting, to a UE during a physical downlink control channel monitoring occasion, one or more first downlink control information scheduling the UE for a corresponding one or more first physical downlink shared channel resources on a first component carrier, the one or more first downlink control information associated with a first control resource set pool index; transmitting, during the physical downlink control channel monitoring occasion, one or more second downlink control information scheduling the UE for a corresponding one or more second physical downlink shared channel resources on the first component carrier, the one or more second downlink control information associated with a second control resource set pool index; receiving feedback for the one or more first physical downlink shared channel resources and the one or more second physical downlink shared channel resources on a physical uplink control channel; identifying a plurality of downlink assignment indices for the one or more first downlink control information and the one or more second downlink control information, wherein values of the plurality of downlink assignment indices are based at least in part on the one or more first downlink control information and the one or more second downlink control information both scheduling physical downlink shared channel resources on a same component carrier; and decoding the feedback based at least in part on the plurality of downlink assignment indices.

Aspect 40: The method of aspect 39, further comprising: receiving, from the UE, a UE capability associated with a number of physical downlink shared channel resources per physical downlink control channel monitoring occasion per cell, the number of physical downlink shared channel resources per physical downlink control channel monitoring occasion per cell, or both.

Aspect 41: The method of any of aspects 39 or 40, wherein identifying the plurality of downlink assignment indices further comprises: determining an ordering for the plurality of downlink assignment indices based at least in part on a temporal ordering of the physical downlink shared channel resources associated with a same control resource set pool index on the same component carrier scheduled during the physical downlink control channel monitoring occasion, then based at least in part on a control resource set pool index ordering on the same component carrier scheduled during the physical downlink control channel monitoring occasion, then based at least in part on a component carrier index ordering for the physical downlink control channel monitoring occasion, then based at least in part on a physical downlink control channel monitoring occasion ordering.

Aspect 42: The method of any of aspects 39 or 40, wherein identifying the plurality of downlink assignment indices further comprises: determining an ordering for the plurality of downlink assignment indices based at least in part on a control resource set pool index ordering for the physical downlink shared channel resources having a common starting resource in a time domain on the same common component carrier scheduled during the physical downlink control channel monitoring occasion, then based at least in part on a temporal ordering of the physical downlink shared channel resources on the same component carrier scheduled during the physical downlink control channel monitoring occasion, then based at least in part on a component carrier index ordering for component carriers scheduled during the physical downlink control channel monitoring occasion, then based at least in part on a physical downlink control channel monitoring occasion index ordering.

Aspect 43: The method of any of aspects 39 to 42, wherein the one or more first downlink control information and the one or more second downlink control information include up to a maximum number of downlink control information instances based.

Aspect 44: The method of any of aspects 39 to 43, wherein the maximum number of downlink control information is twice a value indicated by the UE.

Aspect 45: The method of any of aspects 39 to 44, wherein the maximum number of downlink control information is indicated by the UE, wherein a first physical downlink shared channel resource and a second physical downlink shared channel resource have a same starting resource in a time domain.

Aspect 46: The method of any of aspects 39 to 45, further comprising: determining the one or more first downlink control information allocate one or more third physical downlink shared channel resources on a second component carrier.

Aspect 47: The method of any of aspects 39 to 46, wherein the first control resource set pool index corresponds to a first transmission and reception point, and the second control resource set pool index corresponds to a second transmission and reception point.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, during a physical downlink control channel monitoring occasion, a first downlink control information message scheduling the UE for a first physical downlink shared channel resource on a first component carrier and for a second physical downlink shared channel resource on a second component carrier;
    receiving, during the physical downlink control channel monitoring occasion, a second downlink control information message scheduling the UE for a third physical downlink shared channel resource on the second component carrier;
    identifying a plurality of downlink assignment indices including a first downlink assignment index in the first downlink control information message and a second downlink assignment index in the second downlink control information message;
    identifying a first associated component carrier index for the first downlink control information message and a second associated component carrier index for the second downlink control information message, wherein values of the first downlinke assignment index and the second downlink assignment index are ordered in increasing order of physical downlink shared channel reception starting time based at least in part on the first downlink control information message and the second downlink control information message having a same associated component carrier index; and
    transmitting feedback based at least in part on the plurality of downlink assignment indices.

2. The method of claim 1, wherein identifying the plurality of downlink assignment indices further comprises:
    determining the first associated component carrier index for the first downlink control information message based at least in part on a highest component carrier index of the first component carrier and the second component carrier.

3. The method of claim 1, wherein identifying the plurality of downlink assignment indices further comprises:
    determining the first associated component carrier index for the first downlink control information message based at least in part on a lowest component carrier index of the first component carrier and the second component carrier.

4. The method of claim 1, wherein identifying the plurality of downlink assignment indices further comprises:
    determining the first downlink assignment index for the first downlink control information message corresponds to the first associated component carrier index associated with the first component carrier based at least in part on the first physical downlink shared channel resource; and determining the second downlink assignment index for the second downlink control information message corresponds to the second associated component carrier index associated with the second component carrier based at least in part on the third physical downlink shared channel resource.

5. The method of claim 1, wherein identifying the plurality of downlink assignment indices further comprises:

determining the first downlink assignment index for the first downlink control information message associated with the first component carrier and the first physical downlink shared channel resource;

determining a third downlink assignment index for the first downlink control information message associated with the second component carrier and the second physical downlink shared channel resource; and determining the second downlink assignment index for the second downlink control information message associated with the second component carrier and the third physical downlink shared channel resource.

6. The method of claim 5, further comprising:

receiving, during the physical downlink control channel monitoring occasion, a third downlink control information message scheduling the UE for a fourth physical downlink shared channel resource on the first component carrier.

7. The method of claim 6, wherein identifying the plurality of downlink assignment indices further comprises:

determining a fourth downlink assignment index for the third downlink control information message associated with the first component carrier and the fourth physical downlink shared channel resource, wherein the fourth downlink assignment index and the first downlink assignment index are based at least in part on a temporal ordering of the first physical downlink shared channel resource and the fourth physical downlink shared channel resource.

8. The method of claim 1, further comprising:

generating a hybrid automatic repeat request acknowledgment codebook whose order is based at least in part on the plurality of downlink assignment indices.

9. The method of claim 1, further comprising:

determining a plurality of acknowledgment or negative acknowledgment bits for each downlink assignment index of the plurality of downlink assignment indices.

10. The method of claim 9, further comprising:

determining feedback values for the plurality of acknowledgment or negative acknowledgment bits of the first downlink assignment index associated with the first downlink control information message based at least in part on the first downlink control information message scheduling a plurality of physical downlink shared channel resources, each of the plurality of acknowledgment or negative acknowledgment bits of the first downlink assignment index corresponding to a different one of the first physical downlink shared channel resource and the second physical downlink shared channel resource.

11. The method of claim 9, further comprising:

determining a first feedback value for a first bit of the plurality of acknowledgment or negative acknowledgment bits of the second downlink assignment index associated with the second downlink control information message based at least in part on the second downlink control information message scheduling a single physical downlink shared channel resource; and including a negative acknowledgment for a second bit of the plurality of acknowledgment or negative acknowledgment bits of the second downlink assignment index associated with the second downlink control information message.

12. The method of claim 1, wherein the plurality of downlink assignment indices are ordered first based at least in part on ascending order of an associated serving cell index with downlink control information in a given physical downlink control channel monitoring occasion then based at least in part on ascending order of physical downlink control channel monitoring occasion index.

13. A method for wireless communications at a user equipment (UE), comprising:

transmitting an indication of a quantity of physical downlink shared channel resources that are schedulable per physical downlink control channel monitoring occasion per cell;

receiving, during a physical downlink control channel monitoring occasion, one or more first downlink control information scheduling the UE for a corresponding one or more first physical downlink shared channel resources on a first component carrier in accordance with the quantity of physical downlink shared channel resources, the one or more first downlink control information associated with a first control resource set pool index;

receiving, during the physical downlink control channel monitoring occasion, one or more second downlink control information scheduling the UE for a corresponding one or more second physical downlink shared channel resources on the first component carrier in accordance with the quantity of physical downlink shared channel resources, the one or more second downlink control information associated with a second control resource set pool index;

identifying a plurality of downlink assignment indices for the one or more first downlink control information and the one or more second downlink control information, wherein values of the plurality of downlink assignment indices are based at least in part on the one or more first downlink control information and the one or more second downlink control information both scheduling physical downlink shared channel resources on a same component carrier; and transmitting feedback based at least in part on the plurality of downlink assignment indices.

14. The method of claim 13, wherein the indication comprises a UE capability associated with the quantity of physical downlink shared channel resources per physical downlink control channel monitoring occasion per cell.

15. The method of claim 13, wherein identifying the plurality of downlink assignment indices further comprises:

determining an ordering for the plurality of downlink assignment indices based at least in part on a temporal ordering of the physical downlink shared channel resources associated with a same control resource set pool index on the same component carrier scheduled during the physical downlink control channel monitoring occasion, then based at least in part on a control resource set pool index ordering on the same component carrier scheduled during the physical downlink control channel monitoring occasion, then based at least in part on a component carrier index ordering for the physical downlink control channel monitoring occasion, then based at least in part on a physical downlink control channel monitoring occasion ordering.

16. The method of claim 13, wherein identifying the plurality of downlink assignment indices further comprises:
determining an ordering for the plurality of downlink assignment indices based at least in part on a control resource set pool index ordering for the physical downlink shared channel resources having a common starting resource in a time domain on a same common component carrier scheduled during the physical downlink control channel monitoring occasion, then based at least in part on a temporal ordering of the physical downlink shared channel resources on the same component carrier scheduled during the physical downlink control channel monitoring occasion, then based at least in part on a component carrier index ordering for component carriers scheduled during the physical downlink control channel monitoring occasion, then based at least in part on a physical downlink control channel monitoring occasion index ordering.

17. The method of claim 13, wherein the one or more first downlink control information and the one or more second downlink control information include up to a maximum number of downlink control information.

18. The method of claim 17, wherein the maximum number of downlink control information is twice a value indicated by the UE.

19. The method of claim 17, wherein the maximum number of downlink control information is indicated by the UE, wherein a first physical downlink shared channel resource and a second physical downlink shared channel resource have a same starting resource in a time domain.

20. The method of claim 13, further comprising:
determining the one or more first downlink control information allocate one or more third physical downlink shared channel resources in a second component carrier.

21. The method of claim 13, wherein the first control resource set pool index corresponds to a first transmission and reception point, and the second control resource set pool index corresponds to a second transmission and reception point.

22. The method of claim 13, wherein an ordering for the plurality of downlink assignment indices is based at least in part on a physical downlink shared channel resource start time ordering, a control resource set pool index ordering, a component carrier index ordering, a monitoring occasion index ordering, or any combination thereof.

23. An apparatus for wireless communications at a user equipment (UE), comprising:
at least one processor;
at least one memory coupled with the at least one processor; and
instructions stored in the at least one memory and executable by the at least one processor to cause the apparatus to:
receive, during a physical downlink control channel monitoring occasion, a first downlink control information message scheduling the UE for a first physical downlink shared channel resource on a first component carrier and for a second physical downlink shared channel resource on a second component carrier;
receive, during the physical downlink control channel monitoring occasion, a second downlink control information message scheduling the UE for a third physical downlink shared channel resource on the second component carrier;
identify a plurality of downlink assignment indices including a first downlink assignment index in the first downlink control information message and a second downlink assignment index in the second downlink control information message;
identify a first associated component carrier index for the first downlink control information message and a second associated component carrier index for the second downlink control information message, wherein values of the first downlink assignment index and the second downlink assignment index are ordered in increasing order of physical downlink shared channel reception starting time based at least in part on the first downlink control information message and the second downlink control information message having a same associated component carrier index; and
transmit feedback based at least in part on the plurality of downlink assignment indices.

24. The apparatus of claim 23, wherein the instructions to identify the plurality of downlink assignment indices are further executable by the at least one processor to cause the apparatus to:
determine the first associated component carrier index for the first downlink control information message based at least in part on a highest component carrier index of the first component carrier and the second component carrier.

25. The apparatus of claim 23, wherein the instructions to identify the plurality of downlink assignment indices are further executable by the at least one processor to cause the apparatus to:
determine the first associated component carrier index for the first downlink control information message based at least in part on a lowest component carrier index of the first component carrier and the second component carrier.

26. An apparatus for wireless communications at a user equipment (UE), comprising:
at least one processor;
at least one memory coupled with the at least one processor; and
instructions stored in the at least one memory and executable by the at least one processor to cause the apparatus to:
transmitting an indication of a quantity of physical downlink shared channel resources that are schedulable per physical downlink control channel monitoring occasion per cell;
receive, during a physical downlink control channel monitoring occasion, one or more first downlink control information scheduling the UE for a corresponding one or more first physical downlink shared channel resources on a first component carrier in accordance with the quantity of physical downlink shared channel resources, the one or more first downlink control information associated with a first control resource set pool index;
receive, during the physical downlink control channel monitoring occasion, one or more second downlink control information scheduling the UE for a corresponding one or more second physical downlink shared channel resources on the first component carrier in accordance with the quantity of physical downlink shared channel resources, the one or more second downlink control information associated with a second control resource set pool index;

identify a plurality of downlink assignment indices for the one or more first downlink control information and the one or more second downlink control information, wherein values of the plurality of downlink assignment indices are based at least in part on the one or more first downlink control information and the one or more second downlink control information both scheduling physical downlink shared channel resources on a same component carrier; and transmit feedback based at least in part on the plurality of downlink assignment indices.

27. The apparatus of claim 26, wherein the indication comprises a UE capability associated with the quantity of downlink shared channel resources per monitoring occasion per cell.

28. The apparatus of claim 26, wherein the instructions to identify the plurality of downlink assignment indices are further executable by the at least one processor to cause the apparatus to:

determine an ordering for the plurality of downlink assignment indices based at least in part on a temporal ordering of the physical downlink shared channel resources associated with a same control resource set pool index on the same component carrier scheduled during the physical downlink control channel monitoring occasion, then based at least in part on a control resource set pool index ordering on the same component carrier scheduled during the physical downlink control channel monitoring occasion, then based at least in part on a component carrier index ordering for the physical downlink control channel monitoring occasion, then based at least in part on a physical downlink control channel monitoring occasion ordering.

* * * * *